(12) United States Patent
Yoshioka

(10) Patent No.: US 8,272,358 B2
(45) Date of Patent: Sep. 25, 2012

(54) HYDRAULIC SYSTEM CONTROL DEVICE AND VALVE TIMING CONTROL DEVICE

(75) Inventor: Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 473 days.

(21) Appl. No.: 12/670,804

(22) PCT Filed: Sep. 26, 2008

(86) PCT No.: PCT/JP2008/067987
§ 371 (c)(1),
(2), (4) Date: Jan. 26, 2010

(87) PCT Pub. No.: WO2009/051021
PCT Pub. Date: Apr. 23, 2009

(65) Prior Publication Data
US 2010/0236227 A1 Sep. 23, 2010

(30) Foreign Application Priority Data

Oct. 18, 2007 (JP) .................. 2007-271604

(51) Int. Cl.
*F01L 1/34* (2006.01)
(52) U.S. Cl. ............... 123/90.17; 123/90.15; 123/90.31
(58) Field of Classification Search ............. 123/90.15, 123/90.16, 90.17, 90.31, 90.12
See application file for complete search history.

(56) References Cited

U.S. PATENT DOCUMENTS

| 2003/0005751 A1 | 1/2003 | Berndorfer et al. |
| 2008/0022953 A1* | 1/2008 | Kanada et al. ............. 123/90.17 |

FOREIGN PATENT DOCUMENTS

| EP | 1 262 761 A1 | 12/2002 |
| EP | 1 471 216 A2 | 10/2004 |
| JP | A-02-199212 | 8/1990 |
| JP | A-11-141359 | 5/1999 |
| JP | A-11-210424 | 8/1999 |
| JP | A-2001-164953 | 6/2001 |
| JP | A-2002-349300 | 12/2002 |
| JP | A-2004-092593 | 3/2004 |
| JP | A-2005-351361 | 12/2005 |
| JP | A-2006-077680 | 3/2006 |
| JP | A-2006-083929 | 3/2006 |
| WO | WO 2006/131686 A2 | 12/2006 |

OTHER PUBLICATIONS

International Search Report issued in International Application No. PCT/JP2008/067987; Mailed on May 12, 2009.
Written Opinion of the International Searching Authority issued in International Application No. PCT/JP2008/067987; Mailed on May 12, 2009.

* cited by examiner

*Primary Examiner* — Zelalem Eshete
(74) *Attorney, Agent, or Firm* — Oliff & Berridge, PLC

(57) ABSTRACT

When a hydraulic pressure generation source begins to generate hydraulic pressure, the present invention measures the hydraulic pressure in an oil supply line connected to a hydraulic actuator, and sets a viscosity index value indicating an oil viscosity in accordance with the pace at which the measured hydraulic pressure rises. The viscosity index value is calculated and set so that the slower the pace at which the measured hydraulic pressure rises, the higher the viscosity indicated by the viscosity index value.

38 Claims, 29 Drawing Sheets

Elapsed time from engine stoppage

HYDRAULIC SYSTEM CONTROL DEVICE AND VALVE TIMING CONTROL DEVICE

TECHNICAL FIELD

The present invention relates to a control device for a hydraulic system having a hydraulic actuator that operates upon receipt of supplied oil, and also relates to a valve timing control device for controlling the valve timing of an internal combustion engine through the use of a variable valve timing mechanism, which is a hydraulic actuator.

BACKGROUND ART

A conventionally known variable valve timing mechanism disclosed, for instance, in Patent Documents 1 to 6 changes the valve timing of an internal combustion engine by changing the phase angle of a camshaft relative to a crankshaft. A common variable valve timing mechanism includes a housing, which is coupled to the crankshaft by a belt or chain, and a vane assembly, which is fastened to the camshaft. The vane assembly is contained in the housing to form a hydraulic chamber between the vane assembly and the housing. When oil is supplied to the hydraulic chamber with the amount of oil supply controlled by a control valve, the vane assembly and the housing can be relatively rotated to change the phase angle of the camshaft relative to the crankshaft.

When the above hydraulic variable valve timing mechanism is used, oil viscosity affects its operating characteristics. For example, the higher the oil viscosity, the lower the responsiveness of the variable valve timing mechanism. Meanwhile, the lower the oil viscosity, the larger the amount of oil leakage from a clearance between sliding parts. Therefore, when the variable valve timing mechanism is to be controlled with increased accuracy, it is preferred that oil viscosity be reflected in the control of the variable valve timing mechanism. However, an existing system does not have a viscosity sensor that directly measures the oil viscosity. Therefore, it is necessary to install a viscosity sensor or add some means for indirectly viscosity measurement. It goes without saying that adding a viscosity sensor increases the manufacturing cost. Further, an increase in the number of sensors will increase the probability of failure.

Some of the disclosures in Patent Documents 1 to 6 take the oil temperature into account when controlling the variable valve timing mechanism. The oil viscosity is temperature-dependent and varies with oil temperature. More specifically, the oil viscosity is high at a low temperature and decreases with an increase in the oil temperature. Therefore, when the variable valve timing mechanism is controlled in consideration of oil temperature, the oil viscosity is indirectly reflected in the control of the variable valve timing mechanism.

However, the temperature dependence of oil viscosity varies with the degree of oil deterioration. More specifically, the viscosity of deteriorated oil is high whereas the viscosity of fresh oil is low even when the oil temperature remains unchanged. Further, the viscosity of fresh oil varies with its composition. Therefore, the current oil viscosity cannot be accurately estimated simply by considering the oil temperature.

The disclosure in Patent Document 2, on the other hand, focuses attention on the influence of oil viscosity on the responsiveness of the variable valve timing mechanism, and determines the viscosity in accordance with the responsiveness. More specifically, a response speed-viscosity map is prepared to define the relationship between the viscosity and the response speed of the variable valve timing mechanism and used to calculate the viscosity. The response speed-viscosity map is prepared by first determining the relationship between the oil temperature and the viscosity of fresh oil, then determining the relationship between the oil temperature and the response speed of the variable valve timing mechanism, and incorporating these two relationships into a single whole. According to this response speed-viscosity map, the current oil viscosity can be accurately determined by operating the variable valve timing mechanism and calculating its response speed.

[Patent Document 1] JP-A-2002-349300
[Patent Document 2] JP-A-2004-92593
[Patent Document 3] JP-A-2001-164953
[Patent Document 4] JP-A-11-141359
[Patent Document 5] JP-A-11-210424
[Patent Document 6] JP-A-2006-77680

DISCLOSURE OF THE INVENTION

However, the disclosure in Patent Document 2 is at a disadvantage in that the variable valve timing mechanism needs to be actually operated when the oil viscosity is to be measured. The oil viscosity significantly affects the operating characteristics of the variable valve timing mechanism particularly immediately after a cold start of an internal combustion engine. The reason is that the oil viscosity is high immediately after a cold start due to a low oil temperature. However, when a method described in Patent Document 2 is used to measure the oil viscosity, the viscosity cannot be reflected in the operation of the variable valve timing mechanism immediately after a cold start of the internal combustion engine.

While the internal combustion engine is inactive, the variable valve timing mechanism is in a condition where oil is drained from an oil chamber due to oil pump deactivation. Therefore, if the variable valve timing mechanism operates immediately after a cold start of the internal combustion engine, the housing and the vane assembly may collide with each other due to insufficiency of oil, which serves as a cushion. This may generate a tapping sound or, in the worst case, incur breakage. Such a problem can be avoided by inhibiting the variable valve timing mechanism from operating for some time after engine start and allowing it to operate when the oil chamber is filled with oil.

Valve timing control is effective in improving the internal combustion engine output and fuel efficiency or exhaust emissions. Therefore, it is preferred that the variable valve timing mechanism be operated immediately after internal combustion engine start to provide appropriate valve timing. In other words, the operation inhibition time for the variable valve timing mechanism, that is, the period of time during which the operation of the variable valve timing mechanism is inhibited, should be minimized. If the employed oil has a low viscosity, the operation inhibition time can be shortened because the time required for filling the oil chamber with oil is short. If, on the other hand, the employed oil has a high viscosity due to its deterioration, the operation inhibition time needs to be long because the time required for filling the oil chamber with oil is long.

If the oil viscosity is known, the operation inhibition time can be optimized in accordance with the oil viscosity. However, the disclosure in Patent Document 2 cannot measure the viscosity until the variable valve timing mechanism is actually operated. Therefore, there is no alternative but to set the operation inhibition time in such a manner as to cover the worst condition. More specifically, it is necessary to select an operation inhibition time setting that is long enough to avoid a problem such as the generation of a tapping sound even when the employed oil is deteriorated and has the highest viscosity in the market.

Even when the oil viscosity is accurately judged as described above, a "too late" situation may occur after the variable valve timing mechanism is actually operated. To accurately control the operation of the variable valve timing mechanism without being affected by the oil viscosity, it is preferred that the viscosity of the employed oil be judged before the operation of the variable valve timing mechanism. The problem described above not only relates to a valve timing control device, but also generally relates to a hydraulic system having a variable valve timing mechanism or other hydraulic actuator that operates upon receipt of supplied oil.

The present invention has been made to solve the above problem. An object of the present invention is to provide a hydraulic system control device that is capable of accurately judging the viscosity of oil supplied to a hydraulic actuator before its operation and exercising precise system control in accordance with such an accurate judgment.

Another object of the present invention is to provide a valve timing control device that is capable of accurately judging the viscosity of oil supplied to a variable valve timing mechanism before its operation and accurately controlling its operation in accordance with such an accurate judgment.

In accomplishing any one of the above objects, according to a first aspect of the present invention, there is provided a hydraulic system control device for a hydraulic system having a hydraulic actuator that operates upon receipt of supplied oil, an oil supply line connected to the hydraulic actuator, and a hydraulic pressure generation source for allowing oil in the oil supply line to generate hydraulic pressure, the hydraulic system control device comprising: hydraulic pressure measurement means for measuring the hydraulic pressure of the oil in the oil supply line; and viscosity index value setup means which, when the hydraulic pressure generation source begins to generate hydraulic pressure, sets a viscosity index value for indicating oil viscosity in accordance with a pace at which the measured hydraulic pressure rises; wherein the viscosity index value setup means performs setup so that the slower the pace at which the measured hydraulic pressure rises, the higher the viscosity indicated by the viscosity index value.

According to a second aspect of the present invention, there is provided the hydraulic system control device as described in the first aspect, wherein the viscosity index value setup means sets the viscosity index value in accordance with the delay time between the instant at which hydraulic pressure generation starts and the instant at which the measured hydraulic pressure reaches a predetermined rise judgment value.

According to a third aspect of the present invention, there is provided the hydraulic system control device as described in the first aspect, wherein the viscosity index value setup means sets the viscosity index value in accordance with a speed at which the measured hydraulic pressure rises.

According to a fourth aspect of the present invention, there is provided the hydraulic system control device as described in any one of the first to three aspects, further comprising: storage means for storing the temperature dependence of the amount of oil that leaks from the hydraulic actuator per unit time while the hydraulic pressure generation source is inactive; inactivity period oil temperature measurement means for measuring the temperature of oil at predetermined intervals while the hydraulic pressure generation source is inactive; and oil leakage amount calculation means for calculating the cumulative amount of oil leakage from the hydraulic actuator during an inactivity period of the hydraulic pressure generation source in accordance with the stored temperature dependence of an oil leakage amount and changes in the measured oil temperature.

According to a fifth aspect of the present invention, there is provided the hydraulic system control device as described in the fourth aspect, wherein the inactivity period oil temperature measurement means uses short measurement intervals when the elapsed time from hydraulic pressure generation source deactivation is short, and uses long measurement intervals when the elapsed time is long.

According to a sixth aspect of the present invention, there is provided the hydraulic system control device as described in any one of the first to three aspects, further comprising: control means for causing the viscosity index value to be reflected in the control of the hydraulic system.

According to a seventh aspect of the present invention, there is provided the hydraulic system control device as described in the fourth or fifth aspect, further comprising: control means for causing the cumulative leakage amount to be reflected in the control of the hydraulic system.

According to an eighth aspect of the present invention, there is provided the hydraulic system control device as described in any one of the first to three aspects, further comprising: initial oil temperature measurement means for measuring the oil temperature at the beginning of hydraulic pressure generation; and characteristic judgment means for judging the temperature dependence of oil viscosity in accordance with the oil temperature measured at the beginning of hydraulic pressure generation and the viscosity index value.

According to a ninth aspect of the present invention, there is provided the hydraulic system control device as described in the eighth aspect, further comprising: storage means for storing the viscosity dependence of the amount of oil that leaks from the hydraulic actuator per unit time while the hydraulic pressure generation source is inactive; inactivity period oil temperature measurement means for measuring the temperature of oil at predetermined intervals while the hydraulic pressure generation source is inactive; viscosity change calculation means for calculating viscosity index value changes during an inactivity period of the hydraulic pressure generation source in accordance with the judged temperature dependence of viscosity and changes in the measured oil temperature; and oil leakage amount calculation means for calculating the cumulative amount of oil leakage from the hydraulic actuator during an inactivity period of the hydraulic pressure generation source in accordance with the stored viscosity dependence of an oil leakage amount and changes in the viscosity index value.

According to a tenth aspect of the present invention, there is provided the hydraulic system control device as described in the eighth aspect, further comprising: control means for causing the judged temperature dependence of viscosity to be reflected in the control of the hydraulic system.

According to a eleventh aspect of the present invention, there is provided the hydraulic system control device as described in the ninth aspect, further comprising: control means for causing the cumulative leakage amount to be reflected in the control of the hydraulic system.

According to a twelfth aspect of the present invention, there is provided the hydraulic system control device as described in any one of the first to eleventh aspects, wherein the hydraulic actuator is a variable valve timing mechanism that can change the valve timing of an internal combustion engine; and wherein the hydraulic pressure generation source is an oil pump that is driven by the internal combustion engine.

According to the first to twelfth aspects of the present invention, which relate to the hydraulic system control device, the viscosity of oil supplied to the hydraulic actuator can be judged in accordance with the viscosity index value, which is determined from a rise in the hydraulic pressure measured at the beginning of hydraulic pressure generation. It means that the hydraulic actuator need not actually be operated in order to judge the oil viscosity. Further, viscosity index value calculations are designed to match the relationship between oil viscosity and hydraulic pressure behavior where the hydraulic pressure quickly rises when a low-viscosity oil is supplied and slowly rises when a high-viscosity oil is supplied. Therefore, the viscosity index value derived from the present invention makes it possible to accurately judge the viscosity of oil supplied to the hydraulic actuator.

According to the second aspect of the present invention in particular, the pace at which the hydraulic pressure rises at the beginning of hydraulic pressure generation can be objectively evaluated in accordance with a physical quantity indicating the delay time required for the measured hydraulic pressure to reach the judgment value. The delay time tends to be short when a low-viscosity oil is supplied and long when a high-viscosity oil is supplied. In other words, the delay time corresponds to the oil viscosity on a one-to-one basis. Therefore, when the viscosity index value is set in accordance with the delay time, the viscosity of oil supplied to the hydraulic actuator can be accurately judged.

According to the third aspect of the present invention, the pace at which the hydraulic pressure rises at the beginning of hydraulic pressure generation can be objectively evaluated in accordance with a physical quantity indicating the speed of a rise in the measured hydraulic pressure. The rise speed tends to be high when a low-viscosity oil is supplied and low when a high-viscosity oil is supplied. In other words, the rise speed corresponds to the oil viscosity on a one-to-one basis. Therefore, when the viscosity index value is set in accordance with the rise speed, the viscosity of oil supplied to the hydraulic actuator can be accurately judged.

According to the fourth aspect of the present invention, not only the oil viscosity but also the cumulative amount of oil leakage from the hydraulic actuator can be acquired as the information to be reflected in system control. Further, these two items of information can be both acquired before the operation of the hydraulic actuator. Furthermore, the cumulative amount of oil leakage is calculated in consideration of not only the inactivity period of the hydraulic pressure generation source but also the changes in the oil temperature during the inactivity period. Therefore, the cumulative amount of oil leakage at the beginning of hydraulic pressure generation can be accurately judged. The reason is that the amount of oil leakage per unit time is determined by the oil viscosity, which is determined by the oil temperature.

According to the fifth aspect of the present invention, when a short period of time has elapsed from the instant at which the hydraulic pressure generation source was stopped, the amount of oil leakage per unit time is large due to a high oil temperature and low oil viscosity. In this instance, the cumulative amount of oil leakage can be predicted with increased accuracy by shortening the measurement intervals. When, on the other hand, a long period of time has elapsed from the instant at which the hydraulic pressure generation source was stopped, the amount of oil leakage per unit time is small due to a low oil temperature and high oil viscosity. In this instance, the amount of power consumption for calculating the cumulative amount of oil leakage can be reduced by lengthening the measurement intervals.

According to the sixth aspect of the present invention, when the viscosity index value is reflected in the control of the hydraulic system, accurate system control can be exercised in accordance with the oil viscosity accurately judged at the beginning of hydraulic pressure generation.

According to the seventh aspect of the present invention, when the cumulative amount of oil leakage during the inactivity period of the hydraulic pressure generation source is reflected in the control of the hydraulic system, accurate system control can be exercised in accordance with an accurately judged amount of oil remaining in the hydraulic actuator at the beginning of hydraulic pressure generation.

According to the eighth aspect of the present invention, when the temperature dependence of oil viscosity is judged in accordance with the oil temperature measured at the beginning of hydraulic pressure generation and the viscosity index value, the current oil viscosity can be accurately judged by applying the measured oil temperature to the judged temperature dependence of oil viscosity no matter whether the oil temperature changes later.

According to the ninth aspect of the present invention, not only the oil viscosity at the beginning of hydraulic pressure generation and its temperature dependence but also the cumulative amount of oil leakage from the hydraulic actuator can be acquired as the information to be reflected in system control. Further, all of these items of information can be acquired before the operation of the hydraulic actuator. Furthermore, the cumulative amount of oil leakage is calculated not only in consideration of oil temperature changes during the inactivity period but also in consideration of oil viscosity changes calculated in accordance with the temperature dependence of oil viscosity. Therefore, the cumulative amount of oil leakage at the beginning of hydraulic pressure generation can be judged with increased accuracy.

According to the tenth aspect of the present invention, when the temperature dependence of oil viscosity is reflected in the control of the hydraulic system, the oil viscosity prevailing at an arbitrary point of time can be accurately judged. Thus, accurate system control can be exercised in accordance with such an accurate judgment.

According to the eleventh aspect of the present invention, when the cumulative amount of oil leakage during the inactivity period of the hydraulic pressure generation source is calculated in consideration of the temperature dependence of oil viscosity and reflected in the control of the hydraulic system, accurate system control can be exercised in accordance with an accurately judged amount of oil remaining in the hydraulic actuator at the beginning of hydraulic pressure generation.

According to the twelfth aspect of the present invention, when the internal combustion engine starts, the viscosity of oil supplied from the oil pump to the variable valve timing mechanism can be accurately judged before the operation of the variable valve timing mechanism.

In accomplishing any one of the above objects, according to a thirteenth aspect of the present invention, there is provided a hydraulic system control device for a hydraulic system having a hydraulic actuator that operates upon receipt of supplied oil, a hydraulic oil supply line connected to the hydraulic actuator, and a hydraulic pressure generation source for allowing oil in the hydraulic oil supply line to generate hydraulic pressure, the control device comprising: control means for controlling the operation of the hydraulic actuator by using a control parameter in which oil viscosity is reflected; hydraulic pressure measurement means for measuring the hydraulic pressure of the oil in the hydraulic oil supply line; index value acquisition means which, when the hydraulic pressure generation source begins to generate hydraulic pressure, acquires an index value indicating a pace at which the measured hydraulic pressure rises; and control parameter setup means which performs setup so that the slower the pace indicated by the index value, the higher the viscosity indicated by the control parameter.

According to a fourteenth aspect of the present invention, there is provided the hydraulic system control device as described in the thirteenth aspect, wherein the index value acquired by the index value acquisition means represents the delay time between the instant at which hydraulic pressure generation starts and the instant at which the measured hydraulic pressure reaches a predetermined rise judgment value.

According to a fifteenth aspect of the present invention, there is provided the hydraulic system control device as described in the thirteenth aspect, wherein the index value acquired by the index value acquisition means represents a speed at which the measured hydraulic pressure rises.

According to a sixteenth aspect of the present invention, there is provided the hydraulic system control device as described in any one of the thirteenth to fifteenth aspects, wherein the hydraulic actuator is a variable valve timing mechanism that can change the valve timing of an internal combustion engine; and wherein the hydraulic pressure generation source is an oil pump that is driven by the internal combustion engine.

According to the thirteenth to sixteenth aspects of the present invention, which relate to the hydraulic system control device, the viscosity of oil supplied to the hydraulic actuator is expressed by the index value that is acquired at the beginning of hydraulic pressure generation and indicative of the pace at which the measured hydraulic pressure rises. When a control parameter concerning the operational control of the hydraulic actuator is set in accordance with the index value, an accurate oil viscosity can be reflected in control parameter setup before an actual operation of the hydraulic actuator. Further, control parameter setup is performed to match the relationship between oil viscosity and hydraulic pressure behavior where the hydraulic pressure quickly rises when a low-viscosity oil is supplied and slowly rises when a high-viscosity oil is supplied. Thus, the slower the pace indicated by the index value, the higher the viscosity indicated by the control parameter. Consequently, the present invention makes it possible to accurately control the operation of the hydraulic actuator in accordance with oil viscosity.

According to the fourteenth aspect of the present invention in particular, the pace at which the hydraulic pressure rises at the beginning of hydraulic pressure generation can be objectively evaluated in accordance with a physical quantity indicating the delay time required for the measured hydraulic pressure to reach the judgment value. The delay time tends to be short when a low-viscosity oil is supplied and long when a high-viscosity oil is supplied. The delay time corresponds to the oil viscosity on a one-to-one basis. Therefore, when the delay time is acquired as the index value, an accurate oil viscosity can be reflected in control parameter setup.

According to the fifteenth aspect of the present invention, the pace at which the hydraulic pressure rises at the beginning of hydraulic pressure generation can be objectively evaluated in accordance with a physical quantity indicating the speed of a rise in the measured hydraulic pressure. The rise speed tends to be high when a low-viscosity oil is supplied and low when a high-viscosity oil is supplied. The rise speed corresponds to the oil viscosity on a one-to-one basis. Therefore, when the rise speed is acquired as the index value, an accurate oil viscosity can be reflected in control parameter setup.

According to the sixteenth aspect of the present invention, when the internal combustion engine starts, an accurate viscosity of oil supplied from the oil pump to the variable valve timing mechanism can be reflected in control parameter setup before the operation of the variable valve timing mechanism. Further, the resulting control parameter can be used to control the operation of the variable valve timing mechanism.

In accomplishing any one of the above objects, according to a seventeenth aspect of the present invention, there is provided a valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising: operation inhibition means for temporarily inhibiting the operation of the variable valve timing mechanism when the internal combustion engine starts; hydraulic pressure measurement means for measuring the hydraulic pressure of oil in the oil supply line; index value acquisition means for acquiring an index value indicating a pace at which the measured hydraulic pressure rises when the internal combustion engine starts; and operation inhibition time setup means which performs setup so that the slower the pace indicated by the index value, the longer the time during which the operation of the variable valve timing mechanism is inhibited by the operation inhibition means.

According to an eighteenth aspect of the present invention, there is provided the valve timing control device as described in the seventeenth aspect, wherein the index value acquired by the index value acquisition means represents the delay time between the instant at which the rotation speed of the internal combustion engine exceeds a predetermined start judgment rotation speed and the instant at which the measured hydraulic pressure reaches a predetermined rise judgment value.

According to a nineteenth aspect of the present invention, there is provided the valve timing control device as described in the eighteenth aspect, wherein, if the internal combustion engine stalls during the time interval between the instant at which the rotation speed of the internal combustion engine exceeds the start judgment rotation speed and the instant at which the measured hydraulic pressure reaches the rise judgment value, and if the length of stall time prevailing before the rotation speed of the internal combustion engine exceeds the start judgment rotation speed again is not greater than the length of predetermined permissible time, the index value acquisition means adds the time measured before the stall to the delay time.

According to a twentieth aspect of the present invention, there is provided the valve timing control device as described in the seventeenth aspect, wherein the index value acquired by the index value acquisition means represents a speed at which the measured hydraulic pressure rises.

According to a twenty-first aspect of the present invention, there is provided the valve timing control device as described in the seventeenth aspect, further comprising: reference cumulative number-of-rotations storage means for storing the reference cumulative number of rotations in accordance with the elapsed time from a start of the internal combustion engine; actual cumulative number-of-rotations calculation means for calculating the actual cumulative number of rotations of the internal combustion engine that is obtained when the measured hydraulic pressure reaches a predetermined value; and operation inhibition time correction means for correcting the operation inhibition time in accordance with the ratio between the reference cumulative number of rotations and the actual cumulative number of rotations that prevail when the measured hydraulic pressure reaches the predetermined value.

According to a twenty-second aspect of the present invention, there is provided the valve timing control device as described in any one of the seventeenth to twenty-first aspects, further comprising: start oil temperature measurement means for measuring the oil temperature when the internal combustion engine starts; lower-limit guard value setup means for setting a lower-limit guard value for the operation inhibition time in accordance with the oil temperature measured at startup; and lower-limit guard means which, when the operation inhibition time determined by the index value is less than the lower-limit guard value, replaces the setting for the operation inhibition time with the lower-limit guard value.

According to a twenty-third aspect of the present invention, there is provided the valve timing control device as described in the twenty-second aspects, further comprising: upper-limit guard value setup means for setting an upper-limit guard value for the operation inhibition time in accordance with the oil temperature measured at startup; and upper-limit guard means which, when the operation inhibition time determined by the index value is more than the upper-limit guard value, replaces the setting for the operation inhibition time with the upper-limit guard value.

According to a twenty-fourth aspect of the present invention, there is provided the valve timing control device as described in any one of the seventeenth to twenty-third aspects, further comprising: storage means for storing the temperature dependence of the amount of oil that leaks from the variable valve timing mechanism per unit time while the oil pump is inactive; inactivity period oil temperature measurement means for measuring the temperature of oil at predetermined intervals while the internal combustion engine is inactive; oil leakage amount calculation means for calculating the cumulative amount of oil leakage from the variable valve timing mechanism during an inactivity period of the internal combustion engine in accordance with the stored temperature dependence of an oil leakage amount and changes in the measured oil temperature; and correction means for correcting the operation inhibition time in accordance with the cumulative amount of oil leakage.

According to the seventeenth to twenty-fourth aspects of the present invention, which relate to the valve timing control device, the viscosity of oil supplied to the variable valve timing mechanism when the internal combustion engine starts is expressed by the index value that indicates the pace at which the measured hydraulic pressure rises at startup. When the operation inhibition time for the variable valve timing mechanism is set in accordance with the index value, the oil viscosity prevailing at startup can be reflected in operation inhibition time setup. More specifically, when a low-viscosity oil is supplied, the operation inhibition time is set to be short because the hydraulic pressure quickly rises. When, on the other hand, a high-viscosity oil is supplied, the operation inhibition time is set to be long because the hydraulic pressure slowly rises. This makes it possible to exercise valve timing control as early as possible after internal combustion engine startup without causing a problem such as the generation of a tapping sound.

According to the eighteenth aspect of the present invention in particular, a physical quantity indicating the delay time between the instant at which the rotation speed of the internal combustion engine exceeds the start judgment rotation speed and the instant at which the measured hydraulic pressure reaches the judgment value can be used to objectively evaluate the pace at which the hydraulic pressure rises at startup. The delay time tends to be short when a low-viscosity oil is supplied and long when a high-viscosity oil is supplied. The delay time corresponds to the oil viscosity on a one-to-one basis. Therefore, when the delay time is acquired as the index value, an accurate oil viscosity can be reflected in operation inhibition time setup.

If, in the eighteenth aspect of the present invention, the internal combustion engine restarts immediately after a stall, the hydraulic pressure remains in the oil supply line without being relieved. In such an instance, therefore, the delay time between the instant at which the rotation speed exceeds the start judgment rotation speed and the instant at which the measured hydraulic pressure reaches the judgment value is shorter than normal. If the delay time is short, the operation inhibition time is set to be short. Therefore, the valve timing mechanism may operate before the oil chamber is sufficiently filled with oil.

According to the nineteenth aspect of the present invention, if the internal combustion engine restarts immediately after a stall, the time measured before the stall is added to the delay time. Therefore, the operation inhibition time according to the oil viscosity can be calculated. This makes it possible to prevent the valve timing mechanism from operating before the oil chamber is sufficiently filled with oil. If, on the other hand, the internal combustion engine restarts when a certain period of time elapses after a stall, it is highly probable that the oil supply line is relieved of hydraulic pressure. Therefore, the time measured before the stall is not added to the delay time. In this instance, the operation inhibition time is set in accordance with the delay time only. This makes it possible to prevent the operation of the valve timing mechanism from being unnecessarily inhibited.

According to the twentieth aspect of the present invention, a physical quantity indicating the speed of a rise in the measured hydraulic pressure can be used to objectively evaluate the pace at which the hydraulic pressure rises at startup. The rise speed tends to be high when a low-viscosity oil is supplied and low when a high viscosity oil is supplied. The rise speed corresponds to the oil viscosity on a one-to-one basis. Therefore, when the rise speed is acquired as the index value, an accurate oil viscosity can be reflected in operation inhibition time setup.

According to the twenty-first aspect of the present invention, the operation inhibition time is corrected in accordance with ratio between the reference cumulative number of rotations of the internal combustion engine and the actual cumulative number of rotations. Therefore, a more accurate viscosity of employed oil can be reflected in operation inhibition time setup. The pace at which the measured hydraulic pressure rises at engine startup depends not only on the oil viscosity but also on the discharge rate of the oil pump. Since the oil pump is driven by the internal combustion engine, the discharge rate of the oil pump is determined by the cumulative number of rotations of the internal combustion engine. Therefore, the ratio between the reference cumulative number of rotations and the actual cumulative number of rotations correspond to the ratio between a design discharge rate and an actual discharge rate of the oil. Consequently, correcting the operation inhibition time in accordance with this ratio makes it possible to ensure that a setting for the operation inhibition time remains unaffected by the difference between the design discharge rate and the actual discharge rate of the oil.

According to the twenty-second aspect of the present invention, the lower limit for the operation inhibition time is limited by the lower-limit guard value, which is determined from the oil temperature measured at startup. Therefore, even when the oil viscosity prevailing at startup is erroneously judged to be lower than the actual viscosity due to the behavior of hydraulic pressure, it is possible to minimize the possibility of causing a problem such as the generation of a tapping sound. Preferably, the relationship between the operation inhibition time and oil temperature is stored on the assumption that the lowest-viscosity oil is selected from among available oils and used. Further, the operation inhibition time is calculated in accordance with the lowest-viscosity oil corresponding to the oil temperature measured at startup and set as the lower-limit guard value.

According to the twenty-third aspect of the present invention, the upper limit for the operation inhibition time is limited by the upper-limit guard value, which is determined from the oil temperature measured at startup. Therefore, even when the oil viscosity prevailing at startup is erroneously judged to be higher than the actual viscosity due to the behavior of hydraulic pressure, it is possible to minimize the delay in the start of valve timing control. Preferably, the relationship between the operation inhibition time and oil temperature is stored on the assumption that the highest-viscosity oil is selected from among available oils and used. Further, the operation inhibition time is calculated in accordance with the highest-viscosity oil corresponding to the oil temperature measured at startup and set as the upper-limit guard value.

According to the twenty-fourth aspect of the present invention, not only the oil viscosity prevailing at startup but also the cumulative amount of actual oil leakage from the variable valve timing mechanism during the inactivity period of the oil pump can be reflected in operation inhibition time setup. When the operation inhibition time is set with increased accuracy as described above, valve timing control can be exercised earlier without causing a problem such as the generation of a tapping sound. Further, the twenty-third aspect of the present invention calculates viscosity changes in accordance with temporal changes in the oil temperature and the temperature dependence of viscosity and then calculates the cumulative amount of oil leakage in consideration of the calculated viscosity changes. This makes it possible to accurately determine the amount of oil remaining in the variable valve timing mechanism at startup.

In accomplishing any one of the above objects, according to a twenty-fifth aspect of the present invention, there is provided a valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising: hydraulic pressure measurement means for measuring the hydraulic pressure of oil in the oil supply line; oil temperature measurement means for measuring the temperature of oil in the oil supply line; viscosity index value setup means which, when the internal combustion engine starts, sets a viscosity index value indicating the viscosity of oil in accordance with a pace at which the measured hydraulic pressure rises, and performs setup so that the slower the pace at which the measured hydraulic pressure rises, the higher the viscosity indicated by the viscosity index value; characteristic judgment means for judging the temperature dependence of oil viscosity in accordance with the oil temperature measured at the start of the internal combustion engine and the viscosity index value; assurance temperature calculation means for calculating an assurance temperature at which a predetermined operation of the variable valve timing mechanism is assured, in accordance with assurance viscosity at which the predetermined operation of the variable valve timing mechanism is assured and the judged temperature dependence of oil viscosity; and operation inhibition means for inhibiting the operation of the variable valve timing mechanism until the oil temperature measured at the start of the internal combustion engine reaches the assurance temperature.

According to a twenty-sixth aspect of the present invention, there is provided the valve timing control device as described in the twenty-fifth aspect, wherein the predetermined operation is rotating a housing and a vane assembly of the variable valve timing mechanism relatively in a predetermined direction by using residual hydraulic pressure of oil while the internal combustion engine is inactive and then engaging a lock pin on either the housing or the vane assembly with a lock hole in the other.

According to the twenty-fifth and twenty-sixth aspects of the present invention, which relate to the valve timing control device, the operation of the variable valve timing mechanism is inhibited until the oil temperature prevailing at internal combustion engine startup reaches an operation assurance temperature that assures a proper operation of the variable valve timing mechanism. This makes it possible to prevent the variable valve timing mechanism from operating improperly under the influence of a high-viscosity oil. Further, the present invention judges the temperature dependence of viscosity of employed oil in accordance with the oil temperature measured at startup and the viscosity index value, and calculates the operation assurance temperature in accordance with the judged temperature dependence of oil viscosity and an operation assurance viscosity of the variable valve timing mechanism. Furthermore, viscosity index value calculations are designed to match the relationship between oil viscosity and hydraulic pressure behavior where the hydraulic pressure quickly rises when a low-viscosity oil is supplied and slowly rises when a high-viscosity oil is supplied. This makes it possible to ensure that the viscosity characteristics of currently employed oil are accurately reflected in operation assurance temperature setup for the variable valve timing mechanism.

According to the twenty-sixth aspect of the present invention in particular, the operation of the variable valve timing mechanism can be inhibited until the oil temperature rises during an internal combustion engine operation to decrease the oil viscosity to a level that assures proper engagement between the lock pin and lock hole during a period of internal combustion engine inactivity. This ensures that hydraulic pressure is exerted for the next startup while the lock pin is properly engaged with the lock hole. Consequently, it is possible to avoid a problem caused by the disengagement of the lock pin from the lock hole, such as the generation of a tapping sound due to the collision between the housing and vane assembly.

In accomplishing the above object, according to a twenty-seventh aspect of the present invention, there is provided a valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising: hydraulic pressure measurement means for measuring the hydraulic pressure of oil in the oil supply line; oil temperature measurement means for measuring the temperature of oil in the oil supply line; viscosity index value setup means which, when the internal combustion engine starts, sets a viscosity index value indicating the viscosity of oil in accordance with a pace at which the measured hydraulic pressure rises, and performs setup so that the slower the pace at which the measured hydraulic pressure rises, the higher the viscosity indicated by the viscosity index value; characteristic judgment means for judging the temperature dependence of oil viscosity in accordance with the oil temperature measured at the start of the internal combustion engine and the viscosity index value; assurance temperature calculation means for calculating an assurance temperature at which a predetermined operation of the variable valve timing mechanism is assured during an inactivity period of the internal combustion engine, in accordance with assurance viscosity at which the predetermined operation of the variable valve timing mechanism is assured and the judged temperature dependence of oil viscosity; and delay means which, if the oil temperature measured when the internal combustion engine is requested to stop is lower than the assurance temperature, delays the stop of the internal combustion engine by delay time according to the difference between the assurance temperature and the measured oil temperature.

According to a twenty-eighth aspect of the present invention, there is provided the valve timing control device as described in the twenty-seventh aspect, further comprising: conditional assurance temperature calculation means which, in accordance with conditional assurance viscosity at which the predetermined operation can be assured as far as the stop of the internal combustion engine is delayed by an upper-limit value for the delay time, and with the judged temperature dependence of oil viscosity, calculates a conditional assurance temperature that corresponds to the conditional assurance viscosity; and operation inhibition means for inhibiting the operation of the variable valve timing mechanism until the oil temperature measured at the start of the internal combustion engine reaches the conditional assurance temperature.

According to a twenty-ninth aspect of the present invention, there is provided the valve timing control device as described in the twenty-seventh or twenty-eighth aspects, wherein the predetermined operation is rotating a housing and a vane assembly of the variable valve timing mechanism relatively in a predetermined direction by using residual hydraulic pressure of oil and then engaging a lock pin on either the housing or the vane assembly with a lock hole in the other.

According to the twenty-seventh to twenty-ninth aspects of the present invention, which relate to the valve timing control device, the stop of the internal combustion engine is delayed if the oil temperature measured when the internal combustion engine is requested to stop is lower than an operation assurance temperature that assures a proper operation of the variable valve timing mechanism during a period of engine inactivity. Therefore, the operation time for the variable valve timing mechanism can be assured in accordance with the delay time. Consequently, the variable valve timing mechanism can certainly perform a predetermined operation during a period of engine inactivity no matter whether the oil viscosity prevailing during a period of engine inactivity is higher than an operation assurance viscosity. Further, the delay time is set in accordance with the difference between the operation assurance temperature and measured oil temperature. This makes it possible to not only perform the predetermined operation with certainty but also avoid delaying the stop of the engine unnecessarily to make the driver feel uncomfortable. Furthermore, the present invention judges the temperature dependence of viscosity of employed oil in accordance with the oil temperature measured at startup and the viscosity index value, and calculates the operation assurance temperature in accordance with the judged temperature dependence of oil viscosity and the operation assurance viscosity of the variable valve timing mechanism during a period of engine inactivity. Moreover, viscosity index value calculations are designed to match the relationship between oil viscosity and hydraulic pressure behavior where the hydraulic pressure quickly rises when a low-viscosity oil is supplied and slowly rises when a high-viscosity oil is supplied. This makes it possible to ensure that the viscosity characteristics of currently employed oil are accurately reflected in operation assurance temperature setup for the variable valve timing mechanism during a period of engine inactivity.

According to the twenty-eighth aspect of the present invention, the operation of the variable valve timing mechanism is inhibited until the oil temperature reaches the conditional assurance temperature at internal combustion engine startup. Therefore, it is possible to avoid the failure of the variable valve timing mechanism to perform the predetermined operation during a period of engine inactivity no matter whether the stop of the internal combustion engine is delayed by the upper-limit value for the delay time. Consequently, valve timing control can be exercised as early as possible while assuring that the variable valve timing mechanism certainly performs the predetermined operation during a period of engine inactivity.

According to the twenty-ninth aspect of the present invention, the stop of the internal combustion engine is delayed to ensure that the lock pin properly engages with the lock hole during a period of internal combustion engine inactivity. Therefore, hydraulic pressure can be exerted for the next startup while the lock pin is properly engaged with the lock hole. Consequently, it is possible to avoid a problem caused by the disengagement of the lock pin from the lock hole, such as the generation of a tapping sound due to the collision between the housing and vane assembly.

In accomplishing any one of the above objects, according to a thirtieth aspect of the present invention, there is provided a hydraulic system control device for a hydraulic system having a hydraulic actuator that operates upon receipt of supplied oil, an oil supply line connected to the hydraulic actuator, and a hydraulic pressure generation source for allowing oil in the oil supply line to generate hydraulic pressure, the hydraulic system control device comprising: hydraulic pressure measurement means for measuring the hydraulic pressure of the oil in the oil supply line; and viscosity index value setup means which, when the hydraulic pressure generation source begins to generate hydraulic pressure, sets a viscosity index value for indicating oil viscosity in accordance with a convergence value prevailing when the measured hydraulic pressure fully rises; wherein the viscosity index value setup means performs setup so that the greater the convergence value, the higher the viscosity indicated by the viscosity index value.

According to the thirtieth aspect of the present invention, which relates to the hydraulic system control device, the viscosity of oil supplied to the hydraulic actuator can be judged in accordance with the viscosity index value, which is determined from the convergence value prevailing when the measured hydraulic pressure fully rises at the beginning of hydraulic pressure generation. The hydraulic actuator need not actually be operated to judge the oil viscosity. In addition, viscosity index value calculations are designed to match the relationship between oil viscosity and hydraulic pressure convergence value (steady-state value) where the convergence value prevailing when the hydraulic pressure fully rises is small when a low-viscosity oil is supplied and great when a high-viscosity oil is supplied. Consequently, the viscosity index value calculated according to the present invention makes it possible to accurately judge the viscosity of oil supplied to the hydraulic actuator.

In accomplishing any one of the above objects, according to a thirty-first aspect of the present invention, there is provided a valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising: operation inhibition means for temporarily inhibiting the operation of the variable valve timing mechanism when the internal combustion engine starts; hydraulic pressure measurement means for measuring the hydraulic pressure of oil in the oil supply line; hydraulic pressure convergence value acquisition means which, when the internal combustion engine starts, acquires a convergence value prevailing when the measured hydraulic pressure fully rises; and operation inhibition time setup means which performs setup so that the greater the convergence value, the longer the time during which the operation of the variable valve timing mechanism is inhibited by the operation inhibition means.

According to the thirty-first aspect of the present invention, which relates to the valve timing control device, the viscosity of oil supplied to the variable valve timing mechanism at internal combustion engine startup is expressed by the convergence value prevailing when the measured hydraulic pressure fully rises at startup. When the operation inhibition time for the variable valve timing mechanism is set in accordance with the convergence value, the oil viscosity prevailing at startup can be reflected in operation inhibition time setup. More specifically, when a low-viscosity oil is supplied, the operation inhibition time is set to be short because the convergence value is small, and when a high-viscosity oil is supplied, the operation inhibition time is set to be long because the convergence value is great. This ensures that valve timing control can be exercised as early as possible after internal combustion engine startup without causing a problem such as the generation of a tapping sound.

BEST MODE FOR CARRYING OUT THE INVENTION

First Embodiment

A first embodiment of the present invention, which relates to a valve timing control device for an internal combustion engine (hereinafter abbreviated to the engine), will now be described with reference to FIGS. 1 to 5.

Figure 1:
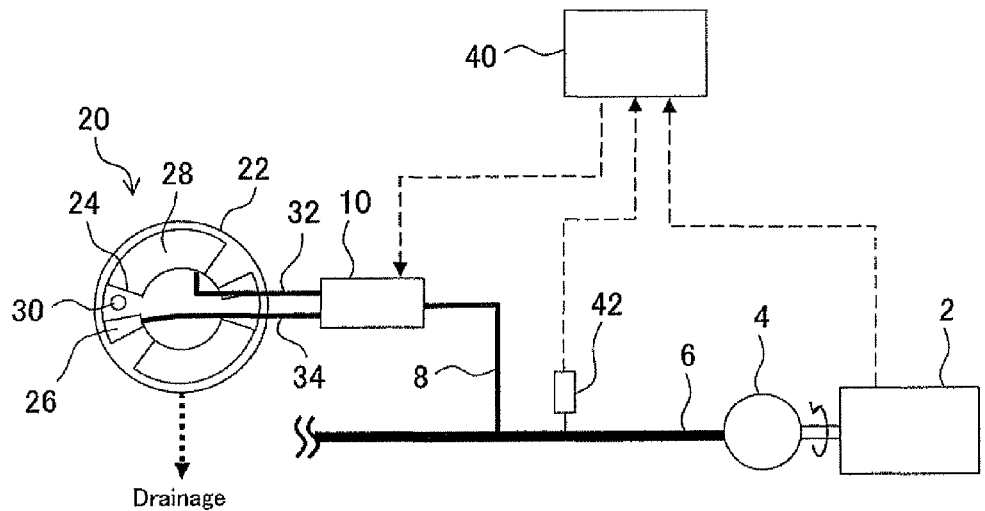
FIG. 1 schematically shows the configuration of a valve timing control device according to a first embodiment of the present invention.

The configuration of the valve timing control device according to the first embodiment can be outlined with reference to FIG. 1. FIG. 1 shows a hydraulic circuit for the valve timing control device that is be applied to an intake valve. As shown in the figure, the valve timing control device includes a variable valve timing mechanism (hereinafter referred to as the VVT) 20, which is a hydraulic actuator. The VVT 20 includes a housing 22, which is coupled to a crankshaft by a belt or chain, and a vane assembly 24, which rotates together with a camshaft positioned inside the housing 22.

Two oil chambers 26, 28 are formed within the housing 22 and separated from each other by the vane assembly 24. The VVT 20 varies the volume ratio between the two oil chambers 26, 28 to rotate the vane assembly 24 relative to the housing 22, thereby varying the rotation phase of the camshaft relative to the crankshaft. This causes the valve timing to vary. The oil chamber whose volume is increased to advance the valve timing is called the advancing oil chamber 26, whereas the oil chamber whose volume is decreased to retard the valve timing is called the retarding oil chamber 28. The valve timing is retarded by increasing the volume of the retarding oil chamber 28 and decreasing the volume of the advancing oil chamber 26.

The VVT 20 can vary the volume ratio between the oil chambers 26, 28 by selectively supplying oil (hydraulic fluid) to either the advancing oil chamber 26 or the retarding oil chamber 28. Supplying the oil to the advancing oil chamber 26 expands the advancing oil chamber 26 by the amount of supplied oil and pushes the oil out of the retarding oil chamber 28 in accordance with the expansion of the advancing oil chamber 26. Conversely, supplying the oil to the retarding oil chamber 28 expands the retarding oil chamber 28 by the amount of supplied oil and contracts the advancing oil chamber 26 by pushing the oil out of it.

The VVT 20 includes a lock mechanism for locking the operation of the VVT 20. The lock mechanism is composed of a lock pin 30, which is mounted on the vane assembly 24 of the VVT 20, and a lock hole (not shown), which is formed in the housing 22. When the lock pin 30 engages with the lock hole, the vane assembly 24 is retained at a predetermined rotation angle relative to the housing 22. The lock mechanism locks the VVT 20 while the engine 2 is inactive, and unlocks the VVT 20 when the engine 2 starts. When the present invention is applied to the valve timing control device, the position of the lock hole is not specifically defined. However, the present embodiment assumes that the lock hole is positioned so as to provide the most retarded valve timing.

The force for driving the lock pin 30 in the lock mechanism is composed of the force of a spring (not shown) placed in the vane assembly 24 and the hydraulic pressure of oil supplied to the VVT 20. The force of the spring works in the direction of pushing the lock pin 30 into the lock hole. The hydraulic pressure of the oil works in the direction of pushing the lock pin 30 out of the lock hole. Therefore, the lock pin 30 stays in the lock hole to keep the VVT 20 in a locked state during the time interval between the instant at which the engine 2 starts and the instant at which an oil pump 4 rotates to raise the hydraulic pressure of the oil. When the hydraulic pressure is raised to a certain level, the lock pin 30 is pushed out of the lock hole to unlock the VVT 20.

A VVT line 8 removes the oil supplied to the VVT 20 from a main oil gallery 6. The main oil gallery 6 is a main oil passage that extends from the oil pump 4. The oil flowing in the main oil gallery 6 is also supplied to hydraulic actuators other than the VVT 20 and forwarded to all sliding parts in the engine 2 as lubricating oil. The oil pump 4 is coupled to the crankshaft of the engine 2 by a gear, chain, or belt, and rotated by the driving force of the engine 2 so that the oil in the main oil gallery 6 generates hydraulic pressure. The hydraulic pressure within the main oil gallery 6 can be measured by a hydraulic pressure sensor 42, which is mounted in the main oil gallery 6. The VVT line 8 is a passage that branches off from the main oil gallery 6. The VVT line 8 and main oil gallery 6 constitute an oil supply line. The main oil gallery 6 and VVT line 8 may be hereinafter referred to as the oil supply lines 6, 8.

An oil control valve (hereinafter referred to as the OCV) 10 is installed at the leading end of the VVT line 8. The OCV 10 is connected to the advancing oil chamber 26 of the VVT 20 through an advancing oil chamber line 34, and connected to the retarding oil chamber 28 of the VVT 20 through a retarding oil chamber line 32. The OCV 10 functions not only as a line switching valve that selects either the advancing oil chamber line 34 or the retarding oil chamber line 32 as an oil supply destination, but also as a flow regulating valve that varies its opening to adjust the amount of oil supply.

More specifically, the OCV 10 is an electromagnetically-driven spool valve that is capable of exercising oil supply/drainage control over the advancing oil chamber line 34 and retarding oil chamber line 32 by changing the position of a spool within a sleeve. One end of the spool, which is oriented in the direction of movement, is supported by a spring, whereas the other end is supported by a solenoid. The position of the spool can be controlled in accordance with the duty ratio of a drive current supplied to the solenoid. While the solenoid is de-energized, the force of the spring places the spool in a predetermined initial position. While the spool is placed in the initial position, the VVT line 8 is connected to the retarding oil chamber line 32.

The OCV 10 is controlled by an electronic control unit (hereinafter referred to as the ECU) 40, which provides integrated control over the engine 2. The ECU 40 supplies a duty ratio signal to the OCV 10 for the purpose of driving the solenoid. The duty ratio is determined in accordance, for instance, with the deviation between a valve timing target value and actual value. The solenoid is driven by the supplied duty ratio signal to move the spool to a position that is determined by the duty ratio. Consequently, a desired amount of oil is supplied to a desired one of the two oil chambers 26, 28 of the VVT 20 to provide target valve timing. The ECU 40 and OCV 10 constitute a control device for a hydraulic system that is composed of the VVT 20, oil pump 4, and oil supply lines 6, 8.

As described above, the valve timing control device according to the present embodiment is configured so as to let the engine 2 drive the oil pump 4, allow the oil pump 4 to raise the hydraulic pressure of oil, and supply the hydraulically pressurized oil to the VVT 20 for the purpose of operating the VVT 20. Since the employed configuration is as described above, no hydraulic pressure is generated in the oil supply lines 6, 8 while the engine 2 is inactive. Therefore, the oil gradually leaves the oil chambers 26, 28 of the VVT 20. In some cases, the oil (drainage) may leak through the clearances between various internal parts of the VVT 20 as schematically shown in FIG. 1. Further, the oil leaks through the clearances between various parts of the oil supply lines 6, 8. Consequently, the oil chambers 26, 28 of the VVT 20 are emptied of the oil before the next start of the engine 2. Thus, the engine 2 starts with the oil chambers 26, 28 emptied of the oil.

As described earlier, the lock pin 30 locks the VVT 20 into position to provide the most retarded valve timing while the engine 2 is inactive. Therefore, the engine 2 starts in a state where the most retarded valve timing is provided. However, the valve timing greatly affects the output and fuel efficiency of the engine 2 or exhaust emissions. Therefore, the VVT 20 should be operated as early as possible to optimize the valve timing.

When the hydraulic pressure exerted by the oil supplied to the VVT 20 rises to a certain level after the engine 2 is started, the lock pin 30 unlocks the VVT 20.

After the VVT 20 is unlocked, it can be operated freely. Therefore, control can be exercised to advance the valve timing. However, the oil chambers 26, 28 are emptied of the oil while the engine 2 is inactive. Therefore, if control is exercised to advance the valve timing immediately after the start of the engine 2, the housing 22 and the vane assembly 24 collide with each other due to insufficiency of oil, which serves as a cushion, thereby generating a tapping sound.

After the engine 2 is started, the hydraulic pressure exerted by the oil rises with an increase in the rotation speed of the oil pump 4. If, in this instance, the VVT 20 communicates with the VVT line 8, the raised hydraulic pressure fills the VVT 20 with oil. While the solenoid is de-energized, the spool in the OCV 10 is positioned so as to connect the VVT line 8 to the retarding oil chamber line 32, as described earlier. Therefore, if the solenoid remains de-energized after the start of the engine 2, that is, if the VVT 20 is stopped without controlling the OCV 10, the retarding oil chamber 28, which is now empty, can be filled with oil. When the VVT 20 operates after the retarding oil chamber 28 is sufficiently filled with oil, the housing 22 and the vane assembly 24 do not collide with each other to generate a tapping sound.

In view of the above circumstances, the valve timing control device according to the present embodiment inhibits the operation of the VVT 20 immediately after the start of the engine 2, and cancels the operation inhibition when the retarding oil chamber 28 is sufficiently filled with oil. In this instance, its important the operation inhibition time for the VVT 20 be appropriate. To provide appropriate valve timing with increased promptness, it is preferred that the operation inhibition time for the VVT 20 be minimized.

The time required for filling the retarding oil chamber 28 with oil depends on the viscosity of the oil. The higher the oil viscosity, the longer the time required for filling. The minimum required time for inhibiting the operation of the VVT 20 is the filling completion time for oil. Since the filling completion time varies with the oil viscosity, it can be said that the optimum operation inhibition time is determined by the oil viscosity. Therefore, if the oil viscosity is known in advance, setting the optimum operation inhibition time in accordance with the oil viscosity makes it possible to provide appropriate valve timing in the shortest period of time without causing a problem such as the generation of a tapping sound.

In a hydraulic system such as the valve timing control device according to the present embodiment, the oil viscosity is determined by hydraulic pressure behavior prevailing after hydraulic pressure generation, or more specifically, by the pace at which the hydraulic pressure, rises. Specifically, the hydraulic pressure rises slowly when a high-viscosity oil is supplied to the hydraulic actuator, and rises quickly when a low-viscosity oil is supplied. Thus, there is a certain correlation between the oil viscosity and the pace at which the hydraulic pressure rises. Therefore, when the pace at which the hydraulic pressure rises is expressed by a certain physical quantity, it can be used as a viscosity index value. This obviates the necessity of actually operating the hydraulic actuator for the purpose of judging the oil viscosity. In other words, the oil viscosity can be judged before the operation of the hydraulic actuator. The operation of the hydraulic actuator can be controlled by using a control parameter in which the oil viscosity is reflected. In the present embodiment, the VVT 20 is used as the hydraulic actuator while the operation inhibition time is used as the control parameter.

Figure 2:
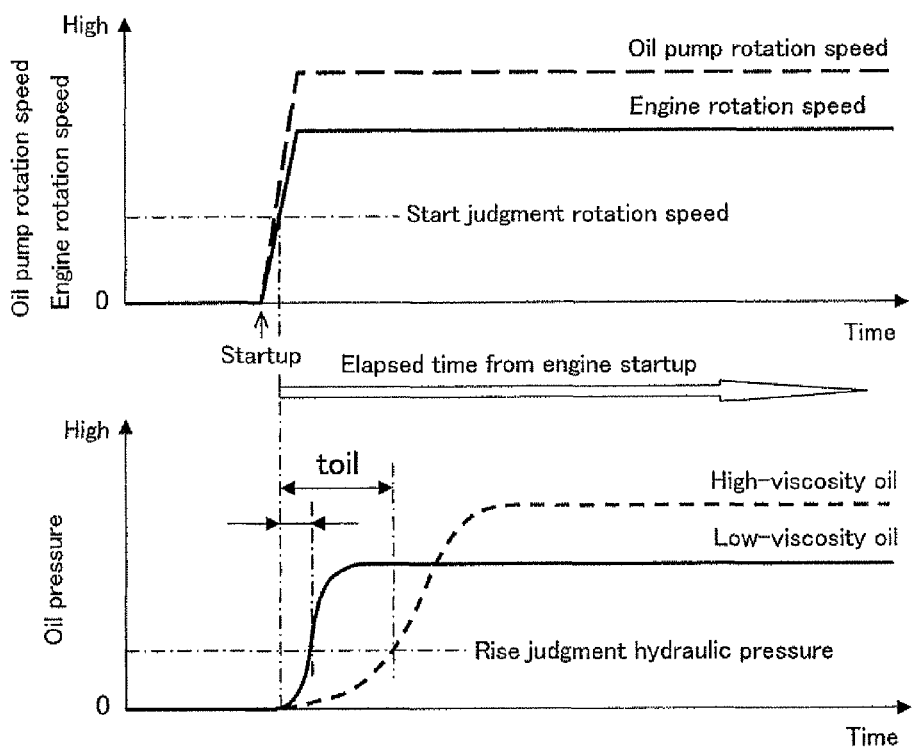
FIG. 2 compares high- and low-viscosity oils to illustrate hydraulic pressure rise delay time prevailing when an engine is cold-started.

An oil viscosity judgment method used in the present embodiment will now be described in detail. FIG. 2 compares high- and low-viscosity oils to illustrate hydraulic pressure behavior prevailing when the engine 2 is cold-started. As shown in the figure, the rotation speed of the oil pump 4 increases in proportion to the increase in the engine rotation speed after the start of the engine 2. In addition, the hydraulic pressure of oil in the main oil gallery 6 rises with an increase in the oil pump rotation speed. In FIG. 2, hydraulic pressure changes indicated by a solid line relate to the low-viscosity oil, whereas hydraulic pressure changes indicated by a broken line relate to the high-viscosity oil. The hydraulic pressure rises quickly when the low-viscosity oil is used and rises slowly when the high-viscosity oil is used.

The present embodiment acquires hydraulic pressure rise delay time as an index value indicating the pace at which the hydraulic pressure rises. Here, it is assumed, as indicated in FIG. 2, that the hydraulic pressure rise delay time (toil) is defined as the time interval between the instant at which the engine rotation speed reaches a predetermined start judgment rotation speed and the instant at which the hydraulic pressure measured by the hydraulic pressure sensor 42 reaches a predetermined rise judgment hydraulic pressure. The hydraulic pressure rise delay time (toil) for the high-viscosity oil is longer than that for the low-viscosity oil.

Figure 3:
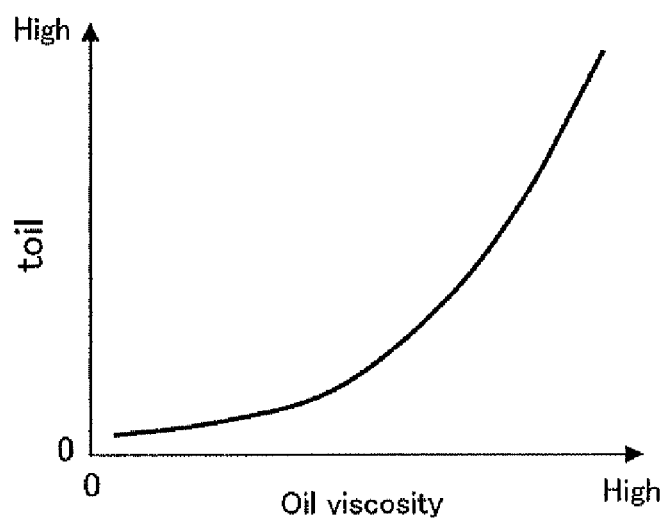
FIG. 3 shows the relationship between oil viscosity and hydraulic pressure rise delay time.

FIG. 3 shows the results of an experiment that was conducted by using oils having known viscosities in order to determine the hydraulic pressure rise delay time (toil) of each oil viscosity. As shown in FIG. 3, the hydraulic pressure rise delay time corresponds to the oil viscosity on a one-to-one basis. When the relationship between oil viscosity and hydraulic pressure rise delay time, which is shown in FIG. 3, is stored in a database, it is possible to judge the oil viscosity indirectly from the hydraulic pressure rise delay time.

Figure 4:
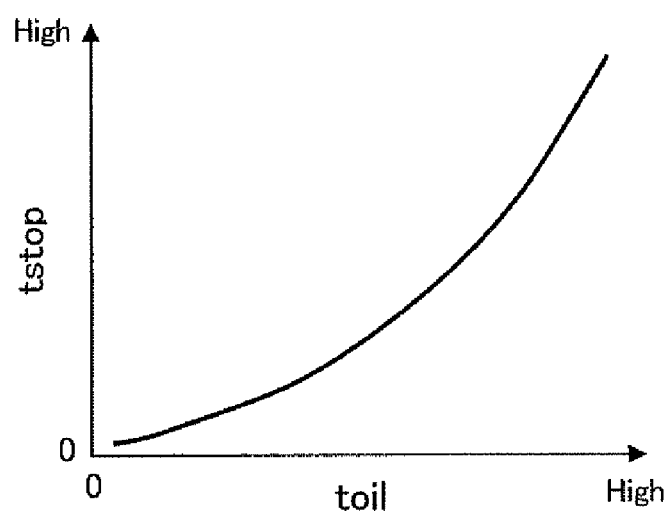
FIG. 4 shows a map used to determine VVT operation inhibition time from hydraulic pressure rise delay time.

The ECU 40 stores a map shown in FIG. 4. This map is used to determine VVT operation inhibition time (tstop) from the hydraulic pressure rise delay time (toil). The map is prepared in accordance with the relationship between oil viscosity and hydraulic pressure rise delay time, which is shown in FIG. 3. The map indicates that the longer the hydraulic pressure rise delay time, the longer the setting for the VVT operation inhibition time.

Figure 5:
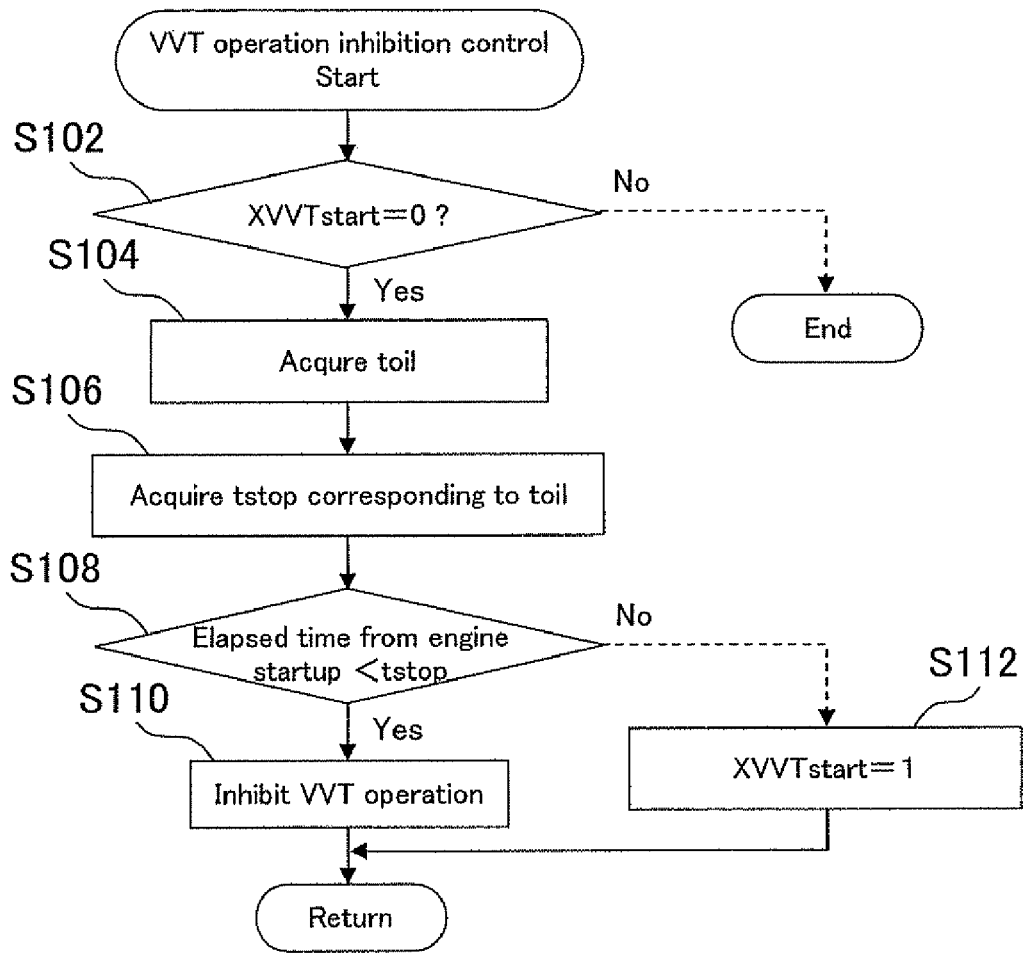
FIG. 5 is a flowchart illustrating a VVT operation inhibition control routine that is executed by a first embodiment of the present invention.

The map shown in FIG. 4 is used during VVT operation inhibition control, which is exercised immediately after the start of the engine 2. FIG. 5 is a flowchart illustrating a routine that is executed for VVT operation inhibition control. Immediately after the start of the engine 2, the ECU 40 executes the routine shown in FIG. 5 at regular intervals.

First of all, the routine shown in FIG. 5 performs step S102 to judge in accordance with the value of a flag XVVTstart whether the VVT operation is inhibited immediately after engine startup. If the value of the flag XVVTstart is 0, the VVT operation is inhibited. If, on the other hand, the value of the flag XVVTstart is 1, the VVT operation inhibition is canceled. The initial value of the flag XVVTstart is 0. If a later-described condition prescribed in step S108 is not established, the value of the flag XVVTstart is set to 1. When the value of the flag XVVTstart is 1, that is, when the VVT operation inhibition is canceled, the routine terminates.

If the judgment result obtained in step S102 indicates that the VVT operation is inhibited, the routine proceeds to steps S104 and S106. Step S104 is performed to acquire the hydraulic pressure rise delay time (toil) prevailing after engine startup. Step S106 is performed to acquire the VVT operation inhibition time (tstop) corresponding to the hydraulic pressure rise delay time (toil) in accordance with the map shown in FIG. 4. However, steps S104 and S106 are performed only once (although it is not indicated in the flowchart). The VVT operation inhibition time (tstop) acquired upon initial execution is retained until the routine is completed.

Next, step S108 is performed to judge whether the elapsed time from engine startup has reached the VVT operation inhibition time (tstop) acquired in step S106. The elapsed time from engine startup is the time elapsed after the start judgment rotation speed is reached by the engine rotation speed. If the elapsed time from engine startup has not reached the VVT operation inhibition time (tstop), the routine proceeds to step S110. In step S110, the operation of the VVT 20 is continuously inhibited. If, on the other hand, the elapsed time from engine startup has reached the VVT operation inhibition time (tstop), the routine proceeds to step S112. Step S112 is performed to cancel the operation inhibition on the VVT 20 and set the aforementioned flag XVVTstart to 1.

When the above routine is executed immediately after the start of the engine 2, the hydraulic pressure rise delay time (toil), which is an index value indicating the pace at which the hydraulic pressure rises, is used so that an accurate oil viscosity is reflected in the setup of the VVT operation inhibition time (tstop). Therefore, the valve timing control device according to the present embodiment can set the optimum operation inhibition time in accordance with oil viscosity and exercise valve timing control as early as possible after the start of the engine 2 without causing a problem such as the generation of a tapping sound.

The correlations between the first embodiment and the first aspect and its dependent aspects of the present invention are as described below. In FIG. 1, the VVT 20 corresponds to the "hydraulic actuator" according to the first and twelfth aspects of the present invention; the main oil gallery 6 and VVT line 8 correspond to the "oil supply line" according to the first aspect of the present invention; and the oil pump 4 corresponds to the "hydraulic pressure generation source" according to the first and twelfth aspects of the present invention. Further, the hydraulic pressure sensor 42 corresponds to the "hydraulic pressure measurement means" according to the first aspect of the present invention.

The "viscosity index value setup means" according to the first and second aspects of the present invention is implemented when the ECU 40 determines the oil viscosity from the hydraulic pressure rise delay time in accordance with the relationship shown in FIG. 3. Further, the "control means" according to the sixth aspect of the present invention is implemented when the ECU 40 executes the routine shown in FIG. 5.

The correlations between the first embodiment and the thirteenth aspect and its dependent aspects of the present invention are as described below. In FIG. 1, the VVT 20 corresponds to the "hydraulic actuator" according to the thirteenth and sixteenth aspects of the present invention; the main oil gallery 6 and VVT line 8 correspond to the "oil supply line" according to the thirteenth aspect of the present invention; and the oil pump 4 corresponds to the "hydraulic pressure generation source" according to the thirteenth and sixteenth aspects of the present invention. Further, the ECU 40 corresponds to the "control means" according to the thirteenth aspect of the present invention; and the hydraulic pressure sensor 42 corresponds to the "hydraulic pressure measurement means" according to the thirteenth aspect of the present invention.

The "index value acquisition means" according to the thirteenth and fourteenth aspects of the present invention is implemented when the ECU 40 performs step S104 of the routine shown in FIG. 5. Further, the "control parameter setup means" according to the thirteenth aspect of the present invention is implemented when the ECU 40 performs step S106 of the routine shown in FIG. 5 by using the map shown in FIG. 4.

The correlations between the first embodiment and the seventeenth aspect and its dependent aspects of the present invention are as described below. In FIG. 1, the VVT 20 corresponds to the "variable valve timing mechanism" according to the seventeenth aspect of the present invention; the main oil gallery 6 and VVT line 8 correspond to the "oil supply line" according to the seventeenth aspect of the present invention; and the oil pump 4 corresponds to the "oil pump" according to the seventeenth aspect of the present invention. Further, the hydraulic pressure sensor 42 corresponds to the "hydraulic pressure measurement means" according to the seventeenth aspect of the present invention.

The "operation inhibition means" according to the seventeenth aspect of the present invention is implemented when the ECU 40 performs steps S108, S110, and S112 of the routine shown in FIG. 5. Further, the "index value acquisition means" according to the seventeenth and eighteenth aspects of the present invention is implemented when the ECU 40 performs step S104 of the routine shown in FIG. 5. Furthermore, the "operation inhibition time setup means" according to the seventeenth aspect of the present invention is implemented when the ECU 40 performs step S106 of the routine shown in FIG. 5 by using the map shown in FIG. 4.

Figure 6:
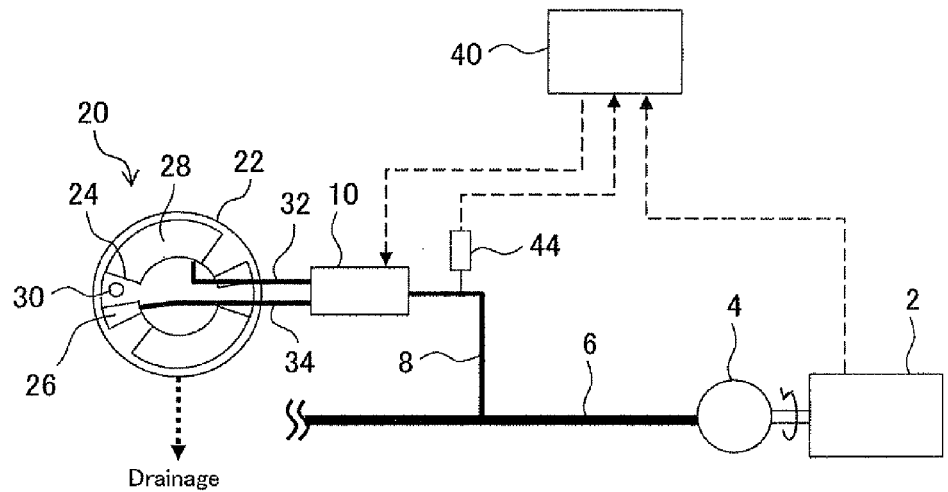
FIG. 6 shows a modified configuration of a valve timing control device according to a first embodiment of the present invention.

The first embodiment assumes that a hydraulic pressure sensor is used as the "hydraulic pressure measurement means." However, the hydraulic pressure may be measured at any location in the oil supply line. For example, the hydraulic pressure sensor 44 may be positioned in the VVT line 8 as shown in FIG. 6 to measure the hydraulic pressure of the oil in the VVT line 8. FIG. 6 shows a modified configuration of the valve timing control device according to the first embodiment of the present invention. In FIG. 6, parts and sections identical with those included in the configuration shown in FIG. 1 are assigned the same reference numerals as in FIG. 1.

Figure 7:
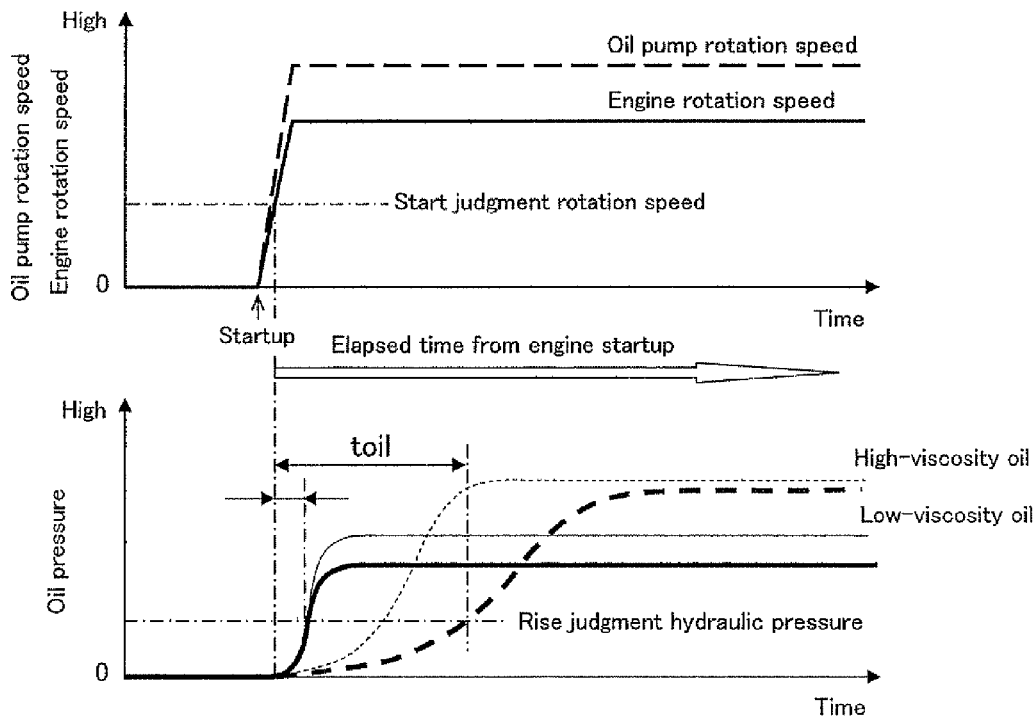
FIG. 7 compares high- and low-viscosity oils in a VVT line and main oil gallery to illustrate hydraulic pressure behavior prevailing when an engine is cold-started.

FIG. 7 compares high- and low-viscosity oils in the VVT line 8 and main oil gallery 6 to illustrate hydraulic pressure behavior prevailing when the engine 2 is cold-started. In FIG. 7, hydraulic pressure changes indicated by solid lines relate to the low-viscosity oil. A thick solid line indicates the hydraulic pressure in the VVT line 8, whereas a thin solid line indicates the hydraulic pressure in the main oil gallery 6. Hydraulic pressure changes indicated by broken lines relate to the high-viscosity oil. A thick broken line indicates the hydraulic pressure in the VVT line 8, whereas a thin broken line indicates the hydraulic pressure in the main oil gallery 6.

When the low-viscosity oil is used, FIG. 7 indicates that the pace at which the hydraulic pressure in the VVT line 8 rises is not significantly different from the pace at which the hydraulic pressure in the main oil gallery 6 rises. When, on the other hand, the high-viscosity oil is used, the hydraulic pressure in the VVT line 8 rises at a slower pace than the hydraulic pressure in the main oil gallery 6. The reason is that the VVT line 8 has a smaller passage area than the main oil gallery 6. It means that the VVT line 8 is affected by oil viscosity to a greater extent than the main oil gallery 6.

Consequently, when the oil viscosity is to be judged in accordance with the pace at which the hydraulic pressure rises, the hydraulic pressure in the VVT line 8 should be measured from the viewpoint of judgment accuracy. More specifically, measuring the hydraulic pressure in the VVT line 8 increases the difference in the hydraulic pressure rise delay time (toil) between the low- and high-viscosity oils.

When the hydraulic pressure sensor 44 is positioned as shown in FIG. 6, its distance from the oil pump 4 is greater than when the hydraulic pressure sensor 42 is positioned as shown in FIG. 1. Thus, when the hydraulic pressure sensor 44 is positioned as shown in FIG. 6, the measured hydraulic pressure is affected by oil leakage through the clearances between various parts to a greater extent that when the hydraulic pressure sensor 42 is positioned as shown in FIG. 1. However, oil leakage greatly affects a convergence value prevailing when the hydraulic pressure is fully raised. It should be noted that oil leakage does not significantly affect the pace at which the hydraulic pressure rises. In addition, when the engine 2 is cold-started, the oil viscosity is high due to a low oil temperature so that the amount of oil leakage itself is small. Therefore, the accuracy of oil viscosity judgment does not decrease due to oil leakage through the clearances between various parts.

The second to thirteenth embodiments of the present invention, which will be described below, assume that the hydraulic pressure sensor 42 is installed in the main oil gallery 6 as is the case with the first embodiment. For the second to thirteenth embodiments, however, the hydraulic pressure sensor 44 can be installed in the VVT line 8 as is the case with the modified configuration described above. Even when such a configuration (not shown) is employed, the second to thirteenth embodiments retain their advantages.

Second Embodiment

The valve timing control device according to a second embodiment of the present invention will now be described with reference to FIGS. 1 and 8 to 11.

The valve timing control device according to the second embodiment includes a hydraulic circuit, which is configured the same as that of the first embodiment. Therefore, the following description assumes that the employed hydraulic circuit is configured the same as in the first embodiment, which is shown in FIG. 1.

The valve timing control device according to the second embodiment is similar to that according to the first embodiment in that oil viscosity is reflected in operation inhibition time setup for the VVT 20. However, the second embodiment differs from the first embodiment in the method of judging the oil viscosity.

Figure 8:
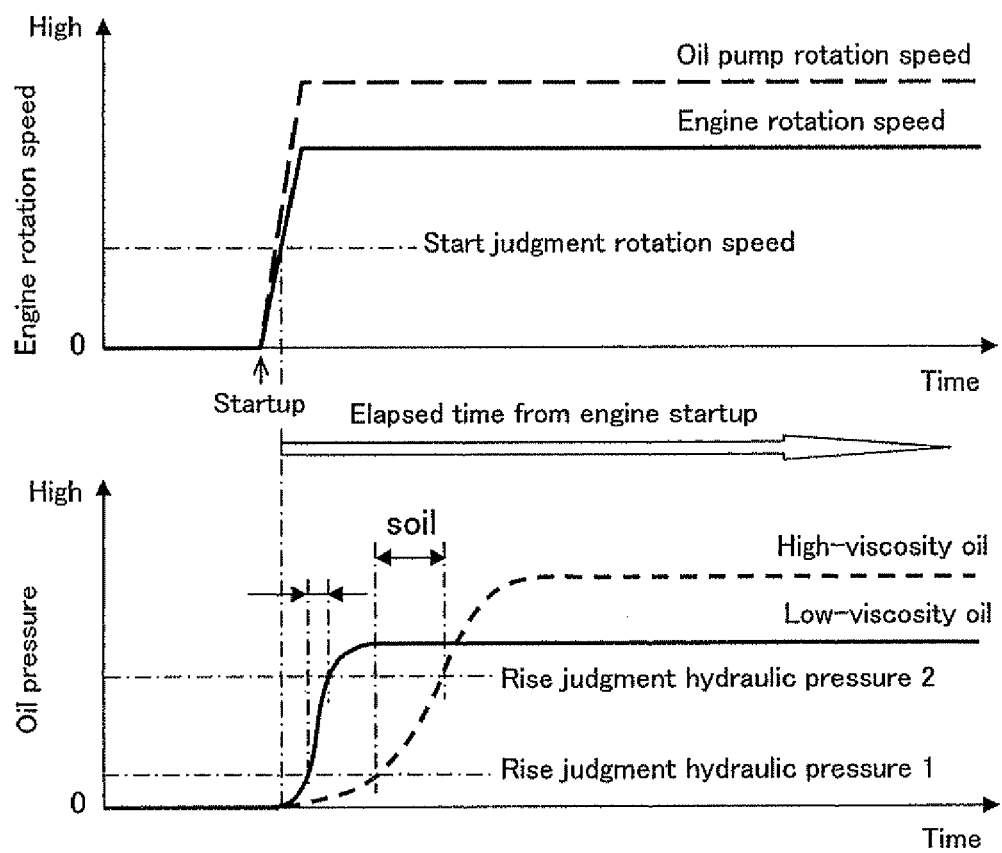
FIG. 8 compares high- and low-viscosity oils to illustrate hydraulic pressure increase speed prevailing when an engine is cold-started.

The oil viscosity judgment method employed in the second embodiment will now be described in detail below. FIG. 8 compares high- and low-viscosity oils to illustrate hydraulic pressure behavior prevailing when the engine 2 is cold-started. In FIG. 8, hydraulic pressure changes indicated by a solid line relate to the low-viscosity oil, whereas hydraulic pressure changes indicated by a broken line relate to the high-viscosity oil. The hydraulic pressure behavior itself is the same as indicated in FIG. 2.

The present embodiment judges the oil viscosity in accordance with the pace at which the hydraulic pressure rises. Although the first embodiment acquires the hydraulic pressure rise delay time as the index value indicating the pace at which the hydraulic pressure rises, the present embodiment acquires hydraulic pressure rise time. Here, it is assumed, as indicated in FIG. 8, that the hydraulic pressure rise time (soil) is defined as the time interval between the instant at which the hydraulic pressure measured by the hydraulic pressure sensor 42 reaches predetermined rise judgment hydraulic pressure 1 and the instant at which the hydraulic pressure measured by the hydraulic pressure sensor 42 reaches predetermined rise judgment hydraulic pressure 2, which is higher than rise judgment hydraulic pressure 1. The hydraulic pressure rise time (soil) can be used to indicate hydraulic pressure increase speed. The hydraulic pressure rise time (soil) is longer when high-viscosity oil is used than when low-viscosity oil is used.

Figure 9:
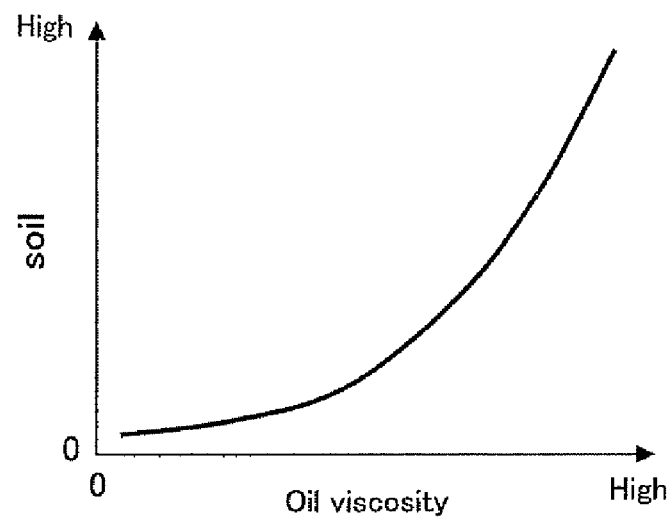
FIG. 9 shows the relationship between oil viscosity and hydraulic pressure rise time.

FIG. 9 shows the results of an experiment that was conducted by using oils having known viscosities in order to determine the hydraulic pressure rise time (soil) of each oil viscosity. As shown in FIG. 9, the hydraulic pressure rise time corresponds to the oil viscosity on a one-to-one basis. When the relationship between oil viscosity and hydraulic pressure rise time, which is shown in FIG. 9, is stored in a database, it is possible to judge the oil viscosity indirectly from the hydraulic pressure rise time.

Figure 10:
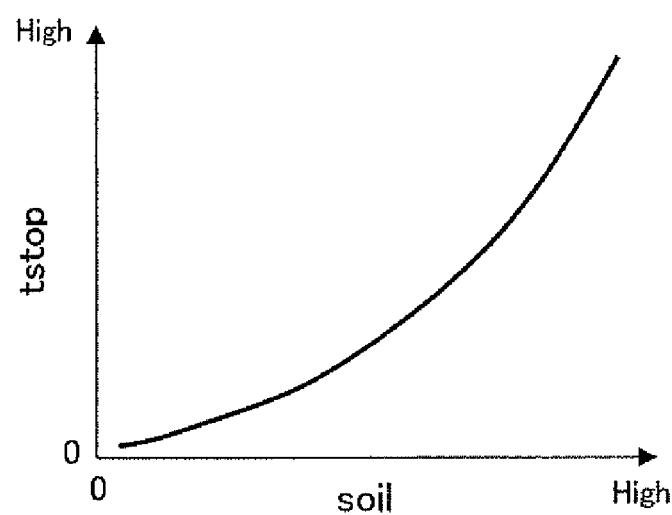
FIG. 10 shows a map used to determine VVT operation inhibition time from hydraulic pressure rise time.

The ECU 40 stores a map shown in FIG. 10. This map is used to determine the VVT operation inhibition time (tstop) from the hydraulic pressure rise time (soil). The map is prepared in accordance with the relationship between oil viscosity and hydraulic pressure rise time, which is shown in FIG. 9.

The map indicates that the longer the hydraulic pressure rise time, the longer the setting for the VVT operation inhibition time.

Figure 11:
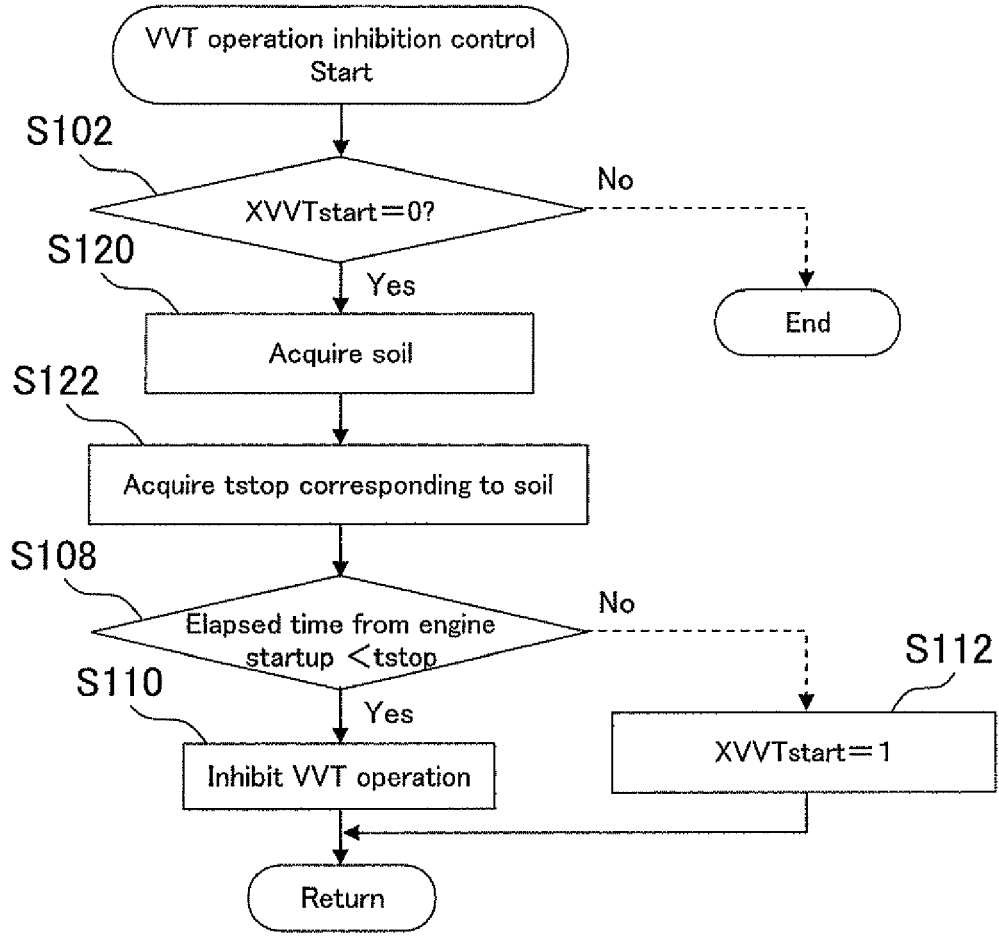
FIG. 11 is a flowchart illustrating a VVT operation inhibition control routine that is executed by a second embodiment of the present invention.

The map shown in FIG. 10 is used during VVT operation inhibition control, which is exercised immediately after the start of the engine 2. FIG. 11 is a flowchart illustrating a routine that is executed for VVT operation inhibition control. Immediately after the start of the engine 2, the ECU 40 executes the routine shown in FIG. 11 at regular intervals. In FIG. 11, processing steps identical with those of the VVT operation inhibition control routine according to the first embodiment are assigned the same step numbers as for the first embodiment. The processing steps common to the first and second embodiments will not be redundantly described or will be briefly described below.

First of all, the routine shown in FIG. 11 performs step S102 to judge in accordance with the value of the flag XVVTstart whether the VVT operation is inhibited immediately after engine startup. If the value of the flag XVVTstart is 1, that is, if the VVT operation inhibition is canceled, the routine terminates.

If the judgment result obtained in step S102 indicates that the VVT operation is inhibited, the routine proceeds to steps S120 and S122. Step S120 is performed to acquire the hydraulic pressure rise time (soil) after engine startup. Step S122 is performed to acquire the VVT operation inhibition time (tstop) corresponding to the hydraulic pressure rise time (soil) in accordance with the map shown in FIG. 10. However, steps S120 and S122 are performed only once (although it is not indicated in the flowchart). The VVT operation inhibition time (tstop) acquired upon initial execution is retained until the routine is completed.

Next, step S108 is performed to judge whether the elapsed time from engine startup has reached the VVT operation inhibition time (tstop) acquired in step S122. If the elapsed time from engine startup has not reached the VVT operation inhibition time (tstop), the routine proceeds to step S110. In step S110, the operation of the VVT 20 is continuously inhibited. If, on the other hand, the elapsed time from engine startup has reached the VVT operation inhibition time (tstop), the routine proceeds to step S112. Step S112 is performed to cancel the operation inhibition on the VVT 20 and set the flag XVVTstart to 1.

When the above routine is executed immediately after the start of the engine 2, the hydraulic pressure rise time (soil), which is an index value indicating the pace at which the hydraulic pressure rises, is used so that an accurate oil viscosity is reflected in the setup of the VVT operation inhibition time (tstop). Therefore, the valve timing control device according to the present embodiment can also set the optimum operation inhibition time in accordance with oil viscosity, as is the case with the valve timing control device according to the first embodiment, and exercise valve timing control as early as possible after the start of the engine 2 without causing a problem such as the generation of a tapping sound.

The correlations between the second embodiment and the first aspect and its dependent aspects of the present invention are as described below. The correlations between the parts or sections shown in FIG. 1 and various elements of the first aspect and its dependent aspects of the present invention are the same as for the first embodiment. In the second embodiment, the "viscosity index value setup means" according to the first and third aspects of the present invention is implemented when the ECU 40 determines the oil viscosity from the hydraulic pressure rise time in accordance with the relationship shown in FIG. 9. Further, the "control means" according to the sixth aspect of the present invention is implemented when the ECU 40 executes the routine shown in FIG. 11.

The correlations between the second embodiment and the thirteenth aspect and its dependent aspects of the present invention are as described below. The correlations between the parts or sections shown in FIG. 1 and various elements of the thirteenth aspect and its dependent aspects of the present invention are the same as for the first embodiment. In the second embodiment, the "index value acquisition means" according to the thirteenth and fifteenth aspects of the present invention is implemented when the ECU 40 performs step S120 of the routine shown in FIG. 11. Further, the "control parameter setup means" according to the thirteenth aspect of the present invention is implemented when the ECU 40 performs step S122 of the routine shown in FIG. 11 by using the map shown in FIG. 10.

The correlations between the second embodiment and the seventeenth aspect and its dependent aspects of the present invention are as described below. The correlations between the parts or sections shown in FIG. 1 and various elements of the seventeenth aspect and its dependent aspects of the present invention are the same as for the first embodiment. In the second embodiment, the "operation inhibition means" according to the seventeenth aspect of the present invention is implemented when the ECU 40 performs steps 108, S110, and S112 of the routine shown in FIG. 11. Further, the "index value acquisition means" according to the seventeenth and twentieth aspects of the present invention is implemented when the ECU 40 performs step S120 of the routine shown in FIG. 11. Furthermore, the "operation inhibition time setup means" according to the seventeenth aspect of the present invention is implemented when the ECU 40 performs step S120 of the routine shown in FIG. 11 by using the map shown in FIG. 10.

In the second embodiment, the hydraulic pressure rise time required for a hydraulic pressure increase from rise judgment hydraulic pressure 1 to rise judgment hydraulic pressure 2 is determined as an index value indicating the pace at which the hydraulic pressure rises. However, determining the hydraulic pressure rise time is equivalent to calculating the average speed of hydraulic pressure increase from rise judgment hydraulic pressure 1 to rise judgment hydraulic pressure 2. However, an alternative would to be determine the maximum speed of hydraulic pressure increase from rise judgment hydraulic pressure 1 to rise judgment hydraulic pressure 2 instead of the above average speed of hydraulic pressure increase, and set the operation inhibition time in accordance with the maximum speed of hydraulic pressure increase.

Third Embodiment

The valve timing control device according to a third embodiment of the present invention will now be described with reference to FIGS. 1 and 12 to 15.

The valve timing control device according to the third embodiment includes a hydraulic circuit, which is configured the same as that of the first embodiment. Therefore, the following description assumes that the employed hydraulic circuit is configured the same as in the first embodiment, which is shown in FIG. 1.

The valve timing control device according to the third embodiment is similar to that according to the first and second embodiments in that oil viscosity is reflected in operation inhibition time setup for the VVT 20. However, the third embodiment differs from the first and second embodiments in the method of judging the oil viscosity.

Figure 12:
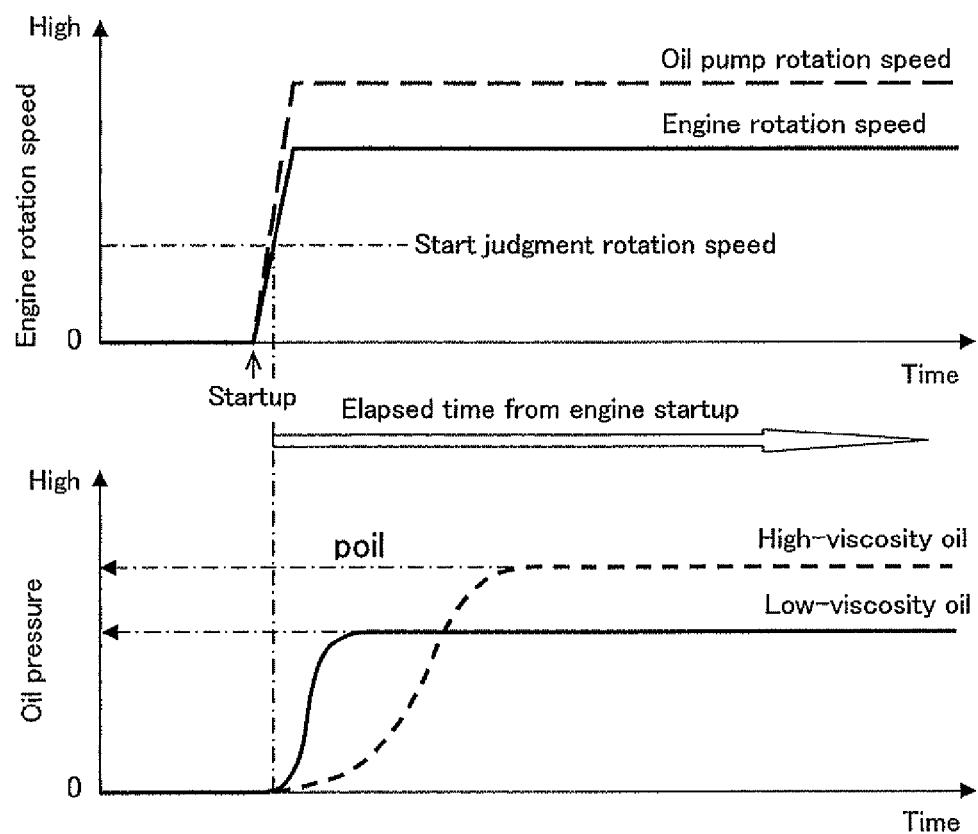
FIG. 12 compares high- and low-viscosity oils to illustrate hydraulic pressure convergence value prevailing when an engine is cold-started

The oil viscosity judgment method employed in the third embodiment will now be described in detail below. FIG. 12 compares high- and low-viscosity oils to illustrate hydraulic pressure behavior prevailing when the engine 2 is cold-started. In FIG. 12, hydraulic pressure changes indicated by a solid line relate to the low-viscosity oil, whereas hydraulic pressure changes indicated by a broken line relate to the high-viscosity oil. The hydraulic pressure behavior itself is the same as indicated in FIG. 2.

The present embodiment judges the oil viscosity in accordance with a convergence value prevailing when the hydraulic pressure measured by the hydraulic pressure sensor 42 is fully raised after the start of the engine 2. The viscosity of oil supplied to the VVT 20 is represented not only by the pace at which the measured hydraulic pressure rises, but also by the convergence value prevailing when the measured hydraulic pressure is fully raised. As shown in FIG. 12, a hydraulic pressure convergence value (poil) is greater when high-viscosity oil is used than when low-viscosity oil is used. When the method employed by the present embodiment is as described above, the VVT 20 need not be actually operated in order to judge the oil viscosity. In other words, the present embodiment can judge the oil viscosity before the VVT 20 operates, and control the operation of the VVT 20 in accordance with the VVT operation inhibition time in which the oil viscosity is reflected.

Figure 13:
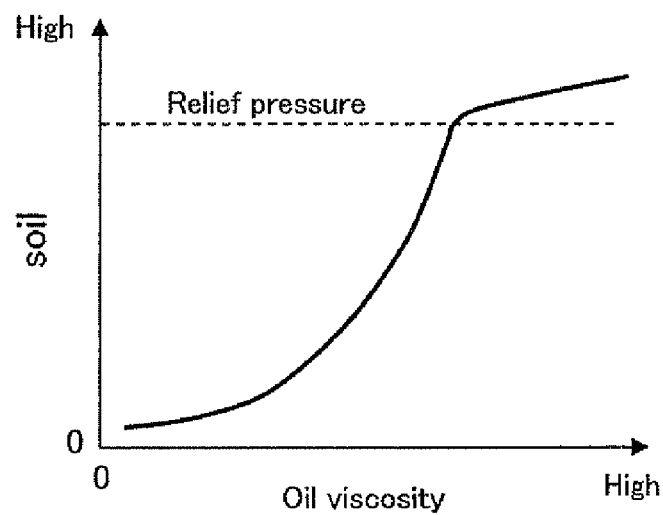
FIG. 13 shows the relationship between oil viscosity and hydraulic pressure convergence value.

FIG. 13 shows the results of an experiment that was conducted by using oils having known viscosities in order to determine the hydraulic pressure convergence value (poil) of each oil viscosity. As shown in FIG. 13, the hydraulic pressure convergence value corresponds to the oil viscosity on a one-to-one basis before the hydraulic pressure reaches the relief pressure of a relief valve (not shown). When the relationship between oil viscosity and hydraulic pressure convergence value, which is shown in FIG. 13, is stored in a database, it is possible to judge the oil viscosity indirectly from the hydraulic pressure convergence value.

Figure 14:
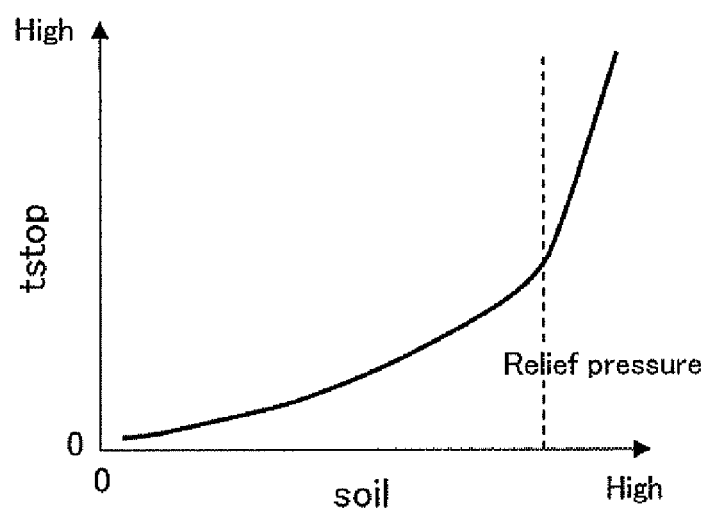
FIG. 14 shows a map used to determine VVT operation inhibition time from hydraulic pressure convergence value.

The ECU 40 stores a map shown in FIG. 14. This map is used to determine the VVT operation inhibition time (tstop) from the hydraulic pressure convergence value (pail). The map is prepared in accordance with the relationship between oil viscosity and hydraulic pressure convergence value, which is shown in FIG. 13. The map indicates that the greater the hydraulic pressure convergence value, the longer the setting for the VVT operation inhibition time. However, the map is valid only when the hydraulic pressure convergence value is not higher than the relief pressure. The accuracy of the map decreases when the hydraulic pressure convergence value is higher than the relief pressure.

Figure 15:
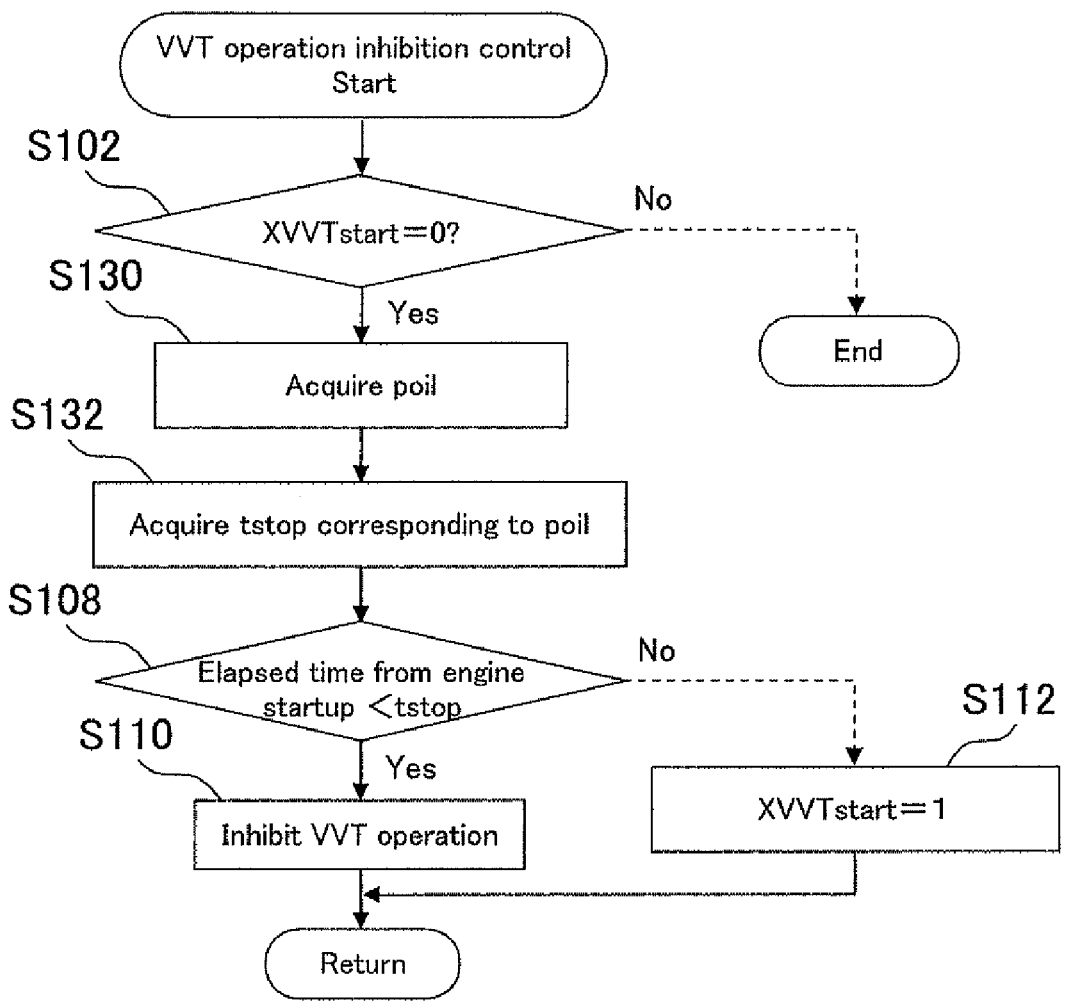
FIG. 15 is a flowchart illustrating a VVT operation inhibition control routine that is executed by a third embodiment of the present invention.

The map shown in FIG. 14 is used during VVT operation inhibition control, which is exercised immediately after the start of the engine 2. FIG. 15 is a flowchart illustrating a routine that is executed for VVT operation inhibition control. Immediately after the start of the engine 2, the ECU 40 executes the routine shown in FIG. 15 at regular intervals. In FIG. 15, processing steps identical with those of the VVT operation inhibition control routine according to the first embodiment are assigned the same step numbers as for the first embodiment. The processing steps common to the first and third embodiments will not be redundantly described or will be briefly described below.

First of all, the routine shown in FIG. 15 performs step S102 to judge in accordance with the value of the flag XVVT-start whether the VVT operation is inhibited immediately after engine startup. If the value of the flag XVVTstart is 1, that is, if the VVT operation inhibition is canceled, the routine terminates.

If the judgment result obtained in step S102 indicates that the VVT operation is inhibited, the routine proceeds to steps S130 and S132. Step S130 is performed to acquire the hydraulic pressure convergence value (poil) prevailing after engine startup. Step S132 is performed to acquire the VVT operation inhibition time (tstop) corresponding to the hydraulic pressure convergence value (poil) in accordance with the map shown in FIG. 14. However, steps S130 and S132 are performed only once (although it is not indicated in the flowchart). The VVT operation inhibition time (tstop) acquired upon initial execution is retained until the routine is completed.

Next, step S108 is performed to judge whether the elapsed time from engine startup has reached the VVT operation inhibition time (tstop) acquired in step S132. If the elapsed time from engine startup has not reached the VVT operation inhibition time (tstop), the routine proceeds to step S110. In step S110, the operation of the VVT 20 is continuously inhibited. If, on the other hand, the elapsed time from engine startup has reached the VVT operation inhibition time (tstop), the routine proceeds to step S112. Step S112 is performed to cancel the operation inhibition on the VVT 20 and set the flag XVVTstart to 1.

When the above routine is executed immediately after the start of the engine 2, the hydraulic pressure convergence value (poll) prevailing after the start of the engine 2 is used so that an accurate oil viscosity is reflected in the setup of the VVT operation inhibition time (tstop). Therefore, the valve timing control device according to the present embodiment can also set the optimum operation inhibition time in accordance with oil viscosity, and exercise valve timing control as early as possible after the start of the engine 2 without causing a problem such as the generation of a tapping sound.

The correlations between the third embodiment and the thirtieth aspect of the present invention are as described below. In FIG. 1, the VVT 20 corresponds to the "hydraulic actuator" according to the thirtieth aspect of the present invention; the main oil gallery 6 and VVT line 8 correspond to the "oil supply line" according to the thirtieth aspect of the present invention; and the oil pump 4 corresponds to the "hydraulic pressure generation source" according to the thirtieth aspect of the present invention. Further, the hydraulic pressure sensor 42 corresponds to the "hydraulic pressure measurement means" according to the thirtieth aspect of the present invention. Furthermore, the "viscosity index value setup means" according to the thirtieth aspect of the present invention is implemented when the ECU 40 determines the oil viscosity from the hydraulic pressure convergence value in accordance with the relationship shown in FIG. 13.

The correlations between the third embodiment and the thirty-first aspect of the present invention are as described below. In FIG. 1, the VVT 20 corresponds to the "variable valve timing mechanism" according to the thirty-first aspect of the present invention; the main oil gallery 6 and VVT line 8 correspond to the "oil supply line" according to the thirty-first aspect of the present invention; and the oil pump 4 corresponds to the "oil pump" according to the thirty-first aspect of the present invention. Further, the hydraulic pressure sensor 42 corresponds to the "hydraulic pressure measurement means" according to the thirty-first aspect of the present invention.

The "operation inhibition means" according to the thirty-first aspect of the present invention is implemented when the ECU 40 performs steps S108, S110, and S112 of the routine shown in FIG. 15. Further, the "hydraulic pressure convergence value acquisition means" according to the thirty-first aspect of the present invention is implemented when the ECU 40 performs step S130 of the routine shown in FIG. 15.

Furthermore, the "operation inhibition time setup means" according to the thirty-first aspect of the present invention is implemented when the ECU 40 performs step S132 of the routine shown in FIG. 15 by using the map shown in FIG. 14.

Fourth Embodiment

The valve timing control device according to a fourth embodiment of the present invention will now be described with reference to FIGS. 4 and 16 to 18.

Figure 16:
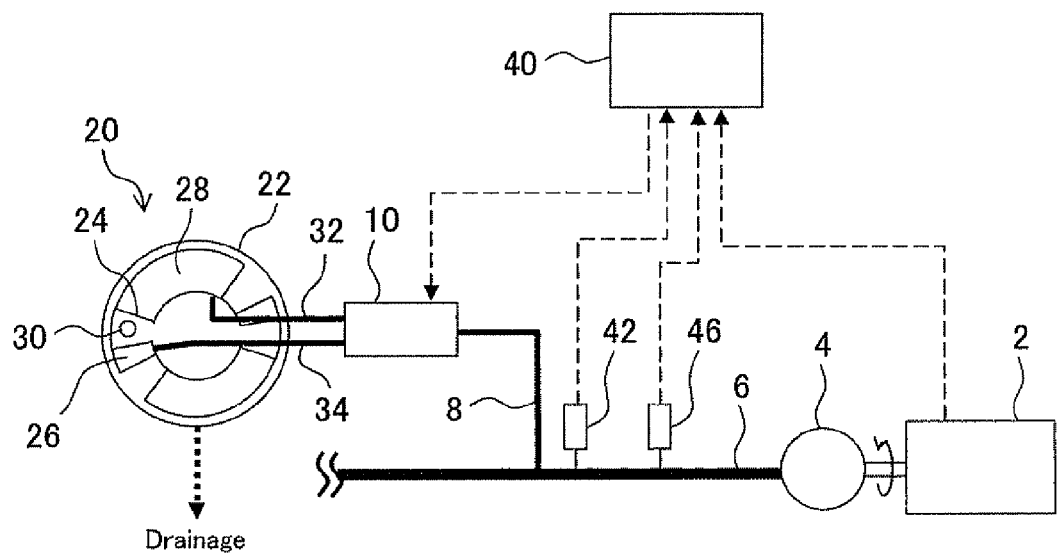
FIG. 16 schematically shows the configuration of a valve timing control device according to a fourth embodiment of the present invention.

The configuration of the valve timing control device according to the fourth embodiment can be outlined with reference to FIG. 16. FIG. 16 shows a hydraulic circuit for the valve timing control device according to the present embodiment. In FIG. 16, parts and sections identical with those included in the configuration shown in FIG. 1 are assigned the same reference numerals as in FIG. 1. The device shown in FIG. 16 differs from the device shown in FIG. 1 in that the main oil gallery 6 of the device shown in FIG. 16 is provided with an oil temperature sensor 46. In the other respects, the device shown in FIG. 16 is configured the same as the device shown in FIG. 1. The oil temperature sensor 46 may be installed in the VVT line 8 for the same reason that the hydraulic pressure sensor 42 may be installed in the VVT line 8 (see the hydraulic pressure sensor 44 in FIG. 6).

The valve timing control device according to the present embodiment is similar to that according to the first embodiment in that VVT operation inhibition control is exercised immediately after engine startup. Exercising VVT operation inhibition control according to the first embodiment makes it possible to judge the oil viscosity in accordance with the pace at which the hydraulic pressure rises, and reflect the oil viscosity in operation inhibition time setup.

However, the method of judging the oil viscosity in accordance with the pace at which the hydraulic pressure rises is not perfectly free from the possibility of erroneous oil viscosity judgment. If, for instance, the behavior of a hydraulic pressure rise changes for some reason, the relationship between the hydraulic pressure rise delay time and oil viscosity changes. If the oil viscosity is erroneously judged to be lower than the actual oil viscosity, the operation inhibition, time is set to be shorter than the required operation inhibition time. This causes the VVT 20 to operate before oil charging is complete. In such an instance, a problem such as the generation of a tapping sound may occur depending on the degree of oil charging amount insufficiency for the operation of the VVT 20. If, on the contrary, the oil viscosity is erroneously judged to be higher than the actual oil viscosity, the operation inhibition time is set to be unnecessarily long. This delays the start of valve timing control.

In view of the above circumstances, the valve timing control device according to the present embodiment minimizes the influence of erroneous oil viscosity judgment by using a lower-limit guard value and upper-limit guard value to limit the acceptable setting range of the operation inhibition time for the VVT 20. The lower-limit guard value corresponds to the operation inhibition time for the use of the lowest-viscosity oil, whereas the upper-limit guard value corresponds to the operation inhibition time for the use of the highest-viscosity oil. Here, the lowest-viscosity oil represents a fresh low-viscosity oil having the lowest viscosity among commercially available oils, whereas the highest-viscosity oil represents a deteriorated high-viscosity oil having the highest viscosity among commercially available oils.

Meanwhile, the oil viscosity has temperature dependence. Although the oil viscosity is high in a low-temperature region, it lowers with an increase in the oil temperature. Since the VVT operation inhibition time responds to the oil viscosity, the lower-limit guard value, which corresponds to the operation inhibition time for the use of a fresh low-viscosity oil, varies with the oil temperature. Similarly, the upper-limit guard value, which corresponds to the operation inhibition time for the use of a deteriorated high-viscosity oil, also varies with the oil temperature.

Figure 17:
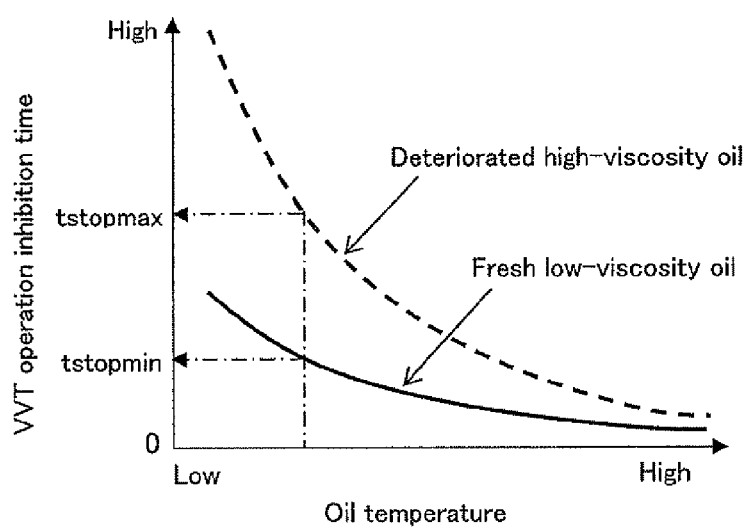
FIG. 17 shows a map used to determine a lower-limit guard value and an upper-limit guard value for VVT operation inhibition time from the oil temperature prevailing at engine startup.

The ECU 40 stores a map shown in FIG. 17. This map is used to determine the lower-limit guard value (tstopmin) and upper-limit guard value (tstopmax) for the VVT operation inhibition time from the oil temperature prevailing at engine startup. The map stores a characteristic curve (indicated by solid line) indicating the relationship between the operation inhibition time and oil temperature of fresh low-viscosity oil and a characteristic curve (indicated by broken line) indicating the relationship between the operation inhibition time and oil temperature of deteriorated high-viscosity oil. The map makes it possible to determine the lower-limit guard value (tstopmin) and upper-limit guard value (tstopmax) by comparing the characteristic curves with oil temperatures measured by the oil temperature sensor 46 at engine startup.

Figure 18:
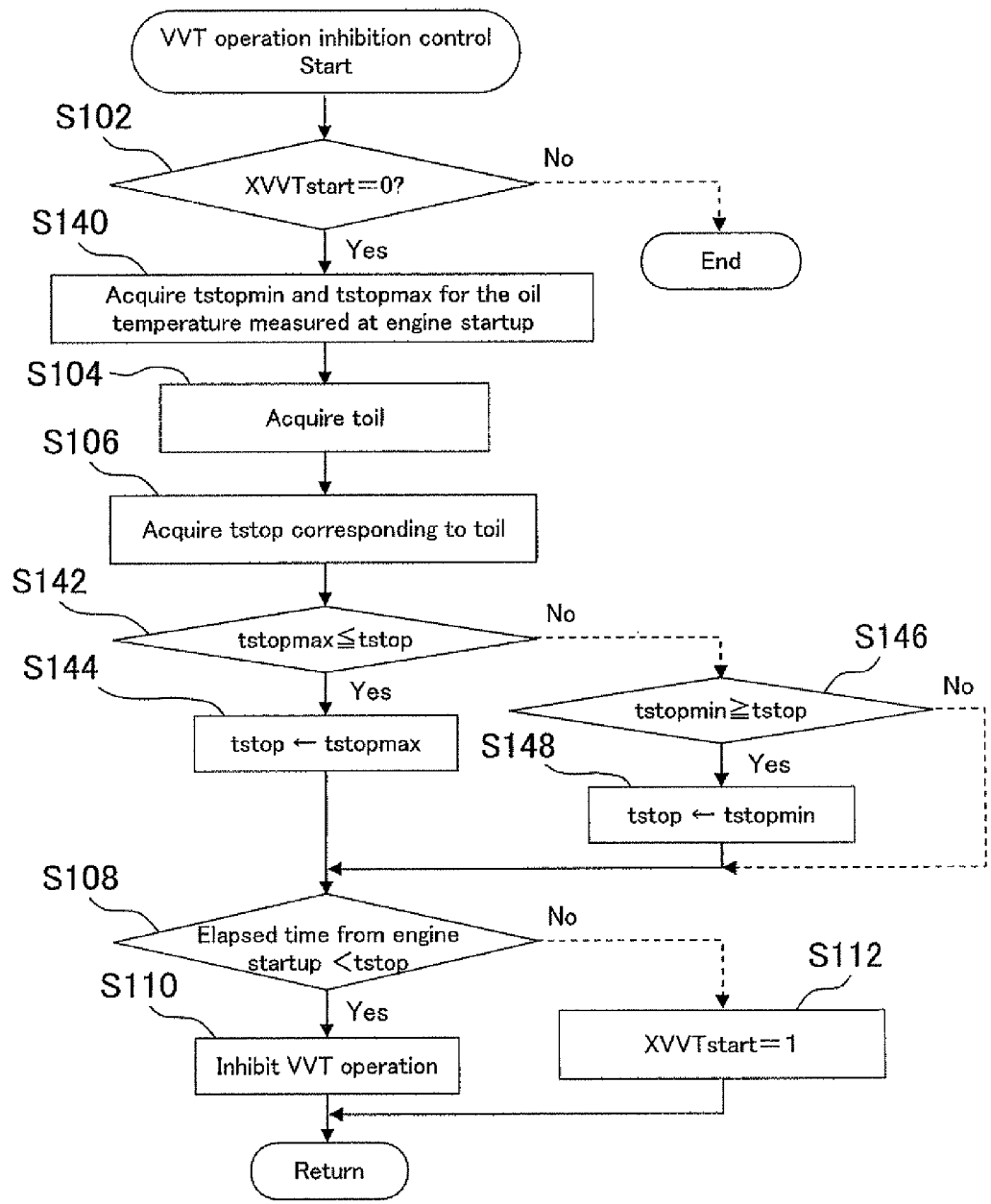
FIG. 18 is a flowchart illustrating a VVT operation inhibition control routine that is executed by a fourth embodiment of the present invention.

The map shown in FIG. 17 is used during VVT operation inhibition control, which is exercised immediately after the start of the engine 2. FIG. 18 is a flowchart illustrating a routine that is executed for VVT operation inhibition control. Immediately after the start of the engine 2, the ECU 40 executes the routine shown in FIG. 18 at regular intervals. In FIG. 18, processing steps identical with those of the VVT operation inhibition control routine according to the first embodiment are assigned the same step numbers as for the first embodiment. The processing steps common to the first and fourth embodiments will not be redundantly described or will be briefly described below.

First of all, the routine shown in FIG. 18 performs step S102 to judge in accordance with the value of the flag XVVTstart whether the VVT operation is inhibited immediately after engine startup. If the value of the flag XVVTstart is 1, that is, if the VVT operation inhibition is canceled, the routine terminates.

If the judgment result obtained in step S102 indicates that the VVT operation is inhibited, the routine proceeds to step S140. Step S140 is performed to acquire the lower-limit guard value (tstopmin) and upper-limit guard value (tstopmax) for the oil temperature measured at engine startup in accordance with the map shown in FIG. 17. The routine then proceeds to steps S104 and S106. Step S104 is performed to acquire the hydraulic pressure rise delay time (toil) prevailing after engine startup. Step S106 is performed to acquire the VVT operation inhibition time (tstop) corresponding to the hydraulic pressure rise delay time (toil) in accordance with the map shown in FIG. 4.

Next, step S142 is performed to compare the VVT operation inhibition time (tstop) against the upper-limit guard value (tstopmax). If the result of comparison indicates that the VVT operation inhibition time (tstop) is greater than the upper-limit guard value (tstopmax), the routine proceeds to step S144. In step S144, the setting for the VVT operation inhibition time (tstop) is replaced by the upper-limit guard value (tstopmax).

If, on the other hand, the VVT operation inhibition time (tstop) is smaller than the upper-limit guard value (tstopmax), the routine proceeds to step S146 for judgment purposes. In step S146, the VVT operation inhibition time (tstop) is compared against the lower-limit guard value (tstopmin). If the result of comparison indicates that the VVT operation inhibition time (tstop) is smaller than the lower-limit guard value (tstopmin), the routine proceeds to step S148. In step S148, the setting for the VVT operation inhibition time (tstop) is replaced by the lower-limit guard value (tstopmin).

If the VVT operation inhibition time (tstop) is greater than the lower-limit guard value (tstopmin), that is, between the lower-limit guard value (tstopmin) and upper-limit guard value (tstopmax), the value acquired in step S106 is directly set as the VVT operation inhibition time (tstop). A series of processing steps for determining the VVT operation inhibition time (tstop), which begins with step S140, is performed only once (although it is not indicated in the flowchart). The VVT operation inhibition time (tstop) determined upon initial execution is retained until the routine is completed.

Next, step S108 is performed to judge whether the elapsed time from engine startup has reached the VVT operation inhibition time (tstop). If the elapsed time from engine startup has not reached the VVT operation inhibition time (tstop), the routine proceeds to step S110. In step S110, the operation of the VVT 20 is continuously inhibited. If, on the other hand, the elapsed time from engine startup has reached the VVT operation inhibition time (tstop), the routine proceeds to step S112. Step S112 is performed to cancel the operation inhibition on the VVT 20 and set the flag XVVTstart to 1.

When the above routine is executed, the lower-limit guard value (tstopmin) and upper-limit guard value (tstopmax) are determined from the oil temperature measured at engine startup so that the setting for the VVT operation inhibition time (tstop) is limited between the lower-limit guard value (tstopmin) and upper-limit guard value (tstopmax). The above limitation ensures that the VVT operation inhibition time (tstop) is not shorter than the lower-limit guard value (tstopmin) even when the hydraulic pressure rise delay time (toil) is unduly short due to abnormal behavior of hydraulic pressure. In contrast, the above limitation also ensures that the VVT operation inhibition time (tstop) is not longer than the upper-limit guard value (tstopmin) even when the hydraulic pressure rise delay time (toil) is unduly long.

Consequently, even when the oil viscosity is erroneously judged due to abnormal behavior of hydraulic pressure immediately after engine startup, the valve timing control device according to the present embodiment minimizes the adverse effects of erroneous oil viscosity judgment on a system operation. More specifically, it is possible to avoid a problem arising out of insufficient oil charging during the operation of the VVT 20, such as the generation of a tapping sound. It is also possible to avoid a problem arising out of a situation where the operation of the VVT 20 is continuously inhibited in spite of sufficient oil charging, such as the delay in the start of valve timing control.

In the fourth embodiment, the oil temperature sensor 46 corresponds to the "start oil temperature measurement means" according to the twenty-second aspect of the present invention. In the fourth embodiment, the "lower-limit guard value setup means" according to the twenty-second aspect of the present invention and the "upper-limit guard value setup means" according to the twenty-third aspect of the present invention are implemented when the ECU 40 performs step S140 of the routine shown in FIG. 18 by using the map shown in FIG. 17. Further, the "lower-limit guard means" according to the twenty-second aspect of the present invention is implemented when the ECU 40 performs steps S146 and S148 of the routine shown in FIG. 18. Furthermore, the "upper-limit guard means" according to the twenty-third aspect of the present invention is implemented when the ECU 40 performs steps S142 and S144. The correlations between the fourth embodiment and the other aspects of the present invention are the same as the correlations between the first embodiment and the other aspects of the present invention.

The fourth embodiment assumes that the hydraulic pressure rise delay time (toil) is used as the index value indicating the pace at which the hydraulic pressure rises. However, the hydraulic pressure rise time (soil) may alternatively be used as the index value as is the case with the second embodiment. When such an alternative is used, steps S104 and S106 of the routine shown in FIG. 18 are replaced by steps S120 and S122 of the routine shown in FIG. 11.

Further, the fourth embodiment sets the lower-limit guard value (tstopmin) and upper-limit guard value (tstopmax) for the VVT operation inhibition time (tstop). However, an alternative would be to set the lower-limit guard value (tstopmin) only. The reason is that a serious physical problem such as the generation of a tapping sound may occur when the oil viscosity is erroneously judged to be low. However, when the oil viscosity is erroneously judged to be high, it merely delays the start of valve timing control and does not cause any serious physical problem.

Fifth Embodiment

The valve timing control device according to a fifth embodiment of the present invention will now be described with reference to FIGS. 1, 4, and 19 to 21.

The valve timing control device according to the fifth embodiment includes a hydraulic circuit, which is configured the same as that of the first embodiment. Therefore, the following description assumes that the employed hydraulic circuit is configured the same as in the first embodiment, which is shown in FIG. 1.

The valve timing control device according to the fifth embodiment is similar to that according to the first embodiment in that VVT operation inhibition control is exercised immediately after engine startup. VVT operation inhibition control according to the first embodiment is exercised in consideration of the fact that the oil viscosity is represented by the pace at which the hydraulic pressure rises. More specifically, the first embodiment determines the hydraulic pressure rise delay time as the index value indicating the pace at which the hydraulic pressure rises, and sets the operation inhibition time in accordance with the hydraulic pressure rise delay time.

Strictly speaking, however, the hydraulic pressure behavior prevailing at engine startup depends not only on the oil viscosity but also on the oil discharge rate of the oil pump 4. At engine startup, the hydraulic pressure rises slowly when the oil viscosity is high and rises quickly when the oil discharge rate is high. The oil discharge rate is determined by the cumulative number of rotations of the oil pump 4. However, the rotation speed of the oil pump 4 is proportional to the rotation speed of the engine 2. Therefore, it can be said that the oil discharge rate is determined by the cumulative number of rotations of the engine 2. Consequently, it can be said that the hydraulic pressure rise delay time is in proportion to the oil viscosity and in inverse proportion to the cumulative number of engine rotations.

The first embodiment presumes that a curve indicating an increase in the engine rotation speed at startup is always constant, and that the hydraulic pressure rise delay time corresponds to the cumulative number of engine rotations on a one-to-one basis. Therefore, if the curve indicating an increase in the engine rotation speed varies, the relationship between the hydraulic pressure rise delay time and oil viscosity changes. Consequently, the actual oil viscosity cannot be accurately reflected in operation inhibition time setup.

In view of the above circumstances, the valve timing control device according to the fifth embodiment sets the operation inhibition time for the VVT 20 in consideration of not only the hydraulic pressure rise delay time but also the actual cumulative number of engine rotations from engine startup.

Figure 19:
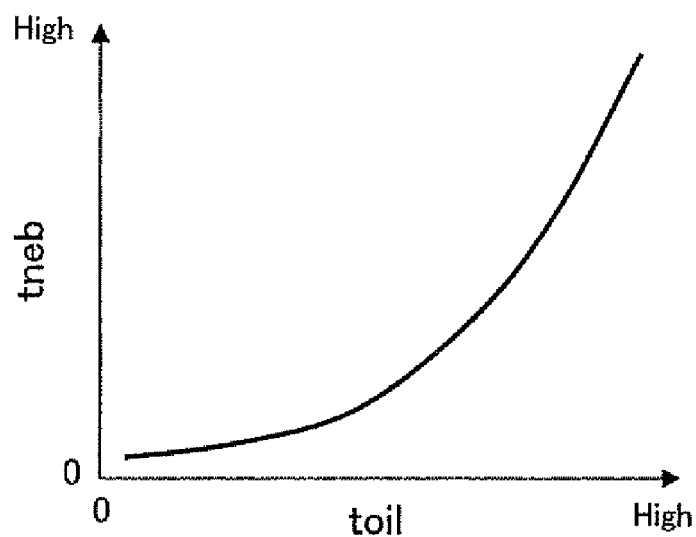
FIG. 19 shows a map used to determine a reference cumulative number of engine rotations from hydraulic pressure rise delay time.
Figure 20:
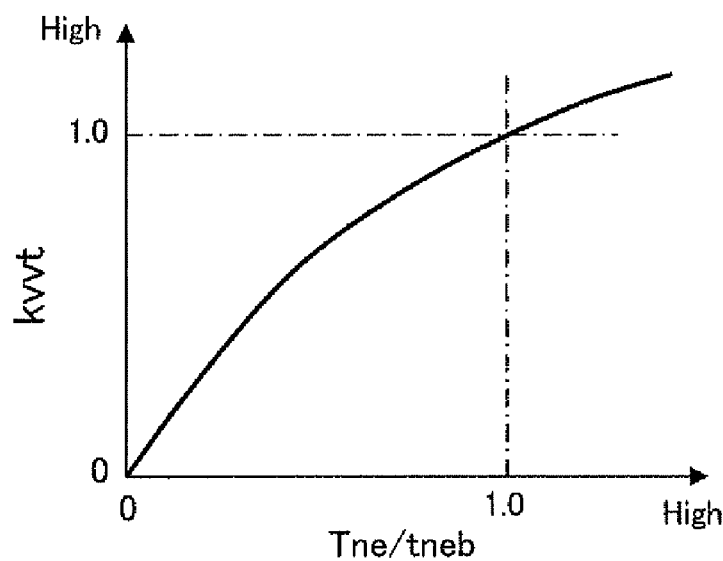
FIG. 20 shows a map used to determine a correction coefficient for the VVT operation inhibition time from the ratio between an actual cumulative number of engine rotations and a reference cumulative number of engine rotations.

Therefore, the ECU 40 stores a map shown in FIG. 19 and a map shown in FIG. 20. The map shown in FIG. 19 is used to determine the reference cumulative number of engine rotations (tneb) from the hydraulic pressure rise delay time (toil). The map shown in FIG. 20 is used to determine a correction coefficient (kvvt) for the VVT operation inhibition time from the ratio between the actual cumulative number of engine rotations (Tne) and the reference cumulative number of engine rotations (tneb). This map sets the correction coefficient (kvvt) to 1 when the actual cumulative number of engine rotations (Tne) is equal to the reference cumulative number of engine rotations (tneb).

Figure 21:
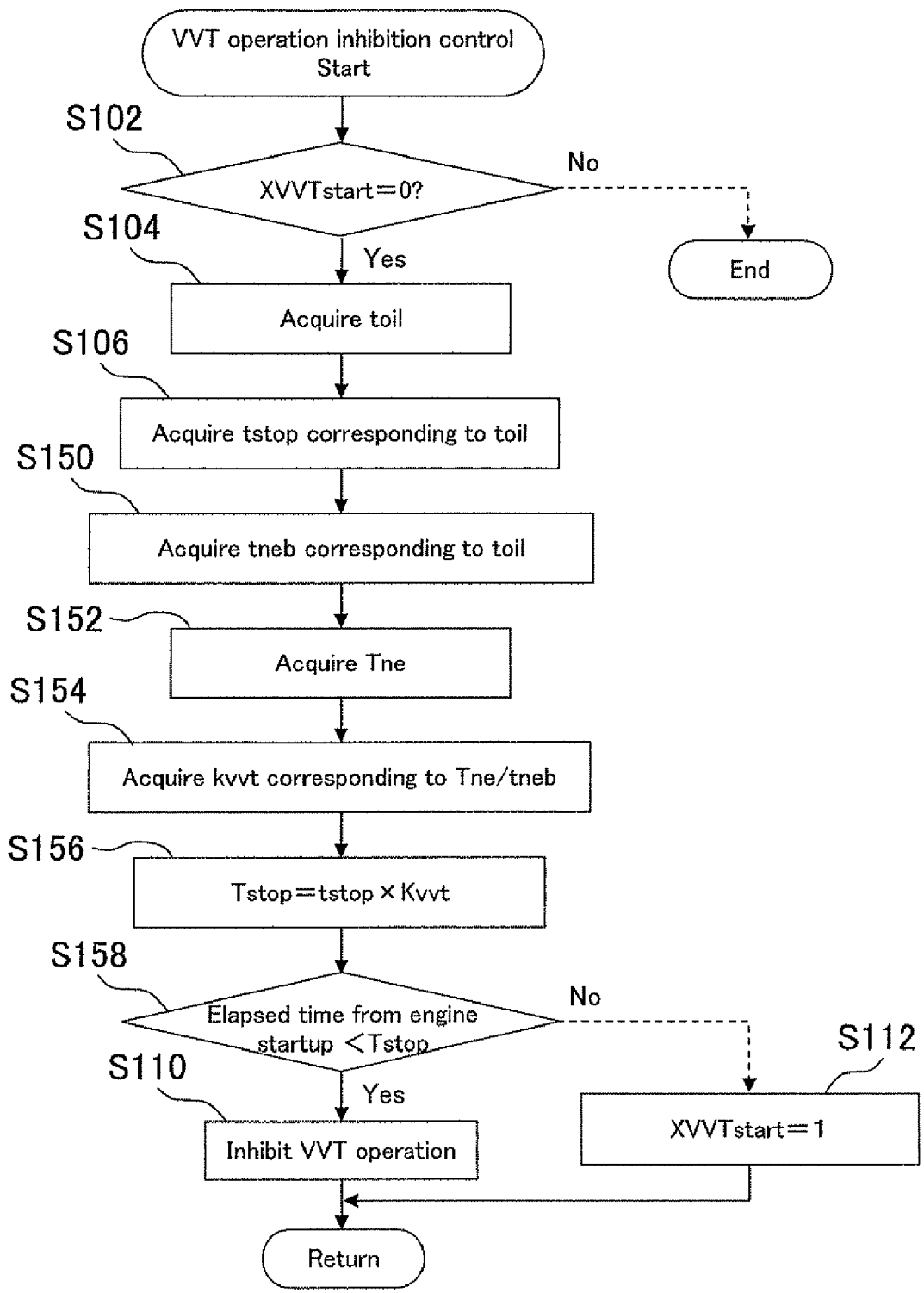
FIG. 21 is a flowchart illustrating a VVT operation inhibition control routine that is executed by a fifth embodiment of the present invention.

The map shown in FIG. 19 and the map shown in FIG. 20 are used for VVT operation inhibition control, which is exercised immediately after the start of the engine 2. FIG. 21 is a flowchart illustrating a routine that is executed for VVT operation inhibition control. Immediately after the start of the engine 2, the ECU 40 executes the routine shown in FIG. 21 at regular intervals. In FIG. 21, processing steps identical with those of the VVT operation inhibition control routine according to the first embodiment are assigned the same step numbers as for the first embodiment. The processing steps common to the first and fifth embodiments will not be redundantly described or will be briefly described.

First of all, the routine shown in FIG. 21 performs step S102 to judge in accordance with the value of the flag XVVTstart whether the VVT operation is inhibited immediately after engine startup. If the value of the flag XVVTstart is 1, that is, if the VVT operation inhibition is canceled, the routine terminates.

If the judgment result obtained in step S102 indicates that the VVT operation is inhibited, the routine proceeds to steps S104 and S106. Step S104 is performed to acquire the hydraulic pressure rise delay time (toil) prevailing after engine startup. Step S106 is performed to acquire the VVT operation inhibition time (tstop) corresponding to the hydraulic pressure rise delay time (toil) in accordance with the map shown in FIG. 4.

Next, the routine proceeds to steps S150, S152, and S154. Step S150 is performed to acquire the reference cumulative number of engine rotations (tneb) corresponding to the hydraulic pressure rise delay time (toil) in accordance with the map shown in FIG. 19. Step S152 is performed to acquire the cumulative number of engine rotations (Tne) between the instant at which the engine 2 starts and the instant at which the measured hydraulic pressure reaches the rise judgment hydraulic pressure. Step S154 is performed to acquire the correction coefficient (kvvt) corresponding to the ratio between the actual cumulative number of engine rotations (Tne) and the reference cumulative number of engine rotations (tneb) in accordance with the map shown in FIG. 20.

Next, step S156 is performed to calculate final VVT operation inhibition time (Tstop) by multiplying the VVT operation inhibition time (tstop) by the correction coefficient (kvvt). A series of processing steps for determining the final VVT operation inhibition time (Tstop), which begins with step S104, is performed only once (although it is not indicated in the flowchart). The final VVT operation inhibition time (Tstop) determined upon initial execution is retained until the routine is completed.

Next, step S158 is performed to judge whether the elapsed time from engine startup has reached the final VVT operation inhibition time (Tstop). If the elapsed time from engine startup has not reached the final VVT operation inhibition time (Tstop), the routine proceeds to step S110. In step S110, the operation of the VVT 20 is continuously inhibited. If, on the other hand, the elapsed time from engine startup has reached the final VVT operation inhibition time (Tstop), the routine proceeds to step S112. Step S112 is performed to cancel the operation inhibition on the VVT 20 and set the flag XVVTstart to 1.

In the above routine, the ratio between the actual cumulative number of engine rotations (Tne) and the reference cumulative number of engine rotations (tneb) corresponds to the ratio between the actual oil discharge rate and design oil discharge rate of the oil pump 4. Therefore, when the VVT operation inhibition time (tstop) is corrected in accordance with the former ratio (Tne/tneb), it is possible to ensure that the setting for the operation inhibition time remains unaffected by the difference between the actual discharge rate and design discharge rate of the oil pump 4. Consequently, the valve timing control device according to the present embodiment ensures that a more accurate viscosity of employed oil can be reflected in operation inhibition time setup.

In the fifth embodiment, the "reference cumulative number-of-rotations storage means" according to the twenty-first aspect of the present invention is implemented when the ECU 40 stores the map shown in FIG. 19. Further, the "actual cumulative number-of-rotations calculation means" according to the twenty-first aspect of the present invention is implemented when the ECU 40 performs step S152 of the routine shown in FIG. 21. Furthermore, the "operation inhibition time correction means" according to the twenty-first aspect of the present invention is implemented when the ECU 40 performs steps S150, S154, and S156 of the routine shown in FIG. 21 by using the maps shown in FIGS. 19 and 20. The correlations between the fifth embodiment and the other aspects of the present invention are the same as the correlations between the first embodiment and the other aspects of the present invention.

The fifth embodiment uses the hydraulic pressure rise delay time (toil) as the index value indicating the pace at which the hydraulic pressure rises. However, the hydraulic pressure rise time (soil) may alternatively be used as the index value as is the case with the second embodiment. When such an alternative is used, steps S104 and S106 of the routine shown in FIG. 21 are replaced by steps S120 and S122 of the routine shown in FIG. 11. Further, the ECU 40 stores a map defining the relationship between the hydraulic pressure rise time (soil) and the reference cumulative number of engine rotations (tneb) instead of the map shown in FIG. 19. Furthermore, step S150 of the routine shown in FIG. 21 is replaced by a processing step for determining the reference cumulative number of engine rotations (tneb) from the hydraulic pressure rise time (soil).

Sixth Embodiment

The valve timing control device according to a sixth embodiment of the present invention will now be described with reference to FIGS. 4, 16, and 22 to 24.

The valve timing control device according to the sixth embodiment includes a hydraulic circuit, which is configured the same as that of the fourth embodiment. Therefore, the following description assumes that the employed hydraulic circuit is configured the same as in the fourth embodiment, which is shown in FIG. 16. However, VVT operation inhibition control according to the sixth embodiment, which is exercised immediately after engine startup, is based on VVT operation inhibition control according to the first embodiment.

The first embodiment presumes that the hydraulic pressure rises in accordance with a quick increase in the engine rotation speed at the start of the engine 2, determines the hydraulic pressure rise delay time as the index value indicating the pace at which the hydraulic pressure rises, and sets the operation inhibition time in accordance with the hydraulic pressure rise delay time. However, the operation of the engine 2 is not always stable during startup. Therefore, the engine rotation speed may temporarily decrease due to a misfire in some cylinders.

Figure 22:
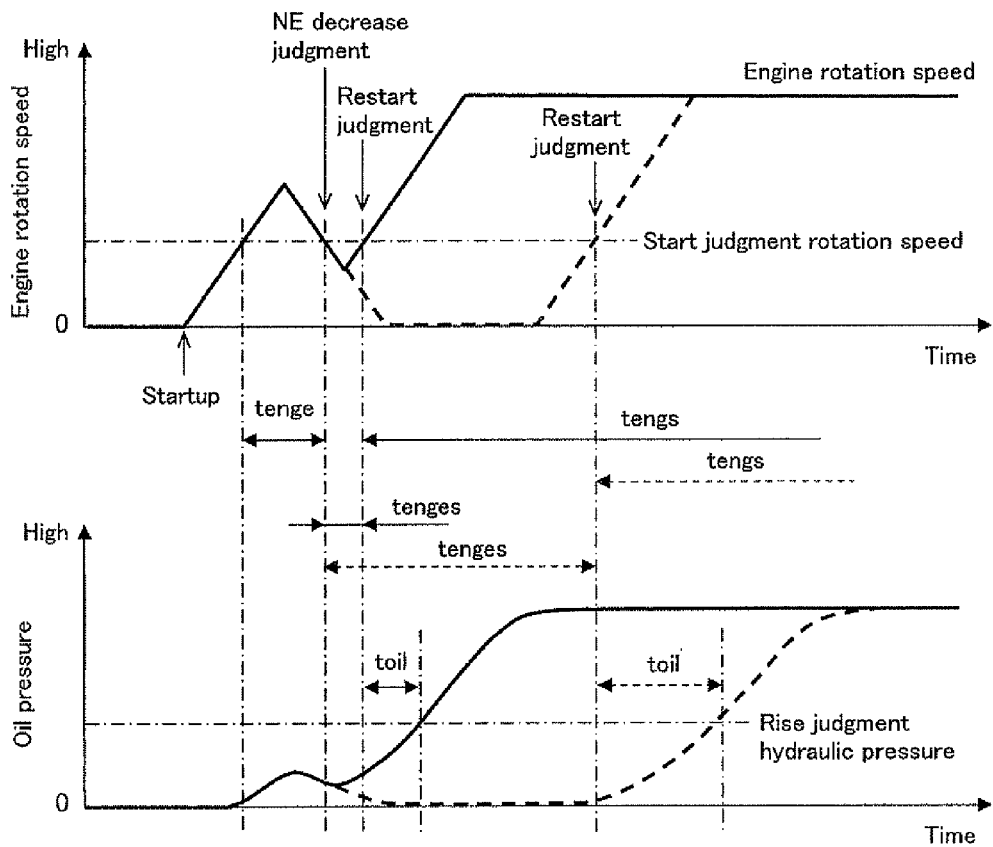
FIG. 22 shows how the hydraulic pressure behaves when an engine temporarily stalls during a cold start of the engine.

FIG. 22 shows how the hydraulic pressure behaves when the engine 2 temporarily stalls during a cold start of the engine 2. In FIG. 22, solid lines are used to indicate how the engine rotation speed changes when a restart is performed immediately after a stall and indicate how the hydraulic pressure changes when such engine rotation speed changes occur. Further, broken lines are used to indicate how the engine rotation speed changes when a restart is performed sometime after a stall and indicate how the hydraulic pressure changes when such engine rotation speed changes occur. A comparison between the above two cases reveals that the hydraulic pressure prevailing at a restart significantly varies with the elapsed time between a stall of the engine 2 and a restart.

As shown in FIG. 22, when the engine rotation speed exceeds the start judgment rotation speed, the sixth embodiment judges that the engine 2 is started. If, on the contrary, the engine rotation speed drops below the start judgment rotation speed, the present embodiment judges that the engine 2 has stalled. Therefore, the stall time of the engine 2 is equal to the elapsed time (tenges) between the instant at which the engine 2 stalls (an NE decrease judgment time point shown in FIG. 22) and the instant at which the engine 2 restarts later (a restart judgment time point shown in FIG. 22).

In the case indicated by a solid line in FIG. 22, the stall time (tenges) is short so that the decrease in hydraulic pressure during the stall time is slight. In other words, the hydraulic pressure raised between the start and stall of the engine 2 is maintained. Therefore, the elapsed time between the instant at which the engine 2 restarts and the instant at which the hydraulic pressure measured by the hydraulic pressure sensor 42 reaches a predetermined rise judgment hydraulic pressure, that is, the hydraulic pressure rise delay time (toil), is shortened by the increase in the hydraulic pressure at the restart.

In the case indicated by a broken line in FIG. 22, on the other hand, the stall time (tenges) is long so that the hydraulic pressure is relieved by the end of the stall time. Therefore, the hydraulic pressure rises from a zero or near-zero state when the engine 2 restarts. Accordingly, the hydraulic pressure rise delay time (toil) is longer than in the case indicated by a solid line. In this instance, the hydraulic pressure rise delay time (toil) is substantially equal to that prevailing in a case where the engine 2 smoothly increases its rotation speed without a stall (e.g., a case shown in FIG. 2).

If the engine 2 stalls in the middle of its startup sequence, the hydraulic pressure rise delay time (toil) varies with the length of the stall time as described above although the oil viscosity remains unchanged. If, in such an instance, the operation inhibition time for the VVT 20 is simply determined from the hydraulic pressure rise delay time (toil), the VVT 20 may operate before the VVT 20 is fully charged with oil because of unduly short operation inhibition time.

In view of the above circumstances, the valve timing control device according to the present embodiment determines the operation inhibition time for the VVT 20 while considering the stall time (tenges) of the engine 2 as well. More specifically, when the stall time (tenges) is shorter than judgment time α, overall hydraulic pressure rise delay time (Toil) is determined by adding the elapsed time (tenge) between the initial start and stall to the hydraulic pressure rise delay time (toil). When, on the other hand, the stall time (tenges) is longer than the judgment time α, the hydraulic pressure rise delay time (toil) after a restart of the engine 2 is determined as the overall hydraulic pressure rise delay time (Toil).

Figure 23:
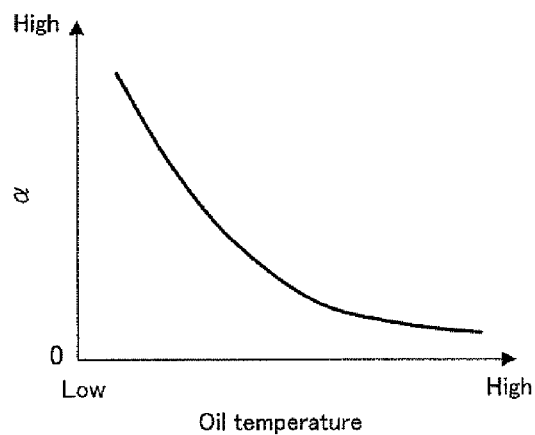
FIG. 23 shows a map used to determine judgment time ☐ from the oil temperature prevailing at engine startup.

FIG. 23 is a map that is used to determine the judgment time α from the oil temperature prevailing at engine startup. Hydraulic pressure changes with the stall time (tenges) vary with the oil temperature. The lower the oil temperature is, the lower the speed at which the hydraulic pressure is relieved becomes. The reason is that the oil viscosity depends on the oil temperature. Therefore, the accuracy of the overall hydraulic pressure rise delay time (Toil) can be enhanced by allowing the oil temperature sensor 46 to measure the oil temperature at engine startup and determining the judgment time a in accordance with the measured oil temperature.

Figure 24:
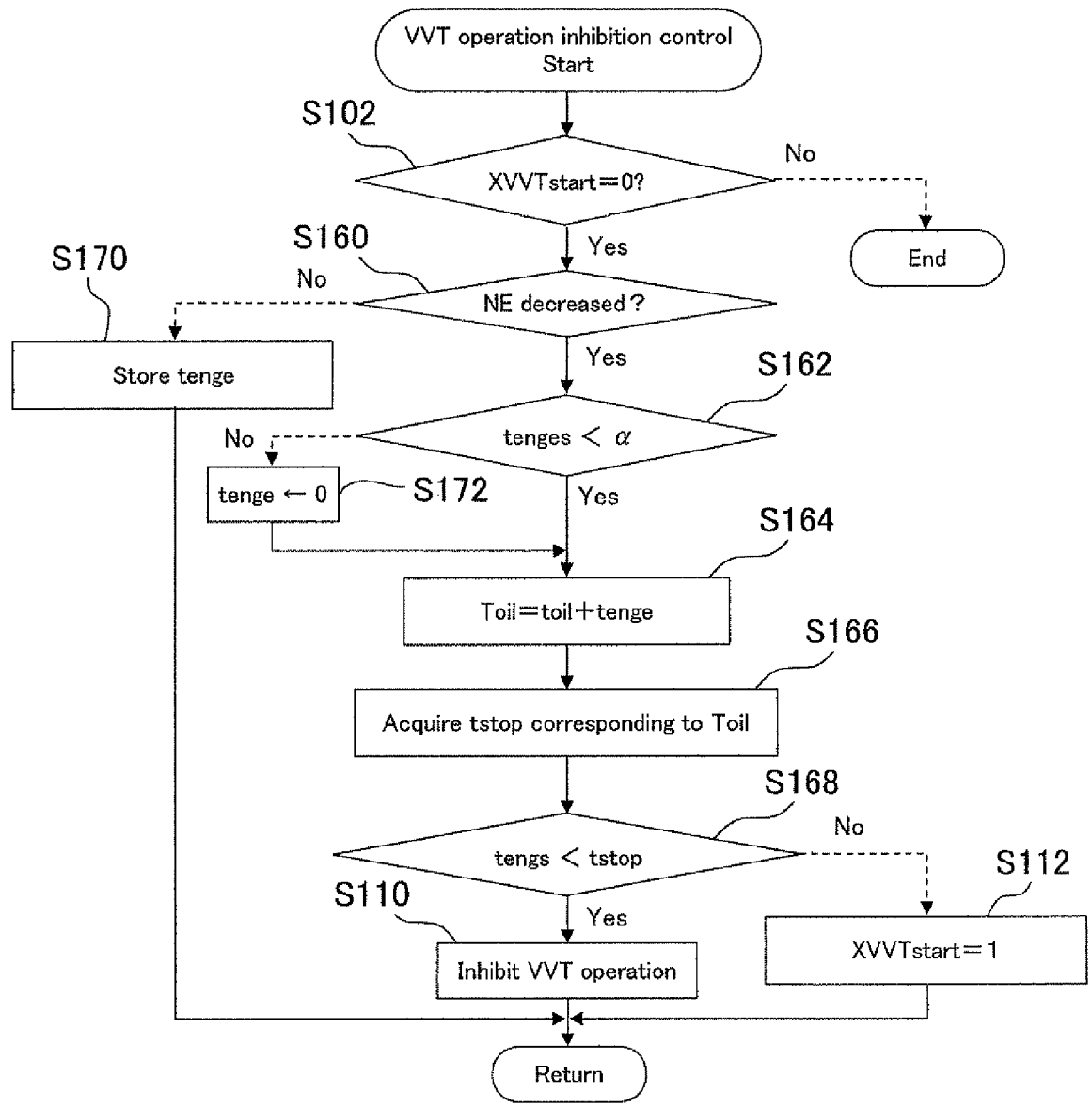
FIG. 24 is a flowchart illustrating a VVT operation inhibition control routine that is executed by a sixth embodiment of the present invention.

FIG. 24 is a flowchart illustrating a VVT operation inhibition control routine that the present embodiment executes immediately after a start of the engine 2. Immediately after the start of the engine 2, the ECU 40 executes the routine shown in FIG. 24 at regular intervals. In FIG. 24, processing steps identical with those of the VVT operation inhibition control routine according to the first embodiment are assigned the same step numbers as for the first embodiment. The processing steps common to the first and sixth embodiments will not be redundantly described or will be briefly described.

However, the routine shown in FIG. 24 is executed to provide VVT operation inhibition control in a situation where the engine 2 has stalled. If the engine 2 has not stalled, the routine shown in FIG. 5 is executed to provide VVT operation inhibition control as is the case with the first embodiment. The explanation of such VVT operation inhibition control is omitted here.

First of all, the routine shown in FIG. 24 performs step S102 to judge in accordance with the value of the flag XVVTstart whether the VVT operation is inhibited immediately after engine startup. If the value of the flag XVVTstart is 1, that is, if the VVT operation inhibition is canceled, the routine terminates.

If the judgment result obtained in step S102 indicates that the VVT operation is inhibited, the routine proceeds to step S160 for judgment purposes. Step S160 is performed to judge whether the engine rotation speed (NE) is decreased, or more specifically, judge whether the engine rotation speed is lower than the start judgment rotation speed. If the engine rotation speed is decreased, that is, the engine 2 has stalled, the routine proceeds to step S170. Step S170 is performed to store the elapsed time (tenge) between the initial start and stall.

If the judgment result obtained in step S160 indicates that the engine rotation speed has increased again and exceeded the start judgment rotation speed, the routine proceeds to step S162. Step S162 is performed to compare the stall time (tenges) against judgment time α. In accordance with the map shown in FIG. 23, a value corresponding to the oil temperature measured at engine startup is acquired as the judgment time α. If the stall time (tenges) is not shorter than the judgment time α, the routine proceeds to step S172. In step S172, the elapsed time (tenge) between engine startup and stall, which was stored in step S170, is reset to zero.

Step S164 is performed to acquire the overall hydraulic pressure rise delay time (Toil). The overall hydraulic pressure rise delay time (Toil) is obtained by adding the elapsed time (tenge) to the hydraulic pressure rise delay time (toil) prevailing after an engine restart. If the stall time (tenges) is not shorter than the judgment time α, step S172 is performed to reset the elapsed time (tenge). As a result, the hydraulic pressure rise delay time (toil) prevailing after an engine restart is directly used as the overall hydraulic pressure rise delay time (Toil).

Next, step S166 is performed to acquire the VVT operation inhibition time (tstop) corresponding to the overall hydraulic pressure rise delay time (Toil) in accordance with the map shown in FIG. 4.

Next, step S168 is performed to judge whether the elapsed time from an engine restart (tengs) has reached the VVT operation inhibition time (tstop). The elapsed time from an engine restart (tengs) is the time elapsed after the start judgment rotation speed is reached by the engine rotation speed subsequently to a stall of the engine 2. If the elapsed time from an engine restart (tengs) has not reached the VVT operation inhibition time (tstop), the routine performs step S110 to continuously inhibit the operation of the VVT 20. If, on the other hand, the elapsed time from an engine restart (tengs) has reached the VVT operation inhibition time (tstop), the routine proceeds to step S112. Step S112 is performed to cancel the operation inhibition on the VVT 20 and set the flag XVVTstart to 1.

If the engine 2 restarts immediately after a stall, the routine described above adds the elapsed time (tenge) measured before the stall to the hydraulic pressure rise delay time (toil) prevailing after an engine restart. This makes it possible to calculate the operation inhibition time according to the oil viscosity and prevent the VVT 20 from operating before completion of sufficient oil charging. If, on the other hand, the engine 2 restarts sometime after a stall, the operation inhibition time is set only in accordance with the hydraulic pressure rise delay time (toil) prevailing after an engine restart. This prevents the operation of the VVT 20 from being inhibited for an unduly long period of time. In other words, even when the engine 2 stalls in the middle of its startup sequence, the valve timing control device according to the present embodiment can reflect an accurate oil viscosity in operation inhibition time setup and accurately control the operation of the VVT 20.

In the sixth embodiment, the "index value acquisition means" according to the nineteenth aspect of the present invention is implemented when the ECU 40 performs steps S160, S162, S164, S170, and S172 of the routine shown in FIG. 24. The correlations between the sixth embodiment and the other aspects of the present invention are the same as the correlations between the first embodiment and the other aspects of the present invention.

Seventh Embodiment

The valve timing control device according to a seventh embodiment of the present invention will now be described with reference to FIGS. 16 and 25 to 27.

The valve timing control device according to the seventh embodiment includes a hydraulic circuit, which is configured the same as that of the fourth embodiment. Therefore, the following description assumes that the employed hydraulic circuit is configured the same as in the fourth embodiment, which is shown in FIG. 16. However, VVT operation inhibition control according to the seventh embodiment, which is exercised immediately after engine startup, is based on VVT operation inhibition control according to the first embodiment.

The first embodiment presumes that the oil chambers 26, 28 of the VVT 20 are empty at the start of the engine 2, and inhibits the operation of the VVT 20 for a period of time required for charging the VVT 20 with oil. In reality, however, oil may remain in the VVT 20. It means that oil charging does not always begin while the oil chambers 26, 28 are empty. If there is any remaining oil in the retarding oil chamber 28 of the VVT 20, the time required for oil charging shortens in accordance with the amount of remaining oil. In other words, the larger the amount of oil remaining in the retarding oil chamber 28 at engine startup, the shorter the required operation inhibition time for the VVT 20.

The amount of oil remaining in the retarding oil chamber 28 at engine startup is equivalent to the value obtained by subtracting the amount of oil leakage during an inactivity period of the engine 2 from the capacity of the retarding oil chamber 28. The amount of oil leakage depends on the elapsed time from the instant at which the oil pump 4 stops rotating due to a stop of the engine 2. The longer the elapsed time from engine stoppage, the larger the total amount of oil leakage. However, the amount of oil leakage per unit time, that is, the rate of oil leakage, does not remain constant but varies with the oil temperature.

Figure 25:
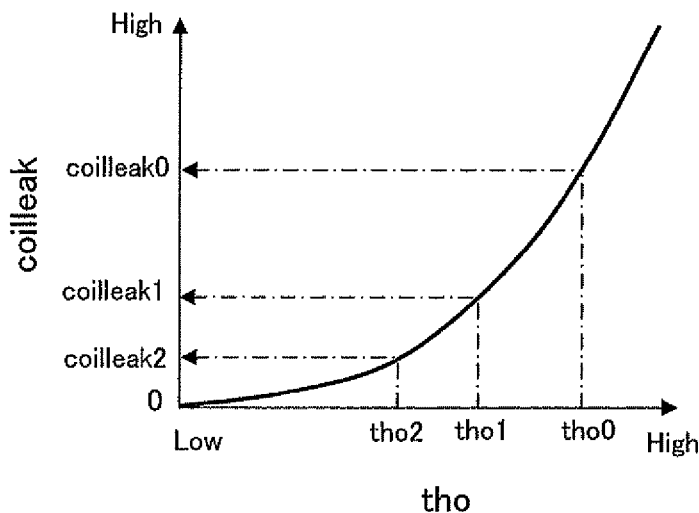
FIG. 25 shows a map used to determine an hourly oil leakage amount from oil temperature.

FIG. 25 shows the relationship between an hourly oil leakage amount (coilleak) and oil temperature (tho). The relationship between the oil leakage amount (coilleak) and the oil temperature (tho) can be determined through an experiment. As shown in the figure, the oil leakage amount (coilleak) decreases to near zero with a decrease in the oil temperature (tho). The reason is that the oil viscosity increases with a decrease in the oil temperature (tho) although the possibility of oil leakage through clearances decreases with an increase in the oil viscosity.

Figure 26:
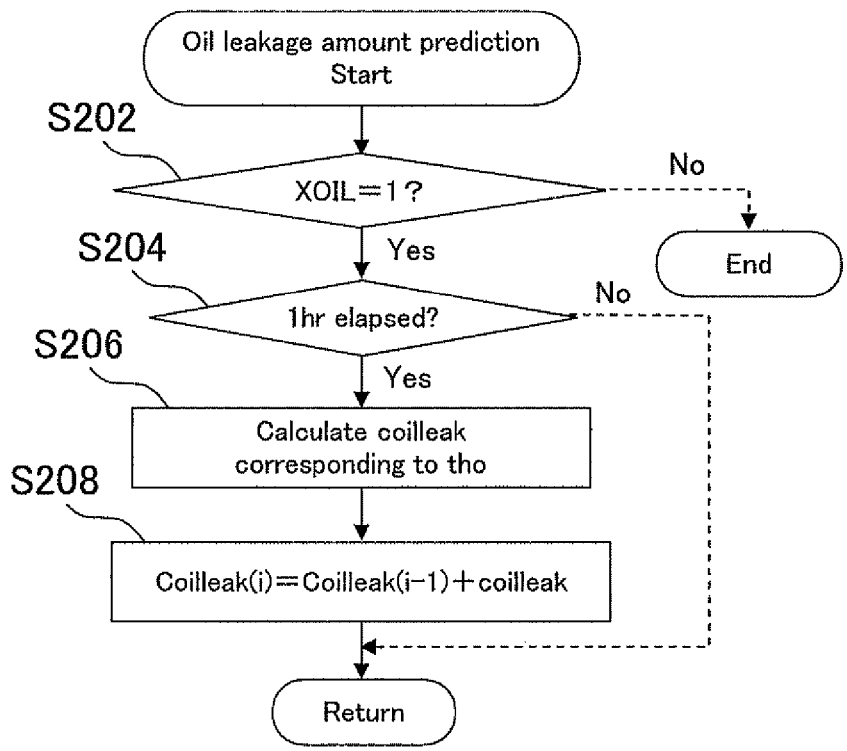
FIG. 26 is a flowchart illustrating an oil leakage amount prediction routine that is executed by a seventh embodiment of the present invention.

The relationship between the oil leakage amount (coilleak) and oil temperature (tho), which is shown in FIG. 25, is stored as map data in the ECU 40. The ECU 40 uses this map to predict the amount of oil leakage during an inactivity period of the engine 2. FIG. 26 is a flowchart illustrating an oil leakage amount prediction control routine that is executed during an inactivity period of the engine 2 in accordance with the seventh embodiment. While the engine 2 is inactive, the ECU 40 executes the routine shown in FIG. 26 at regular intervals.

First of all, the routine shown in FIG. 26 performs step S202 to judge in accordance with the value of a flag XOIL whether the oil leakage amount is being predicted. If the value of the flag XOIL is 1, the oil leakage amount is being predicted. If the value of the flag XOIL is 0, oil leakage amount prediction is terminated. The initial value of the flag XOIL is 1. The flag XOIL is set to zero when the engine 2 starts. When the value of the flag XOIL is zero, that is, when the engine 2 starts, the routine terminates.

Next, step S204 is performed to judge whether one hour has elapsed after a stop of the engine 2 or the last calculation of oil leakage amount. The present embodiment measures the oil temperature at one-hour intervals and determines the cumulative amount of oil leakage (coilleak) corresponding to the measured oil temperature (tho) to predict the total amount of oil leakage (Coilleak) after the stop of the engine. If the judgment result obtained in step S204 does not indicate that one hour has elapsed to signify the end of a measurement cycle, the subsequent processing steps are skipped so as to repeat the routine.

If, on the other hand, the judgment result obtained in step S204 indicates that one hour has elapsed to signify the end of a measurement cycle, the routine proceeds to step S206. In step S206, the oil temperature sensor 46 measures the oil temperature, and then the hourly oil leakage amount (coilleak), which corresponds to the measured oil temperature (tho), is calculated in accordance with the map shown in FIG. 25.

Next, step S208 is performed to calculate the cumulative amount of oil leakage (Coilleak) after the stop of the engine by using the hourly oil leakage amount (coilleak), which was calculated in step S206. The current cumulative oil leakage amount (Coilleak(i)) is determined by adding the current oil leakage amount (coilleak) to the previous cumulative oil leakage amount (Coilleak(i-1)).

Figure 27:
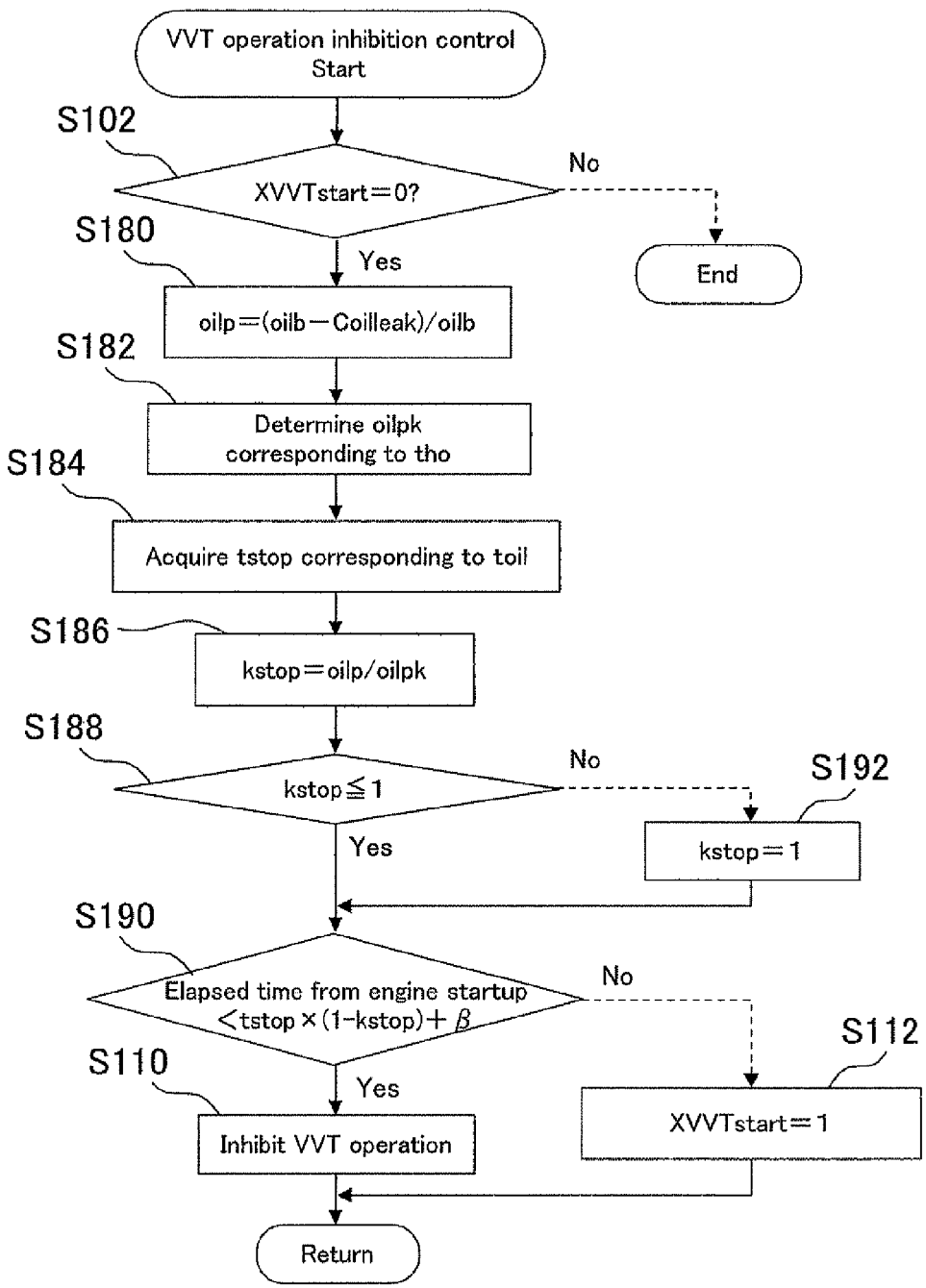
FIG. 27 is a flowchart illustrating a VVT operation inhibition control routine that is executed by a seventh embodiment of the present invention.

The cumulative oil leakage amount (Coilleak) calculated by the routine shown in FIG. 26 is used for VVT operation inhibition control, which is exercised immediately after a start of the engine 2. FIG. 27 is a flowchart illustrating a routine for VVT operation inhibition control. Immediately after the start of the engine 2, the ECU 40 executes the routine shown in FIG. 27 at regular intervals. In FIG. 27, processing steps identical with those of the VVT operation inhibition control routine according to the first embodiment are assigned the same step numbers as for the first embodiment. The processing steps common to the first and seventh embodiments will not be redundantly described or will be briefly described.

First of all, the routine shown in FIG. 27 performs step S102 to judge in accordance with the value of the flag XVVTstart whether the VVT operation is inhibited immediately after engine startup. If the value of the flag XVVTstart is 1, that is, if the VVT operation inhibition is canceled, the routine terminates.

If the judgment result obtained in step S102 indicates that the VVT operation is inhibited, the routine proceeds to step S180. Step S180 is performed to calculate an oil charge percentage (oilp) of the VVT 20 by using the cumulative oil leakage amount (Coilleak), which is calculated by the routine shown in FIG. 26. The oil charge percentage (oilp) is the ratio of the amount of remaining oil to the capacity of the retarding oil chamber 28 (olib), the amount of remaining oil being determined by subtracting the cumulative oil leakage amount (Coilleak) from the capacity of the retarding oil chamber 28 (olib).

Next, step S182 is performed to measure the oil temperature with the oil temperature sensor 46 and determine a VVT operation permission oil charge percentage (oilpk) that corresponds to the measured oil temperature (tho). The VVT operation permission oil charge percentage (oilpk), which is an oil charge percentage necessary for operating the VVT 20 without causing a problem such as the generation of a tapping sound, need not always be 100%. The lower the oil temperature and the higher the oil viscosity, the smaller the value of the VVT operation permission oil charge percentage (oilpk) may be. The reason is that the cushioning effect of oil increases with an increase in the oil viscosity. The relationship between the measured oil temperature (tho) and VVT operation permission oil charge percentage (oilpk) is stored in the ECU 40 as map data.

Next, step S184 is performed to acquire the hydraulic pressure rise delay time (toil) prevailing after engine startup, and acquire the VVT operation inhibition time (tstop) corresponding to the hydraulic pressure rise delay time (toil) and VVT operation permission oil charge percentage (oilpk) in accordance with a map (not shown). In the present embodiment, the VVT operation inhibition time (tstop) is defined as the time required for charging the VVT 20 with oil from an oil charge percentage of 0% to the VVT operation permission oil charge percentage (oilpk)

Next, step S186 is performed to calculate the ratio of the oil charge percentage (oilp), which was determined in step S180, to the VVT operation permission oil charge percentage (oilpk). The calculated ratio is used as a correction coefficient (kstop) for the VVT operation inhibition time. Next, step S188 is performed to judge whether the correction coefficient (kstop) is not greater than 1. If the correction coefficient (kstop) is greater than 1, step S192 is performed to change the correction coefficient (kstop) to 1. If the elapsed time from the last engine stop is short so that the oil leakage amount is small, the correction coefficient (kstop) may be greater than 1 because the oil charge percentage (oilp) is greater than the VVT operation permission oil charge percentage (oilpk).

Next, step S190 is performed to correct the VVT operation inhibition time (tstop) with the correction coefficient (kstop) that was obtained in step S186 or changed to 1 in step S192, The corrected VVT operation inhibition time is expressed by the equation tstop×(1−kstop)+β. The value β represents the minimum VVT operation inhibition time. A value appropriate for the oil temperature (tho) measured at engine startup is acquired as the value β in accordance with a map (not shown). The lower the oil temperature is and the higher the oil viscosity is, the greater the setting for the minimum VVT operation inhibition time (β) becomes.

Step S190 is continuously performed to judge whether the elapsed time from engine startup has reached the corrected VVT operation inhibition time (tstop×(1−kstop)+β). If the elapsed time from engine startup has not reached the corrected VVT operation inhibition time (tstop×(1−kstop)+β), the routine proceeds to step S110. In step S110, the operation of the VVT 20 is continuously inhibited. On the other hand, if the elapsed time from engine startup has reached the corrected VVT operation inhibition time (tstop×(1−kstop)+β), the routine proceeds to step S112. Step S112 is performed to cancel the operation inhibition on the VVT 20 and set the flag XVVTstart to 1.

The routine described above can ensure that both the oil viscosity prevailing at engine startup and the cumulative amount of oil leakage during a period of engine inactivity are reflected in operation inhibition time setup for the VVT 20. In addition, these two items of information can be both acquired before the operation of the VVT 20. Further, the cumulative oil leakage amount is calculated while considering both the inactivity period of the engine 2 and oil temperature changes during such an inactivity period. Therefore, the cumulative oil leakage amount prevailing at engine startup can be accurately judged. Consequently, the valve timing control device according to the present embodiment can set the optimum operation inhibition time in accordance with the amount of oil remaining in the VVT 20 at engine startup, and exercise valve timing control as early as possible after the start of the engine 2 without causing a problem such as the generation of a tapping sound.

In the seventh embodiment, the "storage means" according to the fourth aspect of the present invention is implemented when the ECU 40 stores the map shown in FIG. 25. Further, the "inactivity period oil temperature measurement means" according to the fourth aspect of the present invention is implemented when the ECU 40 acquires the oil temperature measured by the oil temperature sensor 46 in step S206 of the routine shown in FIG. 26. Furthermore, the "oil leakage amount calculation means" according to the fourth aspect of the present invention is implemented when the ECU 40 performs steps S206 and S208 of the routine shown in FIG. 26.

Again, in the seventh embodiment, the "control means" according to the seventh aspect of the present invention is implemented when the ECU 40 executes the routine shown in FIG. 27. The correlations between the seventh embodiment and the other aspects of the present invention are the same as the correlations between the first embodiment and the other aspects of the present invention.

The seventh embodiment uses the hydraulic pressure rise delay time (toil) as the index value indicating the pace at which the hydraulic pressure rises. However, the hydraulic pressure rise time (soil) may alternatively be used as the index value as is the case with the second embodiment. When such an alternative is used, step S184 of the routine shown in FIG. 27 is replaced by a step for determining the VVT operation inhibition time (tstop) in accordance with the oil pressure rise time (soil) and VVT operation permission oil charge percentage (oilpk).

Eighth Embodiment

The valve timing control device according to an eighth embodiment of the present invention will now be described with reference to FIGS. 3, 16, and 27 to 32.

The valve timing control device according to the eighth embodiment includes a hydraulic circuit, which is configured the same as that of the fourth embodiment. Therefore, the following description assumes that the employed hydraulic circuit is configured the same as in the fourth embodiment, which is shown in FIG. 16. However, VVT operation inhibition control according to the eighth embodiment, which is exercised immediately after engine startup, is based on VVT operation inhibition control according to the seventh embodiment.

The valve timing control device according to the eighth embodiment is similar to that according to the seventh embodiment in that the cumulative amount of oil leakage during a period of engine inactivity is reflected in operation inhibition time setup for the VVT 20. However, the eighth embodiment differs from the seventh embodiment in the method of calculating the cumulative amount of oil leakage during a period of engine inactivity.

Figure 28:
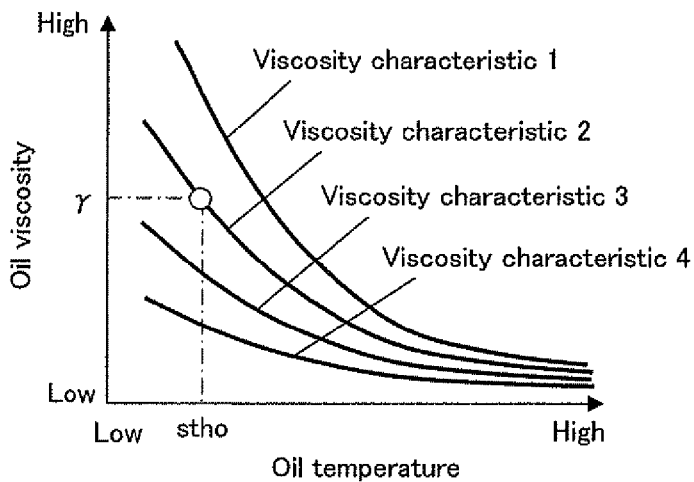
FIG. 28 shows a map used to judge oil viscosity characteristic by the oil temperature and oil viscosity prevailing at engine startup.

The method that the eighth embodiment uses to calculate the cumulative oil leakage amount will be described in detail below. First of all, the present embodiment judges the temperature dependence of the viscosity of the currently used oil. FIG. 28 is a map illustrating the relationship between oil viscosity and oil temperature. As shown in the figure, the oil viscosity depends on the oil temperature. More specifically, the oil viscosity increases with a decrease in the oil temperature and decreases with an increase in the oil temperature. Further, the temperature dependence of oil viscosity (hereinafter referred to as the oil viscosity characteristic) varies with oil composition and deterioration. FIG. 28 exemplifies four different oil viscosity characteristics. These oil viscosity characteristics can be determined through an experiment. In the present embodiment, the results of an experiment that was conducted on various oils, which differ in composition and the degree of deterioration, to determine their viscosity characteristics are compiled into the map shown in FIG. 28 and stored in the ECU 40.

Figure 29:
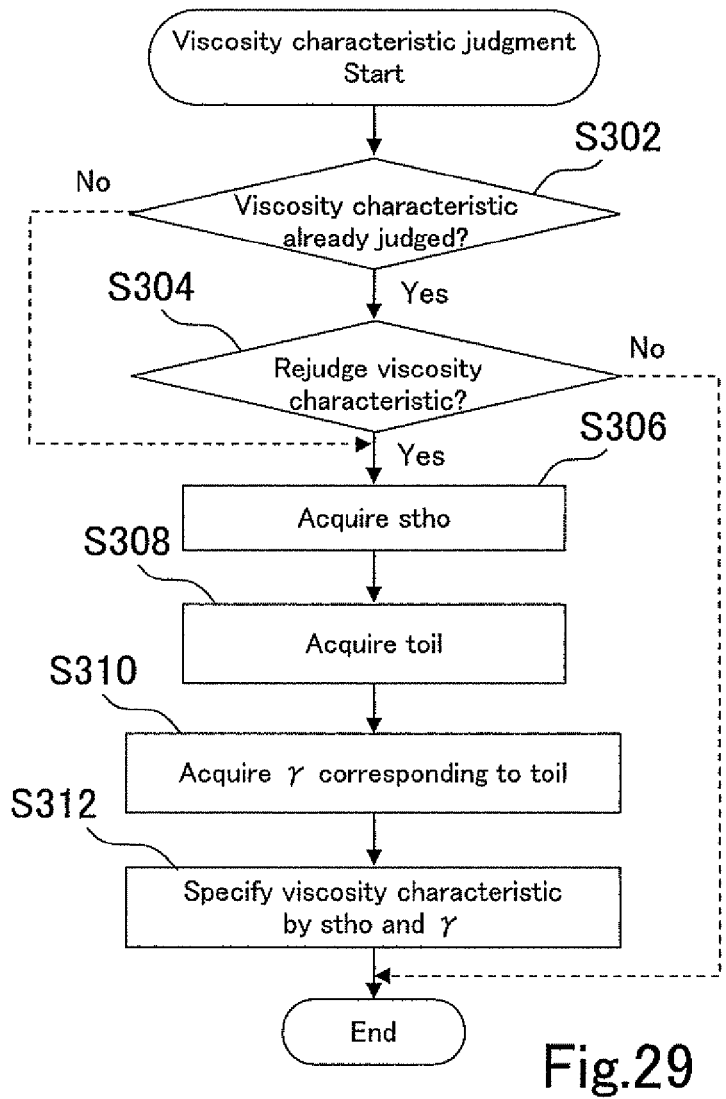
FIG. 29 is a flowchart illustrating a viscosity characteristic judgment routine that is executed by an eighth embodiment of the present invention.

The viscosity characteristic of the currently used oil can be judged by acquiring the oil temperature and oil viscosity prevailing at engine startup and applying them to the map shown in FIG. 28. FIG. 29 is a flowchart illustrating the steps to be performed for such viscosity characteristic judgment. This flowchart shows a routine that is executed in accordance with the present embodiment to provide oil viscosity characteristic judgment control. When the engine 2 starts, the ECU 40 executes this routine at regular intervals.

First of all, the routine shown in FIG. 29 performs step S302 to judge whether the oil viscosity characteristic is already judged. If the oil viscosity characteristic is not yet judged, the routine skips the next step, that is, step S304, and proceeds to step S306.

If, on the other hand, the oil viscosity characteristic is already judged, the routine proceeds to step S304 for confirmation purposes. Step S304 is performed to determine whether or not to rejudge the oil viscosity characteristic. A rejudgment will be formulated if a predetermined period of time has elapsed after the last judgment of the oil viscosity characteristic or a predetermined distance has been traveled. A rejudgment will also be formulated if the oil has been changed. If such a rejudgment is not to be formulated, the routine skips the subsequent steps and terminates. When such a rejudgment is to be formulated, the routine proceeds to step S306.

In step S306, the oil temperature sensor 46 acquires the oil temperature (stho) prevailing at engine startup.

Next, step S308 is performed to acquire the hydraulic pressure rise delay time (toil) prevailing after engine startup. Step S310 is then performed to acquire the oil viscosity ($\gamma$) corresponding to the hydraulic pressure rise delay time (toil) in accordance with the map shown in FIG. 3.

Finally, step S312 is performed so that the start oil temperature (stho) acquired in step S306 and the oil viscosity ($\gamma$) acquired in step S310 are applied to the oil viscosity characteristic map shown in FIG. 28. Although the map shows a plurality of viscosity characteristics (viscosity characteristics 1 to 4), the ECU 40 learns viscosity characteristic 2, which is specified by the start oil temperature (stho) and oil viscosity ($\gamma$), as the viscosity characteristic of the currently used oil, and stores it in a predetermined memory region.

Figure 30:
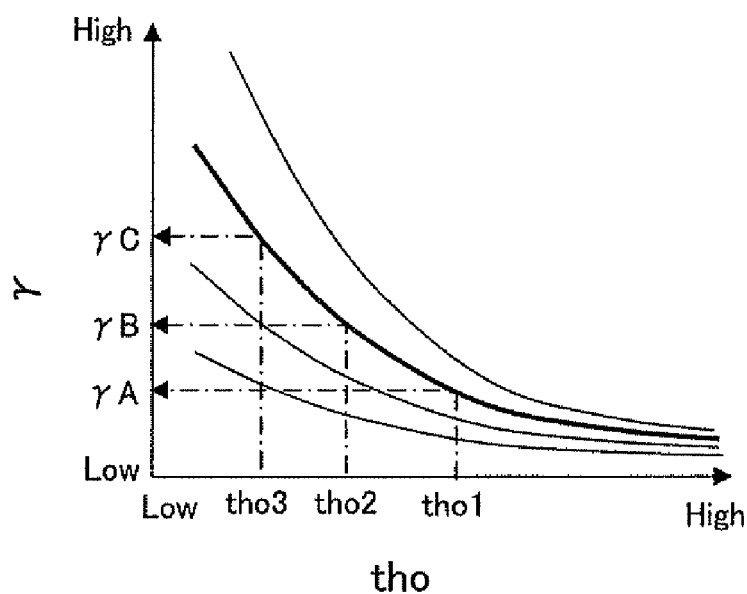
FIG. 30 shows a map used to determine oil viscosity from oil temperature and oil viscosity characteristic.
Figure 31:
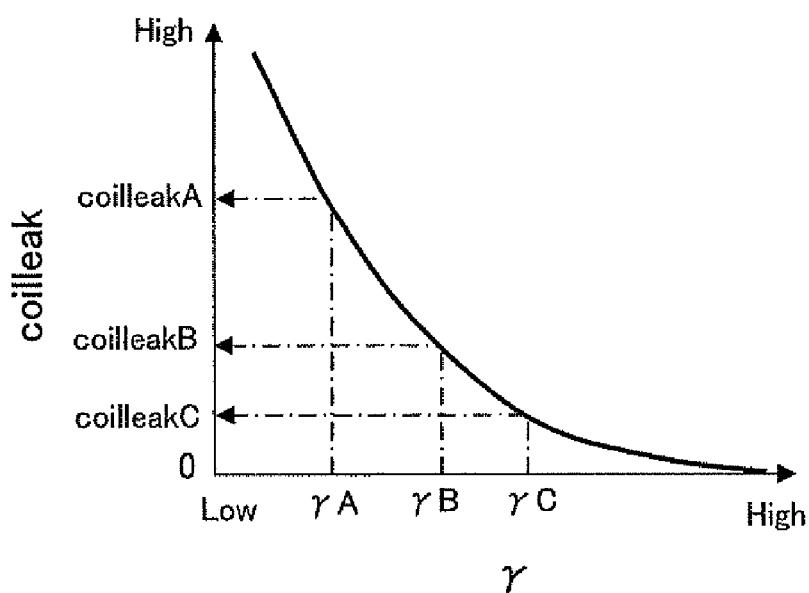
FIG. 31 shows a map used to determine amount of oil leakage per unit time from oil viscosity.

In accordance with the learned oil viscosity characteristic, the ECU 40 calculates the amount of oil leakage during a period of engine inactivity. A map shown in FIG. 30 and a map shown in FIG. 31 are used to calculate the oil leakage amount. The map shown in FIG. 30 is used to determine the oil viscosity ($\gamma$) from oil temperature (tho) and oil viscosity characteristic. In this map, a plurality of oil viscosity characteristics are set in the form of a characteristic curve that defines the relationship between oil temperature (tho) and oil viscosity ($\gamma$). When a characteristic curve corresponding to the learned oil viscosity characteristic is read and then the oil temperature (tho) is applied to the read characteristic curve, the oil viscosity ($\gamma$) corresponding to the oil temperature (tho) can be determined.

The map shown in FIG. 31 is used to determine the amount of oil leakage per unit time (coilleak) from the oil viscosity ($\gamma$). This map defines the relationship between the hourly oil leakage amount (coilleak) and oil viscosity ($\gamma$). The relationship between the oil leakage amount (coilleak) and oil viscosity ($\gamma$) can be determined through an experiment. As shown in the figure, the oil leakage amount (coilleak) decreases to near zero with an increase in the oil viscosity ($\gamma$). The reason is that the possibility of oil leakage through clearances decreases with an increase in the oil viscosity.

Figure 32:
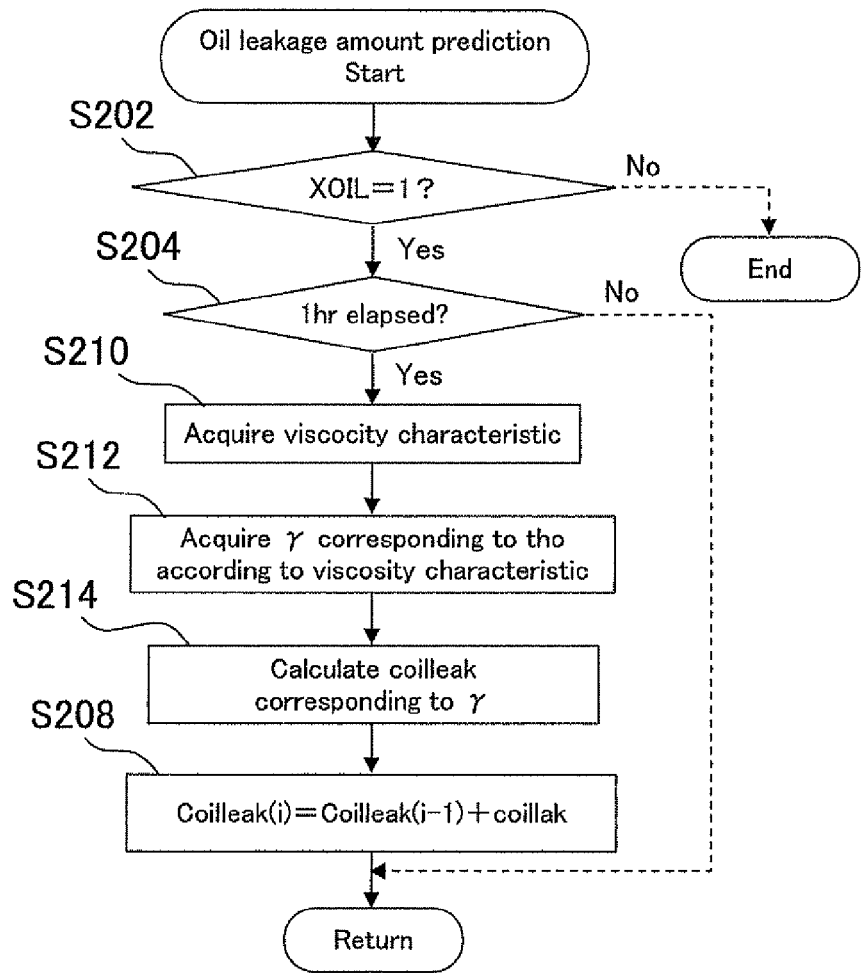
FIG. 32 is a flowchart illustrating an oil leakage amount prediction routine that is executed by an eighth embodiment of the present invention.

The ECU 40 predicts the amount of oil leakage during an inactivity period of the engine 2 by using the maps shown in FIGS. 30 and 31. FIG. 32 is a flowchart illustrating an oil leakage amount prediction control routine that is executed during an inactivity period of the engine 2 in accordance with the present embodiment. While the engine 2 is inactive, the ECU 40 executes the routine shown in FIG. 32 at regular intervals. In FIG. 32, processing steps identical with those of the oil leakage amount prediction control routine according to the seventh embodiment are assigned the same step numbers as for the seventh embodiment. The processing steps common to the seventh and eighth embodiments will not be redundantly described or will be briefly described.

First of all, the routine shown in FIG. 32 performs step S202 to judge in accordance with the value of the flag XOIL whether the oil leakage amount is being predicted. When the value of the flag XOIL is 0, that is, when the engine 2 starts, the routine terminates.

Next, step S204 is performed to judge whether one hour has elapsed after a stop of the engine 2 or the last calculation of oil leakage amount. If the judgment result obtained in step S204 does not indicate that one hour has elapsed to signify the end of a measurement cycle, the subsequent processing steps are skipped so as to repeat the routine.

If, on the other hand, the judgment result obtained in step S204 indicates that one hour has elapsed to signify the end of a measurement cycle, the routine proceeds to step S210. In step S210, the learned oil viscosity characteristic is acquired from a memory to specify a characteristic curve (indicated by a thick line in FIG. 30) that is to be used in the map shown in FIG. 30. Step S210 is performed only once (although it is not indicated in the flowchart). The subsequent steps are performed in accordance with the characteristic curve specified upon initial execution.

Next, step S212 is performed so that the oil temperature sensor 46 measures the oil temperature. The oil viscosity (γ) corresponding to the measured oil temperature (tho) is then acquired in accordance with the characteristic curve specified in step S210.

Next, step S214 is performed to calculate the hourly oil leakage amount (coilleak) corresponding to the oil viscosity (γ) acquired in step S212 in accordance with the map shown in FIG. 31. FIGS. 30 and 31 exemplify the process performed in steps S212 and S214. When, for instance, a measured oil temperature (tho1) is obtained, the associated oil viscosity (γA) is derived from FIG. 30, and then the associated oil leakage amount (coilleakA) is derived from FIG. 31.

Next, step S208 is performed to calculate the cumulative amount of oil leakage (Coilleak) after a stop of the engine by using the hourly oil leakage amount (coilleak), which was calculated in step S214.

The calculated cumulative oil leakage amount (Coilleak) is used for VVT operation inhibition control, which is exercised immediately after a start of the engine 2. As is the case with the seventh embodiment, the present embodiment uses the VVT operation inhibition control routine shown in FIG. 27. The cumulative oil leakage amount (Coilleak) is used to calculate the oil charge percentage (oilp) in step S180 of the routine shown in FIG. 27. The VVT operation inhibition control routine is not described here because it was already described in conjunction with the seventh embodiment.

The routine described above does not merely consider oil temperature changes during an inactivity period, but calculates oil viscosity changes in accordance with the temperature dependence of oil viscosity and calculates the cumulative oil leakage amount in consideration of the calculated oil viscosity changes. Therefore, the cumulative oil leakage amount prevailing at engine startup can be accurately judged. Consequently, the valve timing control device according to the present embodiment can set the operation inhibition time for the VVT 20 in accordance with a remaining oil amount that is estimated with higher accuracy than in the seventh embodiment.

Further, the valve timing control device according to the present embodiment learns an oil viscosity characteristic in accordance with an oil temperature measured at engine startup and oil viscosity. Therefore, even if the oil temperature changes after such learning, the current oil viscosity can be accurately judged by applying the measured oil temperature to the learned oil viscosity characteristic. In other words, it is possible to accurately judge the oil viscosity at an arbitrary point of time and precisely control the operation of the VVT 20 in accordance with such an accurate judgment.

In the eighth embodiment, the "initial oil temperature measurement means" according to the eighth aspect of the present invention is implemented when the ECU 40 acquires the oil temperature measured by the oil temperature sensor 46 in step S306 of the routine shown in FIG. 29. Further, the "characteristic judgment means" according to the eighth aspect of the present invention is implemented when the ECU 40 performs steps S308, S310, and S312 of the routine shown in FIG. 29 by using the map shown in FIG. 28.

Again, in the eighth embodiment, the "storage means" according to the ninth aspect of the present invention is implemented when the ECU 40 stores the map shown in FIG. 31. Further, the "inactivity period oil temperature measurement means" according to the ninth aspect of the present invention is implemented when the ECU 40 acquires the oil temperature measured by the oil temperature sensor 46 in step S212 of the routine shown in FIG. 32. Furthermore, the "viscosity change calculation means" according to the ninth aspect of the present invention is implemented when the ECU 40 performs step S212 of the routine shown in FIG. 32 by using the map shown in FIG. 30. Moreover, the "oil leakage amount calculation means" according to the ninth aspect of the present invention is implemented when the ECU 40 performs steps S214 and S208 of the routine shown in FIG. 32 by using the map shown in FIG. 31.

Again, in the eighth embodiment, the "control means" according to the tenth aspect of the present invention is implemented when the ECU 40 executes the routine shown in FIG. 32. Further, the "control means" according to the eleventh aspect of the present invention is implemented when the ECU 40 executes the routine shown in FIG. 27.

The twenty-fourth aspect of the present invention is also applied to the eighth embodiment. The "storage means" according to the twenty-fourth aspect of the present invention is implemented when the ECU 40 stores the map shown in FIG. 31. Further, the "inactivity period oil temperature measurement means" according to the twenty-fourth aspect of the present invention is implemented when the ECU 40 acquires the oil temperature measured by the oil temperature sensor 46 in step S212 of the routine shown in FIG. 32. Furthermore, the "oil leakage amount calculation means" according to the twenty-fourth aspect of the present invention is implemented when the ECU 40 executes the routine shown in FIG. 32 by using the maps shown in FIGS. 30 and 31. Moreover, the "correction means" according to the twenty-fourth aspect of the present invention is implemented when the ECU 40 performs steps S180, S182, S184, S186, S188, S190, and S192 of the routine shown in FIG. 27.

The correlations between the eighth embodiment and the other aspects of the present invention are the same as the correlations between the seventh embodiment and the other aspects of the present invention.

Ninth Embodiment

The valve timing control device according to a ninth embodiment of the present invention will now be described with reference to FIGS. 16, 27, 33, and 34.

The valve timing control device according to the ninth embodiment includes a hydraulic circuit, which is configured the same as that of the fourth embodiment. Therefore, the following description assumes that the employed hydraulic circuit is configured the same as in the fourth embodiment, which is shown in FIG. 16. However, VVT operation inhibition control according to the ninth embodiment, which is exercised immediately after engine startup, is based on VVT operation inhibition control according to the seventh embodiment.

The valve timing control device according to the ninth embodiment is similar to that according to the seventh embodiment in that the cumulative amount of oil leakage during a period of engine inactivity is reflected in operation inhibition time setup for the VVT 20. However, the ninth embodiment differs from the seventh embodiment in the method of calculating the cumulative amount of oil leakage during a period of engine inactivity.

Since the rate of oil leakage depends on the oil temperature, the seventh embodiment periodically measures the oil temperature after engine stoppage, and calculates the cumulative oil leakage amount by adding up the amounts of oil leakage per unit time, which are determined from the oil temperature. In this case, the accuracy of cumulative oil leakage amount prediction varies with the oil temperature measurement intervals. As a matter of course, the prediction accuracy increases with a decrease in the measurement intervals; however, decreasing the measurement intervals increases the amount of power consumed to calculate the cumulative leakage amount.

Figure 33:
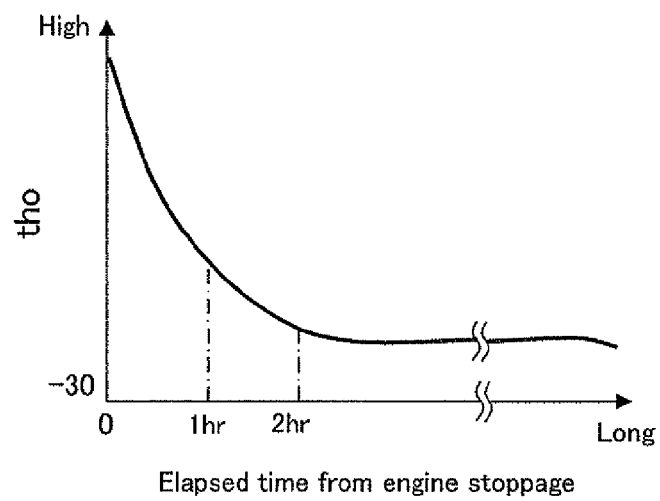
FIG. 33 shows an example that indicates how oil temperature changes after engine stoppage.

In view of the above circumstances, the ninth embodiment focuses attention on oil temperature changes after engine stoppage. FIG. 33 shows an example that indicates how the oil temperature changes after engine stoppage. As shown in the figure, the oil temperature rapidly lowers after engine stoppage. The oil temperature varies with ambient temperature changes after the oil temperature is lowered to a level close to ambient temperature due to the elapse of time after engine stoppage. When such oil temperature changes are considered, it is preferred that the measurement intervals be short for a short period of time after engine stoppage because the oil temperature rapidly changes. However, relatively long measurement intervals can be used after the elapse of a considerable period of time because oil temperature changes are slight.

Figure 34:
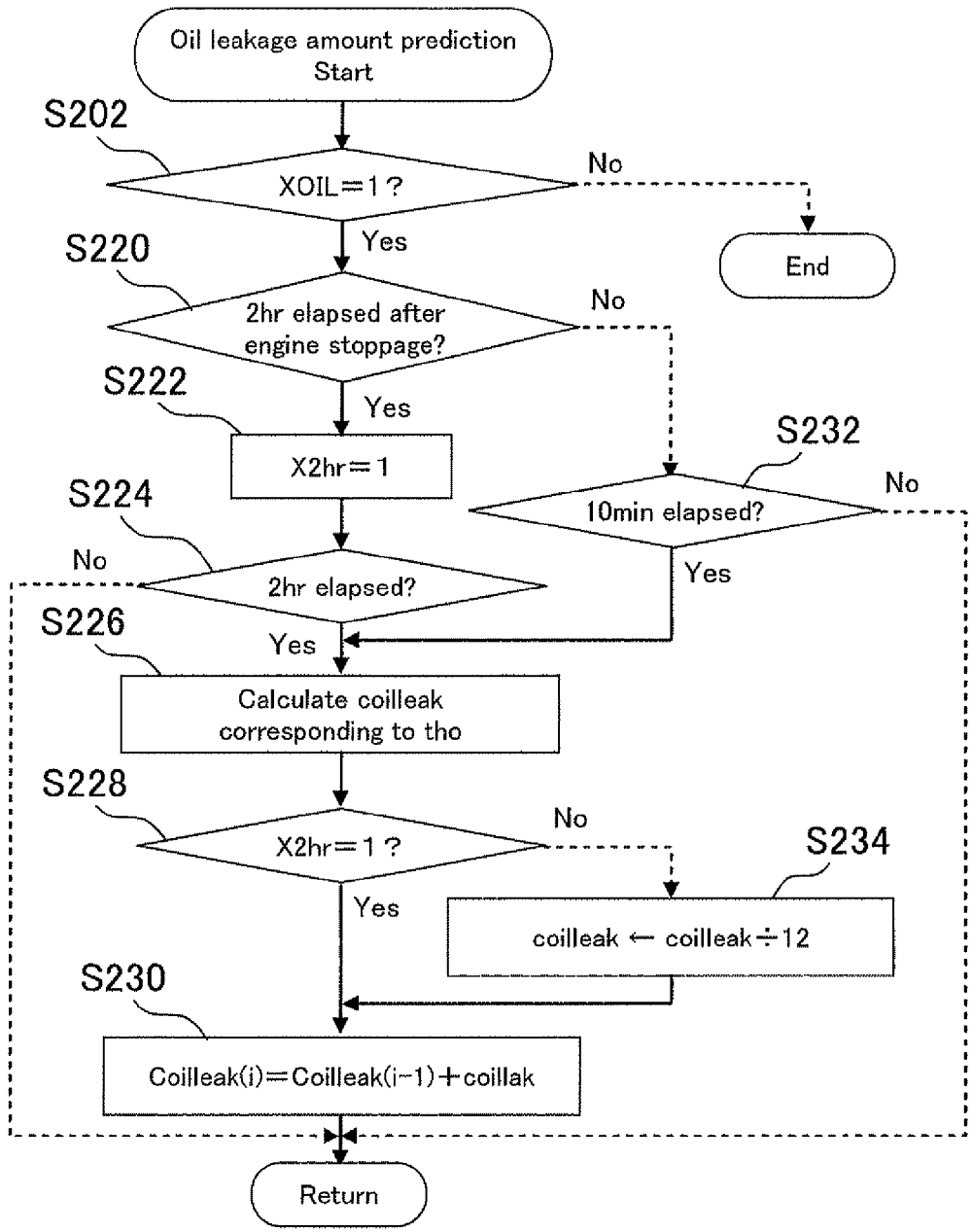
FIG. 34 is a flowchart illustrating an oil leakage amount prediction routine that is executed by a ninth embodiment of the present invention.

FIG. 34 is a flowchart illustrating an oil leakage amount prediction control routine that is executed during an inactivity period of the engine 2 in accordance with the present embodiment. While the engine 2 is inactive, the ECU 40 executes the routine shown in FIG. 34 at regular intervals. In FIG. 34, processing steps identical with those of the oil leakage amount prediction control routine according to the seventh embodiment are assigned the same step numbers as for the seventh embodiment.

First of all, the routine shown in FIG. 34 performs step S202 to judge in accordance with the value of the flag XOIL whether the oil leakage amount is being predicted. When the value of the flag XOIL is 0, that is, when the engine 2 starts, the routine terminates.

Next, step S220 is performed to judge whether two hours have elapsed after a stop of the engine 2. Here, it is assumed that the oil temperature rapidly changes during a two-hour period after engine stoppage. If the judgment result obtained in step S220 does not indicate that two hours have elapsed, the routine proceeds to step S232 for judgment purposes. If, on the other hand, the judgment result indicates that two hours have elapsed, the routine proceeds to step S222 and set a flag X2r to 1. Next, the routine performs step S224 for judgment purposes.

The process performed when the elapsed time from engine stoppage is shorter than two hours will be first described. In this situation, step S232 is performed to judge whether ten minutes have elapsed after the last oil leakage amount calculation. The present embodiment measures the oil temperature at 10-minute intervals when the elapsed time from engine stoppage is shorter than two hours and at 2-hour intervals when the elapsed time from engine stoppage is two hours or longer. If the judgment result obtained in step S232 does not indicate that ten minutes have elapsed, the subsequent steps are skipped to repeat the routine.

If, on the other hand, the judgment result obtained in step S232 indicates that ten minutes have elapsed to signify the end of a measurement cycle, the routine proceeds to step S226. In step S226, the oil temperature sensor 46 measures the oil temperature, and then the amount of oil leakage per 2 hours, which corresponds to the measured oil temperature (tho), is calculated in accordance with a map (not shown). The map is similar to the one shown in FIG. 25 and indicative of the relationship between the amount of oil leakage (coilleak) per 2 hours and the oil temperature (tho).

Next, step S228 is performed to judge whether the value of the flag X2r is 1. If the value of the flag X2r is 0, the routine performs step S234 and then step S230. If the elapsed time from engine stoppage is shorter than 2 hours, the value of the flag X2r is 0. In this instance, the routine performs step S234. In step S234, the amount of oil leakage per 2 hours, which was determined in step S226, is converted to the amount of oil leakage per 10 minutes. More specifically, the oil leakage amount (coilleak) is divided by 12, and then the obtained value is newly calculated as the oil leakage amount (coilleak).

In step S230, the cumulative amount of oil leakage (Coilleak) after engine stoppage is calculated from the amount of oil leakage per 10 minutes, which was calculated in step S234. The current cumulative oil leakage amount (Coilleak (i)) is obtained by adding the currently determined oil leakage amount (coilleak) to the last determined cumulative oil leakage amount (Coilleak(i-1)).

The process performed when the elapsed time from engine stoppage is two hours or longer will now be described. In this situation, steps S224 is performed to judge whether two hours have elapsed after the last oil leakage amount calculation. If the judgment result does not indicate that two hours have elapsed to signify the end of a measurement cycle, the subsequent steps are skipped to repeat the routine.

If, on the other hand, the judgment result obtained in step S224 indicates that two hours have elapsed to signify the end of a measurement cycle, the routine proceeds to step S226. Step S226 is performed to measure the oil temperature with the oil temperature sensor 46 and calculate the amount of oil leakage (coilleak) per 2 hours, which corresponds to the measured oil temperature (tho), in accordance with the aforementioned map.

Next, step S228 is performed to judge whether the value of the flag X2r is 1. When two hours have elapsed after engine stoppage, the value of the flag X2r is 1. Therefore, the routine proceeds to step S230.

In step S230, the cumulative amount of oil leakage (Coilleak) after engine stoppage is calculated from the amount of oil leakage per 2 hours, which was calculated in step S226.

The calculated cumulative oil leakage amount (Coilleak) is used for VVT operation inhibition control, which is exercised immediately after a start of the engine 2. As is the case with the seventh embodiment, the present embodiment uses the VVT operation inhibition control routine shown in FIG. 27. The cumulative oil leakage amount (Coilleak) is used to calculate the oil charge percentage (oilp) in step S180 of the routine shown in FIG. 27. The VVT operation inhibition control routine is not described here because it was already described in conjunction with the seventh embodiment.

When the elapsed time from engine stoppage is short, the amount of oil leakage per unit time is large due to a high oil temperature and low oil viscosity. In such an instance, the routine described above can enhance the accuracy of cumulative oil leakage amount prediction by selecting short measurement intervals. When, on the other hand, the elapsed time from engine stoppage is long, the amount of oil leakage per unit time is small due to a low oil temperature and high oil viscosity. In such an instance, the routine described above can minimize the amount of power consumed for cumulative oil leakage amount calculation by selecting long measurement intervals. Therefore, the valve timing control device according to the present embodiment can not only enhance the accuracy of cumulative oil leakage amount prediction but also minimize the amount of power consumption during a period of engine inactivity.

In the ninth embodiment, which has been described above, the "storage means" according to the fourth aspect of the present invention is implemented when the ECU 40 stores a map concerning step S226 of the routine shown in FIG. 34. Further, the "inactivity period oil temperature measurement means" according to the fourth and fifth aspects of the present invention is implemented when the ECU 40 performs steps S220, S224, and S232 of the routine shown in FIG. 34 and acquires the oil temperature measured by the oil temperature sensor 46 in step S226. Furthermore, the "oil leakage amount calculation means" according to the fourth aspect of the present invention is implemented when the ECU 40 performs steps S226, S228, S234, and S230 of the routine shown in FIG. 34. The correlations between the ninth embodiment and the other aspects of the present invention are the same as the correlations between the seventh embodiment and the other aspects of the present invention.

It is assumed that the ninth embodiment determines the amount of oil leakage (coilleak) per unit time from a measured oil temperature (tho). However, an alternative would be to determine the oil viscosity from the oil viscosity characteristic and measured oil temperature (tho) and determine the amount of oil leakage (coilleak) per unit time from the oil viscosity, as is the case with the eighth embodiment. When such an alternative is used, step S226 of the routine shown in FIG. 34 is replaced by steps S210, S212, and S214 of the routine shown in FIG. 32.

Tenth Embodiment

The valve timing control device according to a tenth embodiment of the present invention will now be described with reference to FIGS. 3, 16, and 35 to 37.

The valve timing control device according to the tenth embodiment includes a hydraulic circuit, which is configured the same as that of the fourth embodiment. Therefore, the following description assumes that the employed hydraulic circuit is configured the same as in the fourth embodiment, which is shown in FIG. 16. However, when the configuration shown in FIG. 16 is used to describe the present embodiment, it is assumed that the hydraulic circuit shown in FIG. 16 is a part of the valve timing control device to be applied to an exhaust valve.

The configuration shown in FIG. 16 is such that the VVT 20 is locked by the lock pin 30 during a period of engine inactivity. However, the VVT 20 according to the present embodiment is for an exhaust valve. It is therefore assumed that the VVT 20 is locked into position for providing the most advanced valve timing. It is also assumed that while no power is supplied, the spool in the OCV 10 is positioned so as to connect the VVT line 8 to the advancing oil chamber 26.

When the hydraulic pressure of oil supplied to the VVT 20 rises to a certain level after a start of the engine 2, the lock pin 30 automatically unlocks the VVT 20. After the VVT 20 is unlocked, it can freely operate and exercise control so as to retard the valve timing.

However, the valve timing control device according to the first to ninth embodiments, which have been described earlier, does not operate the VVT 20 immediately after it is unlocked, and inhibits its operation until it is sufficiently charged with oil. The valve timing control device according to the present embodiment is similar to that according to the first to ninth embodiments in that the VVT 20 is not allowed to operate immediately after unlocking. However, the present embodiment differs from the first to ninth embodiments in the conditions for canceling the operation inhibition on the VVT 20.

In the present embodiment, the cancellation conditions are determined from the viewpoint that the lock pin 30 is certainly engaged with the lock hole while the engine 2 is inactive. When the engine starts, the oil chambers 26, 28 are emptied of oil. Therefore, if the VVT 20 is not securely locked, the reaction force of a cam moves the VVT 20. In such an instance, the VVT 20 moves in the direction of retarding the valve timing of the exhaust valve. This results in an increased valve overlap, thereby causing degraded combustion performance at startup. To avoid such a problem, it is necessary that the VVT 20 be securely locked while the engine 2 is inactive.

While the engine 2 is stopped, the oil pump 4, which is driven by the engine 2, is also stopped. Since the ends of the oil supply lines 6, 8 are not completely closed and there are clearances at various places, the hydraulic pressure of oil in the hydraulic circuit decreases when the oil pump 4 stops operating. However, there is a time lag between the instant at which the oil pump 4 stops operating and the instant at which the hydraulic pressure is completely lowered. Therefore, a residual hydraulic pressure exists in the hydraulic circuit for a while. When the engine 2 stops, the valve timing control device moves the VVT 20 to the most advanced position by using the residual hydraulic pressure, and engages the lock pin 30, which is mounted on the vane assembly 24, with the lock hole, which is formed in the housing 22. The engagement of the lock pin 30 with the lock hole is hereinafter referred to as lock pin engagement.

The certainty of lock pin engagement during a period of engine inactivity is determined by the relationship between the following three factors. The first factor is the residual hydraulic pressure during a period of engine inactivity. The higher the residual hydraulic pressure, the greater the driving force for moving the VVT 20 in the retarding direction and thus the easier it is to achieve lock pin engagement. The second factor is the valve timing provided during a period of engine inactivity. The more advanced the valve timing, the larger the amount of VVT operation required for lock engagement and thus the more difficult it is to achieve lock pin engagement. The third factor is the oil viscosity prevailing during a period of engine inactivity. The higher the oil viscosity, the greater the resistive force exerted when the VVT 20 is moved in the retarding direction, and thus the more difficult it is to achieve lock pin engagement.

The residual hydraulic pressure during a period of engine inactivity, which is one of the aforementioned three factors, is determined by the relief pressure of the hydraulic circuit. It may be considered to be substantially fixed irrespective of conditions prevailing during a period of engine inactivity. However, the valve timing provided during a period of engine inactivity varies each time because it is determined by an operating state of the engine 2 that prevails immediately before stoppage. To assure proper lock pin engagement, it is necessary to presume that the worst conditions exist, that is, the most retarded valve timing is provided. If the residual hydraulic pressure during a period of engine inactivity is known, the maximum oil viscosity for assuring lock pin engagement (hereinafter referred to as the lock pin engagement assurance viscosity) can be determined through an experiment or calculation on the presumption that the most retarded valve timing is provided during a period of engine inactivity.

Figure 35:
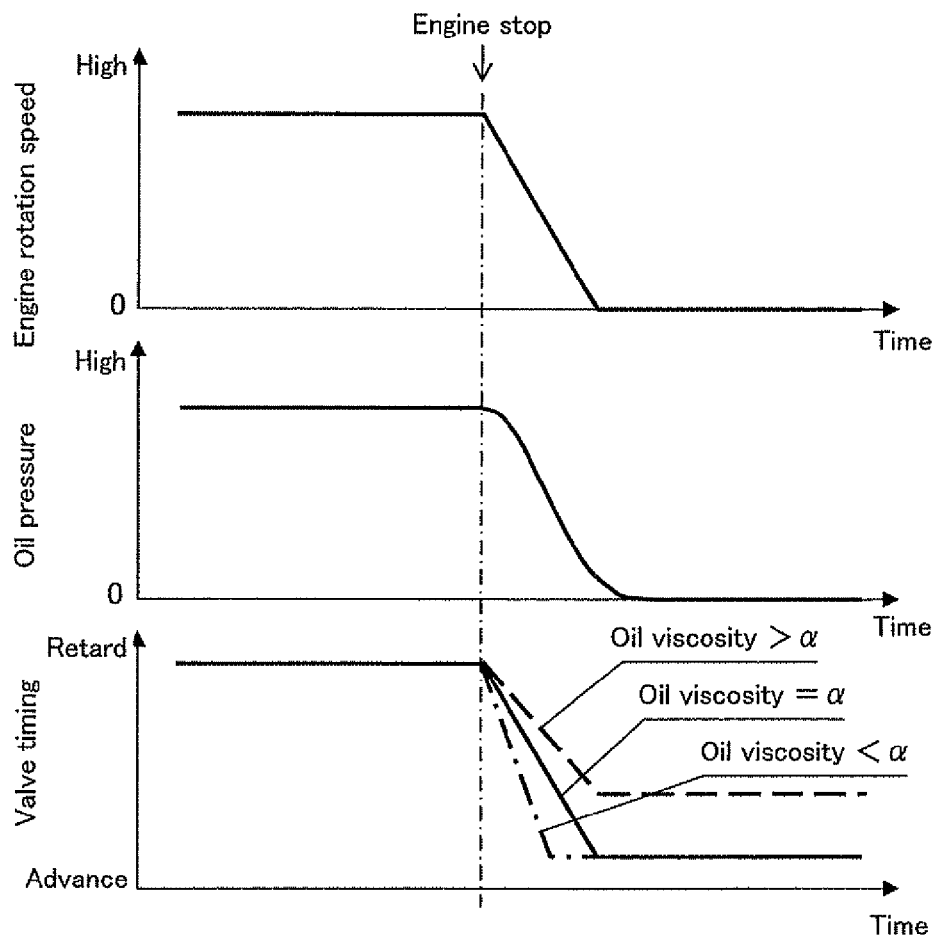
FIG. 35 compares various oil viscosities to illustrate how a VVT operates while an engine is inactive.

FIG. 35 compares various oil viscosities to illustrate how the VVT 20 operates while the engine 2 is inactive. After the engine 2 is started, the hydraulic pressure of oil in the main oil gallery 6 decreases with a decrease in the engine rotation speed as shown in the figure. The VVT 20 moves in the advancing direction by making use of such residual hydraulic pressure. However, the operation of the VVT 20 varies with the oil viscosity. If the oil viscosity is equal to the lock pin engagement assurance viscosity (a), the VVT 20 can move to the most advanced position, which is the lock position, before the hydraulic pressure is relieved, as indicated by a solid line in the figure. If the oil viscosity is lower than the lock pin engagement assurance viscosity ($\alpha$), the VVT 20 can move to the most advanced position well before the hydraulic pressure is relieved, as indicated by a one-dot chain line. In the above cases, lock pin engagement can be certainly achieved. However, if the oil viscosity is higher than the lock pin engagement assurance viscosity ($\alpha$), lock pin engagement cannot be achieved because the hydraulic pressure is relieved before the VVT 20 reaches the most advanced position, as indicated by a broken line.

If the oil viscosity is not higher than the lock pin engagement assurance viscosity during a period of engine inactivity, lock pin engagement is certainly achieved irrespective of the valve timing provided during a period of engine inactivity. However, the driver is at liberty to stop the engine 2. Therefore, the oil viscosity prevailing when the engine 2 stops cannot be predicted. The timing with which the engine 2 stops can be controlled in compliance with a request from the valve timing control device. However, if the actual stop timing greatly deviates from a driver's stop request, the driver feels uncomfortable.

In view of the above circumstances, the valve timing control device according to the present embodiment inhibits the operation of the VVT 20 during the time interval between the instant at which the engine 2 starts and the instant at which the oil viscosity is not higher than the lock pin engagement assurance viscosity, thereby assuring proper lock pin engagement no matter when the engine 2 stops. In other words, the valve timing control device according to the present embodiment does not permit the VVT 20 to operate until the oil viscosity is equal to or lower than the lock pin engagement assurance viscosity.

It should be noted, however, that the configuration shown in FIG. 16 makes it possible to acquire only the oil viscosity that is determined from the pace at which the hydraulic pressure rises. Since the configuration does not include a viscosity sensor, the oil viscosity cannot be measured with arbitrary timing. However, the oil temperature can be measured with arbitrary timing through the use of the oil temperature sensor 46. This makes it possible to continuously monitor oil temperature changes after engine startup.

Figure 36:
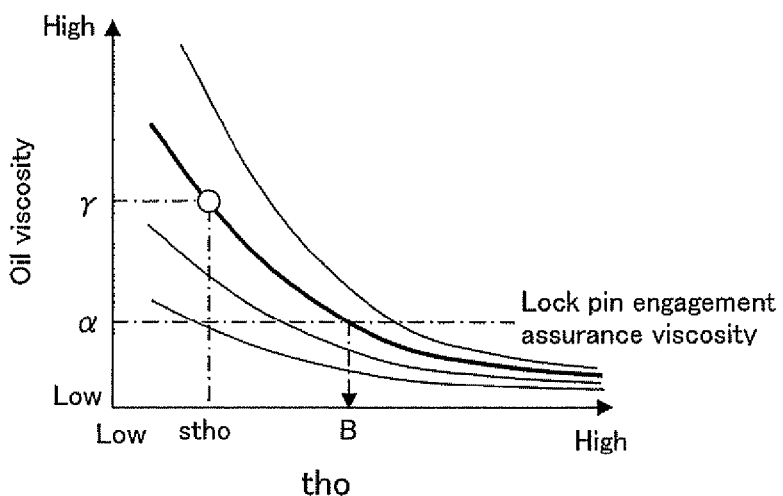
FIG. 36 shows a map used to determine lock pin engagement assurance oil temperature from oil viscosity characteristic.

FIG. 36 is a map illustrating the relationship between oil viscosity and oil temperature. As shown in the figure, the relationship between oil viscosity and oil temperature is determined by the viscosity characteristic of oil. Conversely, if the oil viscosity and oil temperature prevailing at a certain point of time are known, the viscosity characteristic of an employed oil can be determined. The present embodiment determines the hydraulic pressure rise delay time (toil) prevailing at engine startup, and acquires the oil viscosity ($\gamma$) corresponding to the hydraulic pressure rise delay time (toil) in accordance with the map shown in FIG. 3. The present embodiment then determines the oil viscosity characteristic corresponding to the measured oil temperature (stho) and oil viscosity ($\gamma$) prevailing at engine startup in accordance with the map shown in FIG. 36.

When the viscosity characteristic of the employed oil is determined, the oil temperature (B) corresponding to the lock pin engagement assurance viscosity ($\alpha$) can also be determined. This oil temperature (B) is hereinafter referred to as the lock pin engagement assurance oil temperature (B). The present embodiment inhibits the operation of the VVT 20 until the oil temperature (tho) measured by the oil temperature sensor 46 reaches the lock pin engagement assurance oil temperature (B).

Figure 37:
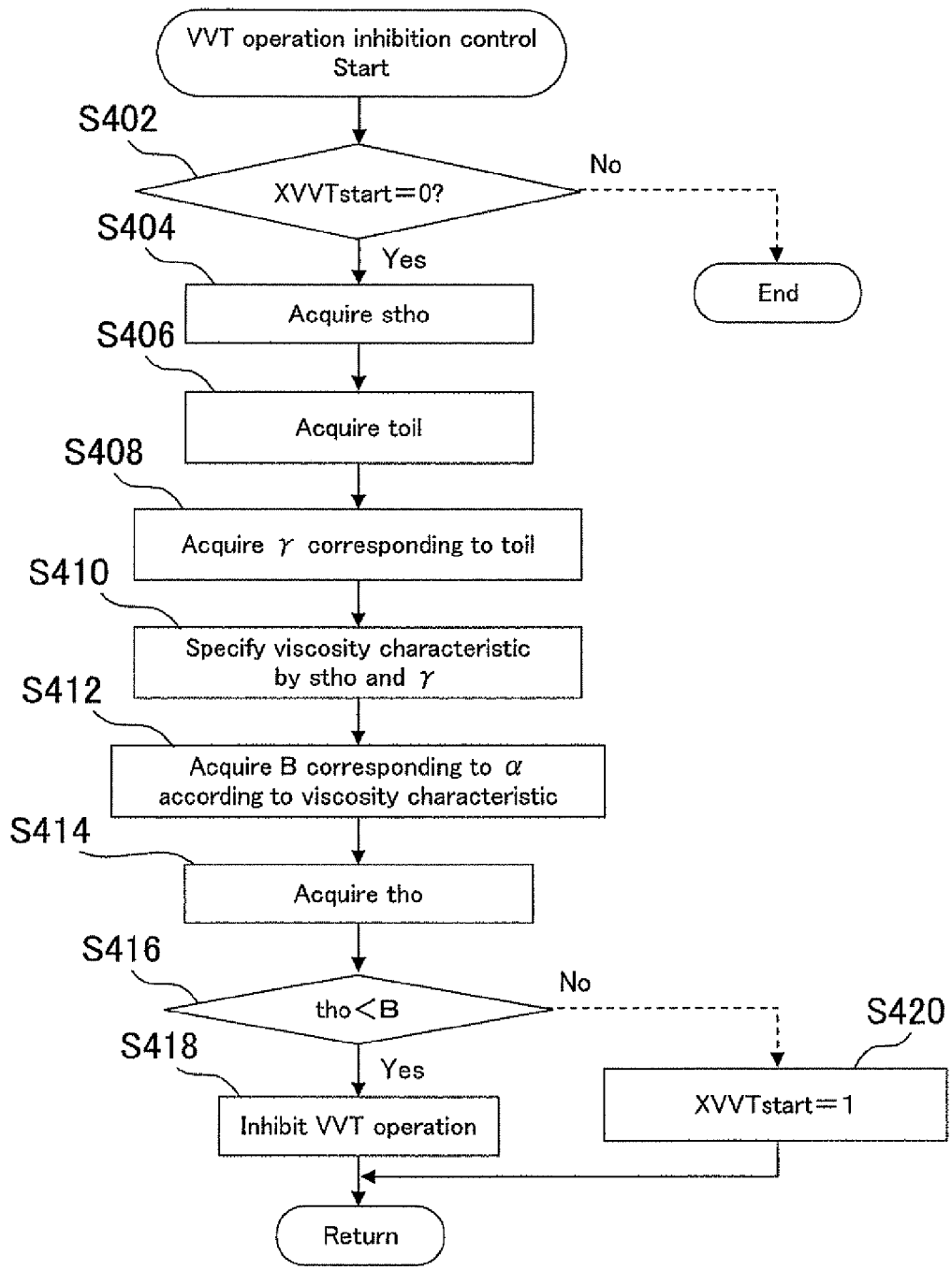
FIG. 37 is a flowchart illustrating a VVT operation inhibition control routine that is executed by a tenth embodiment of the present invention.

FIG. 37 is a flowchart illustrating a VVT operation inhibition control routine that is executed immediately after a start of the engine 2 in accordance with the present embodiment. Immediately after the start of the engine 2, the ECU 40 executes the routine shown in FIG. 37 at regular intervals.

First of all, the routine shown in FIG. 37 performs step S402 to judge in accordance with the value of the flag XVVTstart whether the VVT operation is inhibited immediately after engine startup. If the value of the flag XVVTstart is 0, the VVT operation is inhibited. If the value of the flag XVVTstart is 1, the VVT operation is not inhibited. The initial value of the flag XVVTstart is 0. If a later-described condition prescribed in step S416 is not established, the value of the flag XVVTstart is set to 1. When the value of the flag XVVTstart is 1, that is, when the VVT operation inhibition is canceled, the routine terminates.

If the judgment result obtained in step S402 indicates that the VVT operation is inhibited, the routine proceeds to steps S404 and beyond. In step S404, the oil temperature sensor 46 acquires the oil temperature (stho) prevailing at engine startup.

Next, step S406 is performed to acquire the hydraulic pressure rise delay time (toil) prevailing after engine startup. Step S408 is then performed to acquire the oil viscosity ($\gamma$) corresponding to the hydraulic pressure rise delay time (toil) in accordance with the map shown in FIG. 3.

Next, the routine proceeds to step S410. In step S410, the start oil temperature (stho) acquired in step S404 and the oil viscosity ($\gamma$) acquired in step S408 are applied to the map shown in FIG. 36 to judge the viscosity characteristic of the currently used oil.

Next, the routine proceeds to step S412. In step S412, a characteristic curve of the oil viscosity characteristic judged in step S410 is read from the map shown in FIG. 36. The lock pin engagement assurance oil temperature (B) for the currently used oil is then determined by applying a preselected lock pin engagement assurance viscosity ($\alpha$) to the characteristic curve. The lock pin engagement assurance viscosity ($\alpha$) is constant irrespective of oil, whereas the lock pin engagement assurance oil temperature (B) changes when the viscosity characteristic of an employed oil changes due, for instance, to deterioration.

Steps S404 to S412, which are described above, are performed only once (although it is not indicated in the flowchart). The lock pin engagement assurance oil temperature (B) acquired upon initial execution is retained until the routine is completed. The oil viscosity characteristic used in step S412 need not always be judged each time the routine is executed (steps S404 to S408 are performed). An alternative would be to access the memory and read an oil viscosity characteristic learned by another routine (oil viscosity characteristic judgment control routine shown in FIG. 29).

Next, the routine proceeds to step S414. In step S414, the oil temperature sensor 46 acquires the current oil temperature (tho). Next, step S416 is performed to judge whether the current oil temperature (tho) has reached the lock pin engagement assurance oil temperature (B), which was acquired in step S412. If the current oil temperature (tho) has not reached the lock pin engagement assurance oil temperature (B), the routine proceeds to step S418. In step S418, the operation of the VVT 20 is continuously inhibited. If, on the other hand, the current oil temperature (tho) has reached the lock pin engagement assurance oil temperature (B), the routine proceeds to step S420. In step S420, the operation inhibition on the VVT 20 is canceled with the flag XVVTstart set to 1.

The routine described above judges the viscosity characteristic (temperature dependence) of oil in accordance with the oil viscosity ($\gamma$) derived from the hydraulic pressure rise delay time (toil) and start oil temperature (stho), and calculates the lock pin engagement assurance oil temperature (B) in accordance with the judged oil viscosity characteristic and lock pin engagement assurance viscosity ($\alpha$). This makes it possible to ensure that the viscosity characteristic of a currently used oil is accurately reflected in the setup of the lock pin engagement assurance oil temperature (B).

As described above, the valve timing control device according to the present embodiment can exercise operation inhibition control over the VVT 20 with reference to the lock pin engagement assurance oil temperature (B) in which an oil viscosity characteristic is accurately reflected, and certainly inhibit the operation of the VVT 20 until the oil temperature rises in accordance with the operation of the engine 2 to decrease the oil viscosity as needed to assure proper lock pin engagement while the engine 2 is inactive. This makes it possible to apply hydraulic pressure to the VVT 20 at next startup with the lock pin 30 properly engaged with the lock hole, and avoid a problem caused by incomplete lock pin engagement such as the generation of a tapping sound due to the collision between the housing 22 and vane assembly 24.

The correlations between the tenth embodiment and the first aspect and its dependent aspects of the present invention are as described below. In FIG. 16, the VVT 20 corresponds to the "hydraulic actuator" according to the first and twelfth aspects of the present invention; the main oil gallery 6 and VVT line 8 correspond to the "oil supply line" according to the first aspect of the present invention; and the oil pump 4 corresponds to the "hydraulic pressure generation source" according to the first and twelfth aspects of the present invention. Further, the hydraulic pressure sensor 42 corresponds to the "hydraulic pressure measurement means" according to the first aspect of the present invention.

The "viscosity index value setup means" according to the first and second aspects of the present invention is implemented when the ECU 40 performs steps S406 and S408 of the routine shown in FIG. 37 by using the map shown in FIG. 3. Further, the "initial oil temperature measurement means" according to the eighth aspect of the present invention is implemented when the ECU 40 acquires the oil temperature measured by the oil temperature sensor 46 in step S404 of the routine shown in FIG. 37. Furthermore, the "characteristic judgment means" according to the eighth aspect of the present invention is implemented when the ECU 40 performs step S410 of the routine shown in FIG. 37 by using the map shown in FIG. 36. In addition, the "control means" according to the tenth aspect of the present invention is implemented when the ECU 40 executes the entire routine shown in FIG. 37.

The correlations between the tenth embodiment and the twenty-fifth aspect and its dependent twenty-sixth aspect of the present invention are as described below. In FIG. 16, the VVT 20 corresponds to the "variable valve timing mechanism" according to the twenty-fifth aspect of the present invention; the main oil gallery 6 and VVT line 8 correspond to the "oil supply line" according to the twenty-fifth aspect of the present invention; and the oil pump 4 corresponds to the "oil pump" according to the twenty-fifth aspect of the present invention. Further, the hydraulic pressure sensor 42 corresponds to the "hydraulic pressure measurement means" according to the twenty-fifth aspect of the present invention; and the oil temperature sensor 46 corresponds to the "oil temperature measurement means" according to the twenty-fifth aspect of the present invention.

The "viscosity index value setup means" according to the twenty-fifth aspect of the present invention is implemented when the ECU 40 performs steps S406 and S408 of the routine shown in FIG. 37 by using the map shown in FIG. 3. Further, the "characteristic judgment means" according to the twenty-fifth aspect of the present invention is implemented when the ECU 40 performs step S410 of the routine shown in FIG. 37 by using the map shown in FIG. 36. Furthermore, the "assurance temperature calculation means" according to the twenty-fifth aspect of the present invention is implemented when the ECU 40 performs step S412 of the routine shown in FIG. 37 by using the map shown in FIG. 36. Moreover, the "operation inhibition means" according to the twenty-fifth aspect of the present invention is implemented when the ECU 40 performs steps S416, S418, and S420 of the routine shown in FIG. 37.

The tenth embodiment uses the hydraulic pressure rise delay time (toil) as the index value indicating the pace at which the hydraulic pressure rises. However, an alternative would be to use the hydraulic pressure rise time (soil) as the index value, as is the case with the second embodiment. To use such an alternative, it is necessary to replace the process performed in step S406 of the routine shown in FIG. 37 by a process that acquires the hydraulic pressure rise time (soil), and replace the process performed in step S408 by a process that acquires the oil viscosity ($\gamma$) corresponding to the hydraulic pressure rise time (soil) in accordance with the map shown in FIG. 9.

Eleventh Embodiment

The valve timing control device according to an eleventh embodiment of the present invention will now be described with reference to FIGS. 3, 16, and 38 to 42.

The valve timing control device according to the eleventh embodiment includes a hydraulic circuit, which is configured the same as that of the fourth embodiment. Therefore, the following description assumes that the employed hydraulic circuit is configured the same as ixa the fourth embodiment, which is shown in FIG. 16. However, when the configuration shown in FIG. 16 is used to describe the present embodiment, it is assumed that the hydraulic circuit shown in FIG. 16 is a part of the valve timing control device to be applied to an exhaust valve.

The valve timing control device according to the present embodiment is similar to that according to the tenth embodiment in that the purpose is to achieve lock pin engagement with certainty while the engine 2 is inactive. However, the present embodiment differs from the tenth embodiment in the means for achieving that purpose.

The tenth embodiment inhibits the operation of the VVT 20 during the time interval between the instant at which the engine 2 starts and the instant at which the oil viscosity is not higher than the lock pin engagement assurance viscosity, thereby assuring proper lock pin engagement no matter when the engine 2 stops. This assures that lock pin engagement is certainly achieved while the engine is inactive. However, the start of valve timing control may be delayed depending on an oil temperature rise after engine startup.

In view of the above circumstances, the valve timing control device according to the present embodiment permits the VVT 20 to operate during the time interval between the instant at which the engine 2 starts and the instant at which the oil temperature reaches the lock pin engagement assurance temperature. When the driver generates a stop request for the engine 2, the valve timing control device measures the current oil temperature. If the measured oil temperature is below the lock pin engagement assurance temperature, the valve timing control device delays the stop of the engine 2. However, the operation for returning the VVT 20 to its locked position begins when a stop request is generated for the engine 2. When the stop of the engine 2 is delayed as described above, the VVT 20 can be returned to its locked position during the resulting delay time. This assures lock pin engagement during an inactivity period of the engine 2. Control exercised in accordance with the present embodiment to delay an engine stop is hereinafter referred to as engine stop delay control. Further, the length of time by which the engine stop is delayed during engine stop delay control is hereinafter referred to as the delay time.

Figure 38:
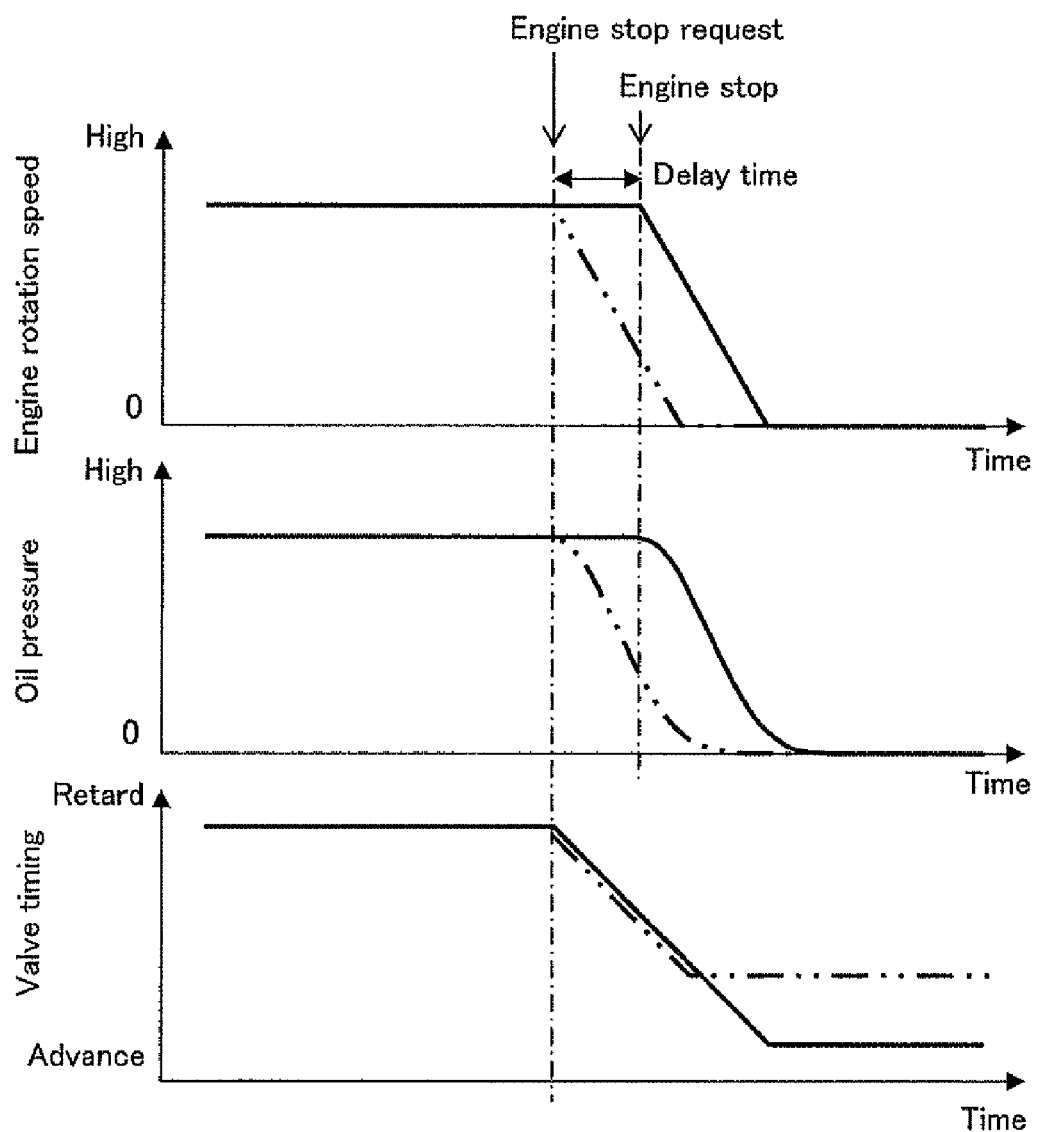
FIG. 38 illustrates operation of a VVT during an inactivity period of an engine that varies depending on whether delay time is provided.

FIG. 38 illustrates the operation of the VVT 20 during an inactivity period of the engine 2 that varies depending on whether the delay time is provided. Solid lines indicate engine rotation speed, hydraulic pressure, and valve timing changes that occur when the delay time is provided, whereas two-dot chain lines indicate engine rotation speed, hydraulic pressure, and valve timing changes that occur when the delay time is not provided. FIG. 38 presumes that the oil temperature is below the lock pin engagement assurance temperature when an engine stop request is generated. If, in this instance, the delay time is not set, lock pin engagement cannot be achieved because the hydraulic pressure is relieved before the VVT 20 reaches the most advanced position, which is the lock position, as indicated by a two-dot chain line. If, on the other hand, the delay time is set, lock pin engagement can be certainly achieved because the VVT 20 can move to the most advanced position before the hydraulic pressure is relieved, as indicated by a solid line.

As described above, even if the oil temperature differs from the lock pin engagement assurance temperature when an engine stop request is generated, lock pin engagement can be achieved with certainty by providing the delay time. However, a situation where the delay time is unduly long should be avoided because the driver feels uncomfortable. In view of the above circumstances, the valve timing control device according to the present embodiment does not unconditionally permit the VVT 20 to operate after a start of the engine 2, but uses a lower-limit oil temperature for permitting the VVT 20 to operate.

Figure 39:
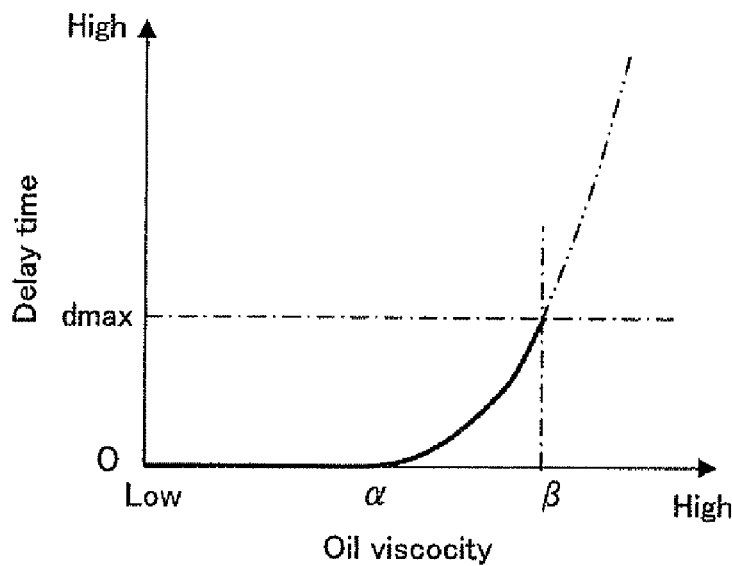
FIG. 39 shows a map used to determine engine stop delay time from oil viscosity.

The present embodiment sets the lower-limit oil temperature in accordance with an upper-limit value for the delay time. FIG. 39 is a map illustrating the relationship between the oil viscosity prevailing when a stop request is generated for the engine 2 and the necessary delay time. As indicated in the figure, a delay time setting of zero is acceptable when the oil viscosity prevailing when the stop request is generated is not higher than the lock pin engagement assurance viscosity ($\alpha$). The necessary delay time increases when the oil viscosity prevailing at the time of stop request generation is higher than the lock pin engagement assurance viscosity ($\alpha$). When an upper-limit value (dmax) is set for the delay time in consideration of discomfort the driver may feel, the associated oil viscosity ($\beta$) is determined by using the relationship shown in FIG. 36. For example, the upper-limit value may be approximately 2 seconds. This oil viscosity ($\beta$) assures lock pin engagement on condition that delay control be exercised. Therefore, this oil viscosity ($\beta$) is hereinafter referred to as the conditional lock pin engagement assurance viscosity.

Figure 40:
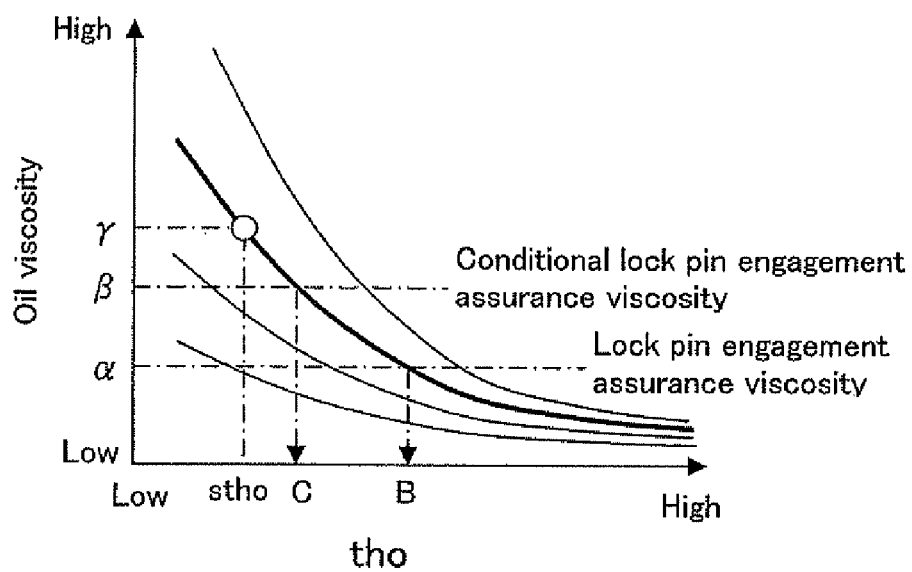
FIG. 40 shows a map used to determine lock pin engagement assurance oil temperature and conditional lock pin engagement assurance oil temperature from oil viscosity characteristic.

The aforementioned lower-limit oil temperature corresponds to the conditional lock pin engagement assurance viscosity ($\beta$). When the viscosity characteristic of the employed oil is determined, the oil temperature (C) corresponding to the conditional lock pin engagement assurance viscosity ($\beta$) can be determined as indicated in FIG. 40. This oil temperature (C) is hereinafter referred to as the conditional lock pin engagement assurance oil temperature (C). The present embodiment inhibits the operation of the VVT 20 until the oil temperature (tho) measured by the oil temperature sensor 46 reaches the conditional lock pin engagement assurance oil temperature (C). The method of determining the oil viscosity characteristic will not be described below because it was already described in conjunction with the tenth embodiment.

Figure 41:
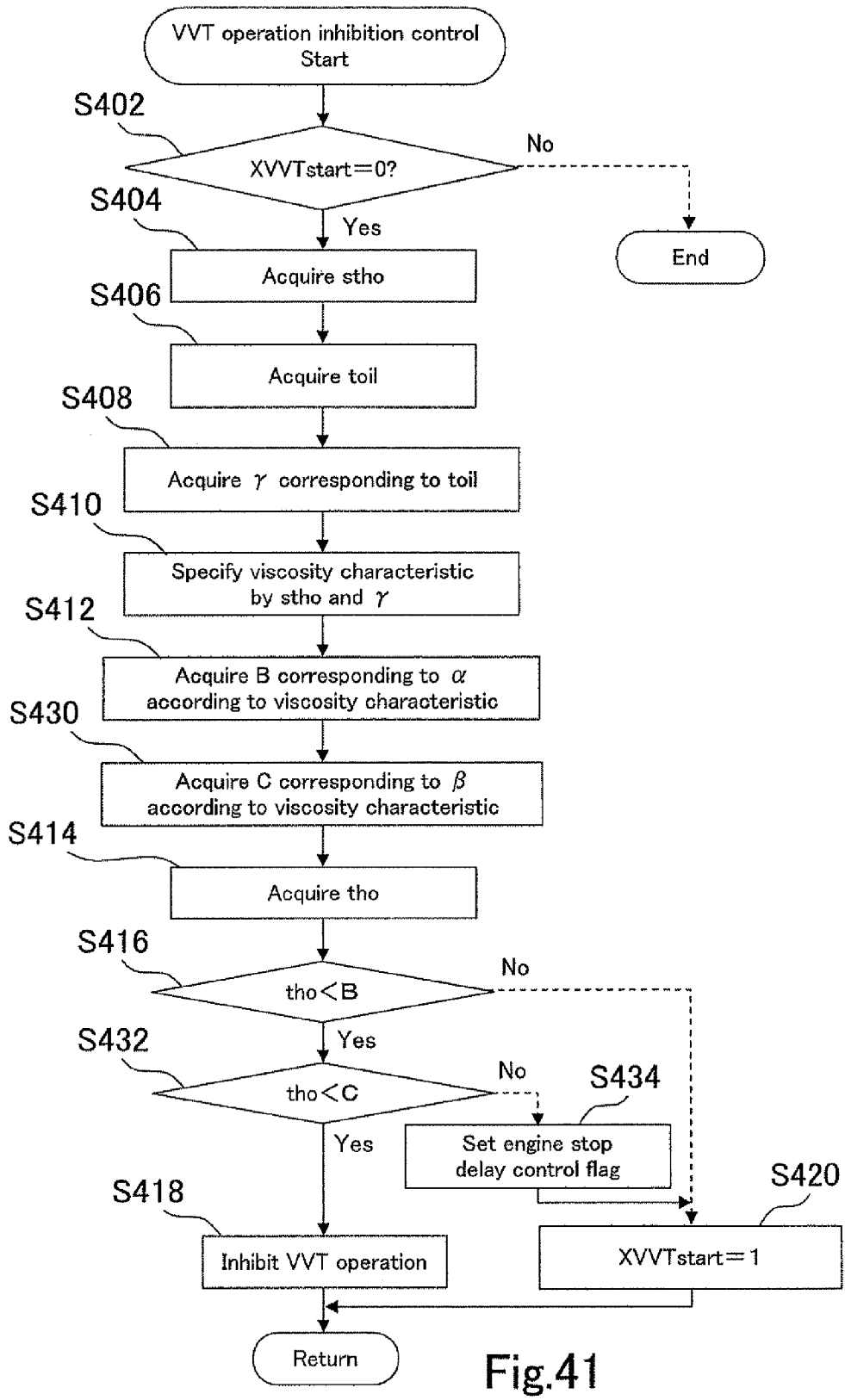
FIG. 41 is a flowchart illustrating a VVT operation inhibition control routine that is executed by an eleventh embodiment of the present invention.

FIG. 41 is a flowchart illustrating a VVT operation inhibition control routine that is executed immediately after a start of the engine 2 in accordance with the present embodiment. Immediately after the start of the engine 2, the ECU 40 executes the routine shown in FIG. 41 at regular intervals. In FIG. 41, processing steps identical with those of the VVT operation inhibition control routine according to the tenth embodiment are assigned the same step numbers as for the tenth embodiment. The processing steps common to the tenth and eleventh embodiments will not be redundantly described or will be briefly described.

First of all, the routine shown in FIG. 41 performs step S402 to judge in accordance with the value of the flag XVVTstart whether the VVT operation is inhibited immediately after engine startup. When the value of the flag XVVTstart is 1, that is, when the VVT operation inhibition is canceled, the routine terminates.

If the judgment result obtained in step S402 indicates that the VVT operation is inhibited, the routine sequentially proceeds to steps S404, S406, S408, S410, and S412. In step S404, the oil temperature sensor 46 acquires the oil temperature (stho) prevailing at engine startup. In step S406, the hydraulic pressure rise delay time (toil) prevailing after engine startup is acquired. In step S408, the oil viscosity ($\gamma$) corresponding to the hydraulic pressure rise delay time (toil) is acquired in accordance with the map shown in FIG. 3. In step 410, the oil viscosity characteristic corresponding to the start oil temperature (stho) and oil viscosity ($\gamma$) is judged in accordance with the map shown in FIG. 40. In step S412, the lock pin engagement assurance temperature (B) is determined by applying the lock pin engagement assurance viscosity ($\alpha$) to the characteristic curve for the judged oil viscosity characteristic.

The routine then proceeds to step S430. In step S430, the conditional lock pin engagement assurance temperature (C) for the currently used coil is determined by applying a preselected conditional lock pin engagement assurance viscosity ($\beta$) to the characteristic curve for the oil viscosity characteristic judged in step S410. The conditional lock pin engagement assurance temperature (C) varies with the viscosity characteristic of the employed oil as is the case with the lock pin engagement assurance temperature (B). Steps S404 to S412 and S430, which are described above, are performed only once (although it is not indicated in the flowchart). The lock pin engagement assurance oil temperature (B) and conditional lock pin engagement assurance oil temperature (C) acquired upon initial execution are retained until the routine is completed.

Next, the routine proceeds to step S414. In step S414, the oil temperature sensor 46 acquires the current oil temperature (tho). Next, step S416 is performed to judge whether the current oil temperature (tho) has reached the lock pin engagement assurance oil temperature (B). If the current oil temperature (tho) has reached the lock pin engagement assurance oil temperature (B), the routine proceeds to step S420. In step S420, the operation inhibition on the VVT 20 is canceled with the flag XVVTstart set to 1.

If, on the other hand, the current oil temperature (tho) has not reached the lock pin engagement assurance oil temperature (B), the routine proceeds to step S432. Step S432 is performed to judge whether the current oil temperature (tho) has reached the conditional lock pin engagement assurance oil temperature (C). If the current oil temperature (tho) has not reached the conditional lock pin engagement assurance oil temperature (C), the routine performs step S418 to continuously inhibit the operation of the VVT 20.

If the judgment result obtained in step S432 indicates that the current oil temperature (tho) has reached the conditional lock pin engagement assurance oil temperature (C), the routine proceeds to step S434. Step S434 is performed to set an engine stop delay control flag. The initial value of the engine stop delay control flag is 0. This flag is set to 1 only when the routine proceeds to step S434. Next, the routine proceeds to step S420. In step S420, the operation inhibition on the VVT 20 is canceled with the flag XVVTstart set to 1.

The routine described above judges the viscosity characteristic (temperature dependence) of oil in accordance with the oil viscosity ($\gamma$) derived from the hydraulic pressure rise delay time (toil) and the start oil temperature (stho), and calculates the lock pin engagement assurance oil temperature (B) and conditional lock pin engagement assurance oil temperature (C) in accordance with the judged oil viscosity characteristic and lock pin engagement assurance viscosity ($\alpha$). This ensures that the viscosity characteristic of the currently used oil can be reflected in the setup of the lock pin engagement assurance oil temperature (B) and conditional lock pin engagement assurance oil temperature (C). Executing the above routine immediately after a start of the engine 2 makes it possible to exercise valve timing control as early as possible while assuring lock pin engagement during a period of engine inactivity.

Figure 42:
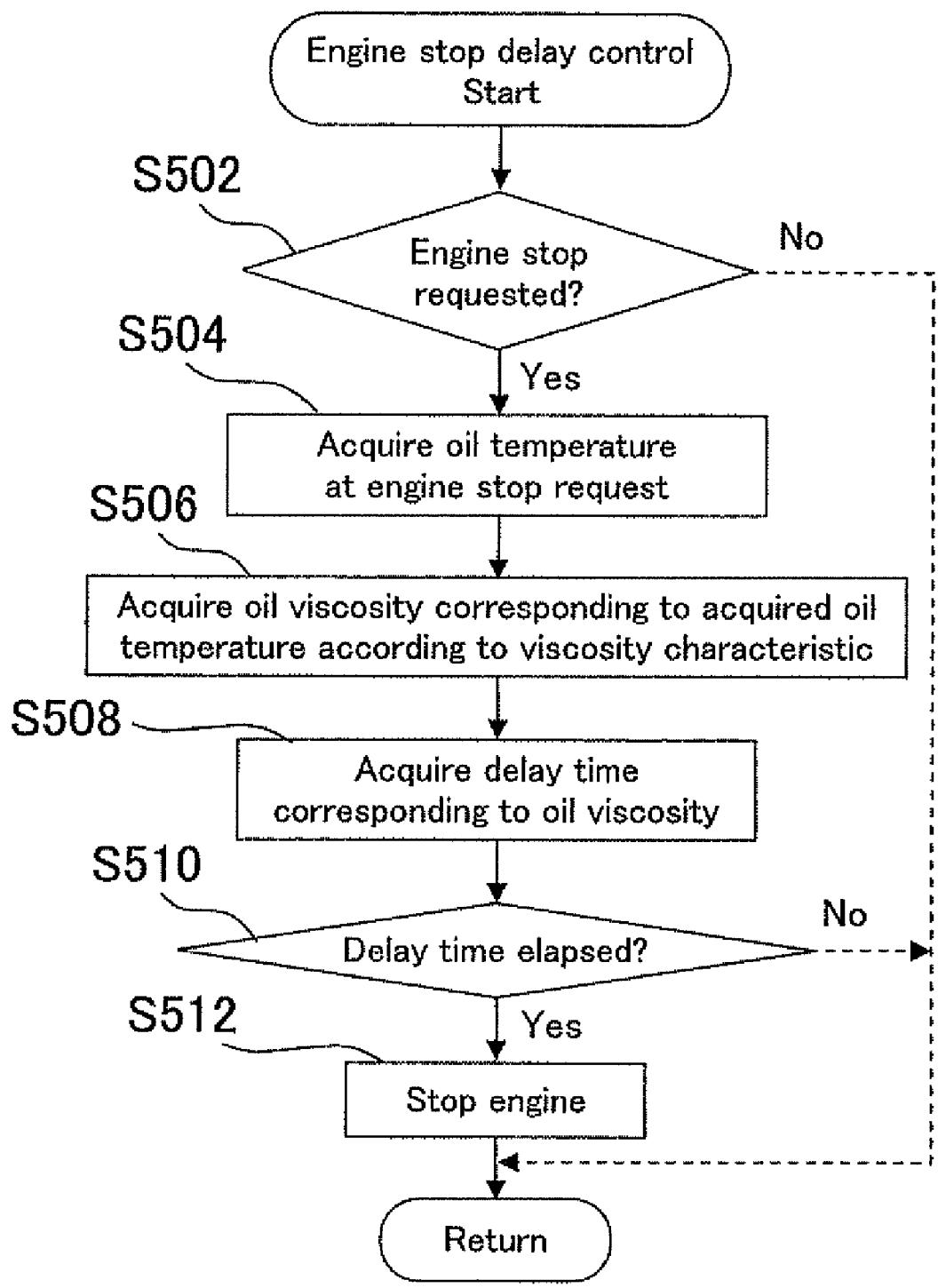
FIG. 42 is a flowchart illustrating an engine stop delay control routine that is executed by an eleventh embodiment of the present invention.

Engine stop delay control, which is exercised in response to a stop request for the engine 2, will now be described in detail. FIG. 42 is a flowchart illustrating an engine stop delay control routine that is executed in accordance with the present embodiment. The ECU 40 executes the routine shown in FIG. 42 only when the engine stop delay control flag is set.

First of all, the routine shown in FIG. 42 performs step S502 to judge whether an engine stop request is generated by the driver. When a stop switch (e.g., ignition switch) for the engine 2, which is not shown, is turned off, it is judged that the engine stop request is issued. The routine skips the subsequent steps until the engine stop request is detected.

When the engine stop request is generated, the routine proceeds to steps S504 and beyond. In step S504, the oil temperature sensor 46 acquires the current oil temperature.

The routine then proceeds to step S506. In step S506, a characteristic curve for the viscosity characteristic of the currently used oil is read from the map shown in FIG. 40. The routine uses an oil viscosity characteristic that is judged when the VVT operation inhibition control routine is executed. The oil temperature prevailing at the time of engine stop request generation is applied to the read characteristic curve to determine the current oil viscosity.

Next, the routine proceeds to step S508. In step S508, the delay time corresponding to the oil viscosity prevailing at the time of engine stop request generation is acquired in accordance with the map shown in FIG. 39. The acquired delay time is always not greater than the aforementioned upper-limit value (dmax). The reason is that the aforementioned VVT operation inhibition control routine cancels the operation inhibition on the VVT 20 only when the oil viscosity is not higher than the conditional lock pin engagement assurance viscosity ($\beta$).

Next, the routine performs step S510 to judge whether the delay time acquired in step S508 has elapsed. The stop of the engine 2 is continuously delayed until the delay time elapses. When the delay time elapses, step S512 is performed to stop the engine 2. If the oil temperature significantly rises after the VVT 20 is operated, the oil viscosity prevailing at the time of engine stop request generation may be lower than the lock pin engagement assurance viscosity ($\alpha$). In such an instance, the routine sets the delay time to zero and brings the engine 2 to an immediate stop.

If the oil temperature prevailing when a stop request for the engine 2 is generated is lower than the lock pin engagement assurance temperature (B), the routine described above delays the stop of the engine. Therefore, the VVT 20 can be urged to move toward its lock position by the resulting delay time. This makes it possible to prevent lock pin engagement from being obstructed by a high-viscosity oil. Therefore, the valve timing control device according to the present embodiment can apply hydraulic pressure to the VVT 20 at next startup with the lock pin 30 properly engaged with the lock hole, and avoid a problem caused by incomplete lock pin engagement such as the generation of a tapping sound due to the collision between the housing 22 and vane assembly 24.

The correlations between the eleventh embodiment and the twenty-seventh aspect and its dependent aspects of the present invention are as described below. In FIG. 16, the VVT 20 corresponds to the "variable valve timing mechanism" according to the twenty-seventh aspect of the present invention; the main oil gallery 6 and VVT line 8 correspond to the "oil supply line" according to the twenty-seventh aspect of the present invention; and the oil pump 4 corresponds to the "oil pump" according to the twenty-seventh aspect of the present invention. Further, the hydraulic pressure sensor 42 corresponds to the "hydraulic pressure measurement means" according to the twenty-seventh aspect of the present invention; and the oil temperature sensor 46 corresponds to the "oil temperature measurement means" according to the twenty-seventh aspect of the present invention.

The "viscosity index value setup means" according to the twenty-seventh aspect of the present invention is implemented when the ECU 40 performs steps S406 and S408 of the routine shown in FIG. 41 by using the map shown in FIG. 3. Further, the "characteristic judgment means" according to the twenty-seventh aspect of the present invention is implemented when the ECU 40 performs step S410 of the routine shown in FIG. 41 by using the map shown in FIG. 40. Furthermore, the "assurance temperature calculation means" according to the twenty-seventh aspect of the present invention is implemented when the ECU 40 performs step S412 of the routine shown in FIG. 41 by using the map shown in FIG. 40. Moreover, the "delay means" according to the twenty-seventh aspect of the present invention is implemented when the ECU 40 executes the routine shown in FIG. 42.

The "conditional assurance temperature calculation means" according to the twenty-eighth aspect of the present invention is implemented when the ECU 40 performs step S430 of the routine shown in FIG. 41 by using the map shown in FIG. 40. Further, the "operation inhibition means" according to the twenty-eighth aspect of the present invention is implemented when the ECU 40 performs steps S432, S418, and S420 of the routine shown in FIG. 41.

The correlations between the eleventh embodiment and the first aspect and its dependent aspects of the present invention are the same as the correlations between the tenth embodiment and the first aspect and its dependent aspects of the present invention.

The eleventh embodiment uses the hydraulic pressure rise delay time (toil) as the index value indicating the pace at which the hydraulic pressure rises. However, an alternative would be to use the hydraulic pressure rise time (soil) as the index value, as is the case with the second embodiment. To use such an alternative, it is necessary to replace the process performed in step S406 of the routine shown in FIG. 41 by a process that acquires the hydraulic pressure rise time (soil), and replace the process performed in step S408 by a process that acquires the oil viscosity (γ) corresponding to the hydraulic pressure rise time (soil) in accordance with the map shown in FIG. 9.

Twelfth Embodiment

Lastly, the valve timing control device according to a twelfth embodiment of the present invention will now be described with reference to FIGS. 3, 4, 16, 36, and 43.

The valve timing control device according to the twelfth embodiment includes a hydraulic circuit, which is configured the same as that of the fourth embodiment. Therefore, the following description assumes that the employed hydraulic circuit is configured the same as in the fourth embodiment, which is shown in FIG. 16. However, when the configuration shown in FIG. 16 is used to describe the present embodiment, it is assumed that the hydraulic circuit shown in FIG. 16 is a part of the valve timing control device to be applied to an exhaust valve.

The valve timing control device according to the present embodiment is characterized by VVT operation inhibition control that is executed immediately after a start of the engine 2. VVT operation inhibition control according to the present embodiment is equivalent to a combination of VVT operation inhibition control according to the tenth embodiment and VVT operation inhibition control according to the first embodiment. More specifically, the present embodiment inhibits the operation of the VVT 20 until the oil viscosity prevailing after a start of the engine 2 is equal to or lower than the lock pin engagement assurance viscosity and the VVT 20 is sufficiently charged with oil.

Figure 43:
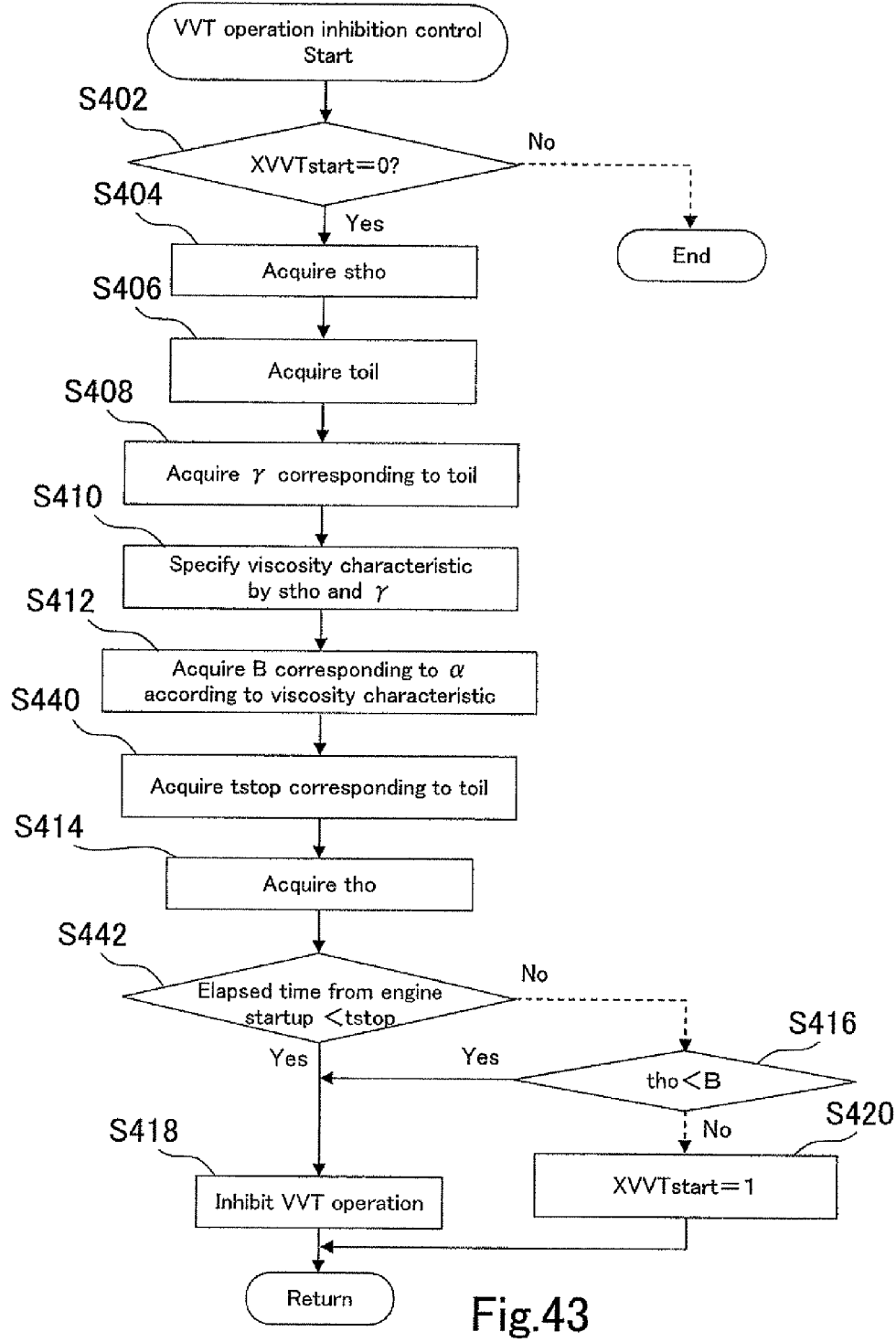
FIG. 43 is a flowchart illustrating a VVT operation inhibition control routine that is executed by a twelfth embodiment of the present invention.

FIG. 43 is a flowchart illustrating a VVT operation inhibition control routine that is executed immediately after a start of the engine 2 in accordance with the present embodiment. Immediately after the start of the engine 2, the ECU 40 executes the routine shown in FIG. 43 at regular intervals. In FIG. 43, processing steps identical with those of the VVT operation inhibition control routine according to the tenth embodiment are assigned the same step numbers as for the tenth embodiment. The processing steps common to the tenth and twelfth embodiments will not be redundantly described or will be briefly described.

First of all, the routine shown in FIG. 43 performs step S402 to judge in accordance with the value of the flag XVVTstart whether the VVT operation is inhibited immediately after engine startup. When the value of the flag XVVTstart is 1, that is, when the VVT operation inhibition is canceled, the routine terminates.

If the judgment result obtained in step S402 indicates that the VVT operation is inhibited, the routine sequentially proceeds to steps S404 to S412. In step S404, the oil temperature sensor 46 acquires the oil temperature (stho) prevailing at engine startup. In step S406, the hydraulic pressure rise delay time (toil) prevailing after engine startup is acquired. In step S408, the oil viscosity (γ) corresponding to the hydraulic pressure rise delay time (toil) is acquired in accordance with the map shown in FIG. 3. In step 410, the oil viscosity characteristic corresponding to the start oil temperature (stho) and oil viscosity (γ) is judged in accordance with the map shown in FIG. 37. In step S412, the lock pin engagement assurance temperature (B) is determined by applying the lock pin engagement assurance viscosity (α) to the characteristic curve for the judged oil viscosity characteristic.

The routine then proceeds to step S440. In step S440, the VVT operation inhibition time (tstop) corresponding to the hydraulic pressure rise delay time (toil) is acquired in accordance with the map shown in FIG. 4. Steps S404 to S412 and S440 are performed only once (although it is not indicated in the flowchart). The lock pin engagement assurance oil temperature (B) and VVT operation inhibition time (tstop) acquired upon initial execution are retained until the routine is completed.

Next, the routine proceeds to step S414. In step S414, the oil temperature sensor 46 acquires the current oil temperature (tho).

Next, the routine performs step S442 to judge whether the elapsed time from engine startup has reached the VVT operation inhibition time (tstop) acquired in step S440. If the elapsed time from engine startup has not reached the VVT operation inhibition time (tstop), the routine performs step S418 to continuously inhibit the operation of the VVT 20.

If, on the other hand, the elapsed time from engine startup has reached the VVT operation inhibition time (tstop), the routine performs step S416 to judge whether the current oil temperature (tho) has reached the lock pin engagement assurance oil temperature (B). If the current oil temperature (tho) has not reached the lock pin engagement assurance oil temperature (B), the routine performs step S418 to continuously inhibit the operation of the VVT 20. If, on the other hand, the current oil temperature (tho) has reached the lock pin engagement assurance oil temperature (B), the routine proceeds to step S420. In step S420, the operation inhibition on the VVT 20 is canceled with the flag XVVTstart set to 1.

The routine described above does not cancel the operation inhibition on the VVT 20 until the elapsed time from engine startup reaches the VVT operation inhibition time (tstop) allowing the oil temperature (tho) to reach the lock pin engagement assurance oil temperature (B). Therefore, the valve timing control device according to the present embodiment can assure lock pin engagement during a period of engine inactivity and exercise valve timing control as early as possible without causing a problem such as the generation of a tapping sound after a start of the engine 2.

The correlations between the twelfth embodiment and various aspects of the present invention are the same as the correlations between the first and tenth embodiments and various aspect of the present invention.

The twelfth embodiment uses the hydraulic pressure rise delay time (toil) as the index value indicating the pace at which the hydraulic pressure rises. However, an alternative would be to use the hydraulic pressure rise time (soil) as the index value, as is the case with the second embodiment. To use such an alternative, it is necessary to replace the process performed in step S406 of the routine shown in FIG. 43 by a process that acquires the hydraulic pressure rise time (soil), and replace the process performed in step S408 by a process that acquires the oil viscosity (γ) corresponding to the hydraulic pressure rise time (soil) in accordance with the map shown in FIG. 9.

Other

While the present invention has been described in terms of preferred embodiments, it should be understood that the invention is not limited to the preferred embodiments described above, and that variations may be made without departure from the scope and spirit of the invention. For example, the following modifications may be made to the preferred embodiments of the present invention.

Although the embodiments described above assume that the present invention is applied to a valve timing control device, the present invention can be widely applied to a hydraulic system that uses a hydraulic actuator. In such an instance, an electric pump may be used as the hydraulic pressure generation source. Further, its structure is not specifically defined so that, for example, a rotary pump or a plunger pump may be used as the hydraulic pressure generation source.

Although the embodiments described above assume that an oil temperature sensor directly measures the oil temperature, a water temperature sensor may indirectly measure the oil temperature. The reason is that there is a correlation between the temperature of oil in the engine 2 and the temperature of cooling water. When such a water temperature sensor is used, it serves as the "oil temperature measurement means."

The oil viscosity, which can be estimated from the pace at which hydraulic pressure rises, can also be reflected in a controlled variable (control duty) that prevails when the operation of the VVT 20 is controlled by the OCV 10. When the oil viscosity changes, the responsiveness of the VVT 20 relative to the controlled variable of the OCV 10 also changes. When the oil viscosity is reflected in controlled variable setup, it is possible to prevent the responsiveness of the VVT 20 from varying.

The use of an oil viscosity characteristic (temperature dependence of oil viscosity) learned in the eighth embodiment makes it possible to acquire an oil viscosity prevailing at an arbitrary point of time by measuring the oil temperature. Consequently, the operation of a hydraulic actuator can be controlled while constantly considering the current oil viscosity.

The "assurance viscosity at which the predetermined operation of the variable valve timing mechanism is assured" according to the twenty-fifth and twenty-seventh aspects of the present invention may be a viscosity that assures a constant VVT response to the controlled variable of the OCV 10.

It is assumed that the twelfth embodiment is a combination of the first and tenth embodiments. Alternatively, however, the twelfth embodiment may be a combination of the first and eleventh embodiments. Further, the combination may further include the other embodiments.

The invention claimed is:

1. A hydraulic system control device for a hydraulic system having a hydraulic actuator that operates upon receipt of supplied oil, an oil supply line connected to the hydraulic actuator, and a hydraulic pressure generation source for allowing oil in the oil supply line to generate hydraulic pressure, the hydraulic system control device comprising:
hydraulic pressure measurement means for measuring the hydraulic pressure of the oil in the oil supply line; and
viscosity index value setup means which, when the hydraulic pressure generation source begins to generate hydraulic pressure, sets a viscosity index value for indicating oil viscosity in accordance with a pace at which the measured hydraulic pressure rises;
wherein the viscosity index value setup means performs setup so that the slower the pace at which the measured hydraulic pressure rises, the higher the viscosity indicated by the viscosity index value.

2. The hydraulic system control device according to claim 1, wherein the viscosity index value setup means sets the viscosity index value in accordance with the delay time between the instant at which hydraulic pressure generation starts and the instant at which the measured hydraulic pressure reaches a predetermined rise judgment value.

3. The hydraulic system control device according to claim 1, wherein the viscosity index value setup means sets the viscosity index value in accordance with a speed at which the measured hydraulic pressure rises.

4. The hydraulic system control device according to claim 1, further comprising:
storage means for storing the temperature dependence of the amount of oil that leaks from the hydraulic actuator per unit time while the hydraulic pressure generation source is inactive;
inactivity period oil temperature measurement means for measuring the temperature of oil at predetermined intervals while the hydraulic pressure generation source is inactive; and
oil leakage amount calculation means for calculating the cumulative amount of oil leakage from the hydraulic actuator during an inactivity period of the hydraulic pressure generation source in accordance with the stored temperature dependence of an oil leakage amount and changes in the measured oil temperature.

5. The hydraulic system control device according to claim 4, wherein the inactivity period oil temperature measurement means uses short measurement intervals when the elapsed time from hydraulic pressure generation source deactivation is short, and uses long measurement intervals when the elapsed time is long.

6. The hydraulic system control device according to claim 1, further comprising:
control means for causing the viscosity index value to be reflected in the control of the hydraulic system.

7. The hydraulic system control device according to claim 4, further comprising:
control means for causing the cumulative leakage amount to be reflected in the control of the hydraulic system.

8. The hydraulic system control device according to claim 1, further comprising:
initial oil temperature measurement means for measuring the oil temperature at the beginning of hydraulic pressure generation; and
characteristic judgment means for judging the temperature dependence of oil viscosity in accordance with the oil temperature measured at the beginning of hydraulic pressure generation and the viscosity index value.

9. The hydraulic system control device according to claim 8, further comprising:
storage means for storing the viscosity dependence of the amount of oil that leaks from the hydraulic actuator per unit time while the hydraulic pressure generation source is inactive;
inactivity period oil temperature measurement means for measuring the temperature of oil at predetermined intervals while the hydraulic pressure generation source is inactive;
viscosity change calculation means for calculating viscosity index value changes during an inactivity period of the hydraulic pressure generation source in accordance with the judged temperature dependence of viscosity and changes in the measured oil temperature; and
oil leakage amount calculation means for calculating the cumulative amount of oil leakage from the hydraulic actuator during an inactivity period of the hydraulic pressure generation source in accordance with the stored viscosity dependence of an oil leakage amount and changes in the viscosity index value.

10. The hydraulic system control device according to claim 8, further comprising:
control means for causing the judged temperature dependence of viscosity to be reflected in the control of the hydraulic system.

11. The hydraulic system control device according to claim 9, further comprising:
control means for causing the cumulative leakage amount to be reflected in the control of the hydraulic system.

12. The hydraulic system control device according to claim 1, wherein the hydraulic actuator is a variable valve timing mechanism that can change the valve timing of an internal combustion engine; and wherein the hydraulic pressure generation source is an oil pump that is driven by the internal combustion engine.

13. A hydraulic system control device for a hydraulic system having a hydraulic actuator that operates upon receipt of supplied oil, a hydraulic oil supply line connected to the hydraulic actuator, and a hydraulic pressure generation source for allowing oil in the hydraulic oil supply line to generate hydraulic pressure, the control device comprising:
control means for controlling the operation of the hydraulic actuator by using a control parameter in which oil viscosity is reflected;
hydraulic pressure measurement means for measuring the hydraulic pressure of the oil in the hydraulic oil supply line;
index value acquisition means which, when the hydraulic pressure generation source begins to generate hydraulic pressure, acquires an index value indicating a pace at which the measured hydraulic pressure rises; and
control parameter setup means which performs setup so that the slower the pace indicated by the index value, the higher the viscosity indicated by the control parameter.

14. The hydraulic system control device according to claim 13, wherein the index value acquired by the index value acquisition means represents the delay time between the instant at which hydraulic pressure generation starts and the instant at which the measured hydraulic pressure reaches a predetermined rise judgment value.

15. The hydraulic system control device according to claim 13, wherein the index value acquired by the index value acquisition means represents a speed at which the measured hydraulic pressure rises.

16. The hydraulic system control device according to claim 13, wherein the hydraulic actuator is a variable valve timing mechanism that can change the valve timing of an internal combustion engine; and wherein the hydraulic pressure generation source is an oil pump that is driven by the internal combustion engine.

17. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:
operation inhibition means for temporarily inhibiting the operation of the variable valve timing mechanism when the internal combustion engine starts;
hydraulic pressure measurement means for measuring the hydraulic pressure of oil in the oil supply line;
index value acquisition means for acquiring an index value indicating a pace at which the measured hydraulic pressure rises when the internal combustion engine starts; and
operation inhibition time setup means which performs setup so that the slower the pace indicated by the index value, the longer the time during which the operation of the variable valve timing mechanism is inhibited by the operation inhibition means.

18. The valve timing control device according to claim 17, wherein the index value acquired by the index value acquisition means represents the delay time between the instant at which the rotation speed of the internal combustion engine exceeds a predetermined start judgment rotation speed and the instant at which the measured hydraulic pressure reaches a predetermined rise judgment value.

19. The valve timing control device according to claim 18, wherein, if the internal combustion engine stalls during the time interval between the instant at which the rotation speed of the internal combustion engine exceeds the start judgment rotation speed and the instant at which the measured hydraulic pressure reaches the rise judgment value, and if the length of stall time prevailing before the rotation speed of the internal combustion engine exceeds the start judgment rotation speed again is not greater than the length of predetermined permissible time, the index value acquisition means adds the time measured before the stall to the delay time.

20. The valve timing control device according to claim 17, wherein the index value acquired by the index value acquisition means represents a speed at which the measured hydraulic pressure rises.

21. The valve timing control device according to claim 17, further comprising:
reference cumulative number-of-rotations storage means for storing the reference cumulative number of rotations in accordance with the elapsed time from a start of the internal combustion engine;
actual cumulative number-of-rotations calculation means for calculating the actual cumulative number of rotations of the internal combustion engine that is obtained when the measured hydraulic pressure reaches a predetermined value; and
operation inhibition time correction means for correcting the operation inhibition time in accordance with the ratio between the reference cumulative number of rotations and the actual cumulative number of rotations that prevail when the measured hydraulic pressure reaches the predetermined value.

22. The valve timing control device according to claim 17, further comprising:
start oil temperature measurement means for measuring the oil temperature when the internal combustion engine starts;
lower-limit guard value setup means for setting a lower-limit guard value for the operation inhibition time in accordance with the oil temperature measured at startup; and
lower-limit guard means which, when the operation inhibition time determined by the index value is less than the lower-limit guard value, replaces the setting for the operation inhibition time with the lower-limit guard value.

23. The valve timing control device according to claim 22, further comprising:
- upper-limit guard value setup means for setting an upper-limit guard value for the operation inhibition time in accordance with the oil temperature measured at startup; and
- upper-limit guard means which, when the operation inhibition time determined by the index value is more than the upper-limit guard value, replaces the setting for the operation inhibition time with the upper-limit guard value.

24. The valve timing control device according to claim 17, further comprising:
- storage means for storing the temperature dependence of the amount of oil that leaks from the variable valve timing mechanism per unit time while the oil pump is inactive;
- inactivity period oil temperature measurement means for measuring the temperature of oil at predetermined intervals while the internal combustion engine is inactive;
- oil leakage amount calculation means for calculating the cumulative amount of oil leakage from the variable valve timing mechanism during an inactivity period of the internal combustion engine in accordance with the stored temperature dependence of an oil leakage amount and changes in the measured oil temperature; and
- correction means for correcting the operation inhibition time in accordance with the cumulative amount of oil leakage.

25. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:
- hydraulic pressure measurement means for measuring the hydraulic pressure of oil in the oil supply line;
- oil temperature measurement means for measuring the temperature of oil in the oil supply line;
- viscosity index value setup means which, when the internal combustion engine starts, sets a viscosity index value indicating the viscosity of oil in accordance with a pace at which the measured hydraulic pressure rises, and performs setup so that the slower the pace at which the measured hydraulic pressure rises, the higher the viscosity indicated by the viscosity index value;
- characteristic judgment means for judging the temperature dependence of oil viscosity in accordance with the oil temperature measured at the start of the internal combustion engine and the viscosity index value;
- assurance temperature calculation means for calculating an assurance temperature at which a predetermined operation of the variable valve timing mechanism is assured, in accordance with assurance viscosity at which the predetermined operation of the variable valve timing mechanism is assured and the judged temperature dependence of oil viscosity; and
- operation inhibition means for inhibiting the operation of the variable valve timing mechanism until the oil temperature measured at the start of the internal combustion engine reaches the assurance temperature.

26. The valve timing control device according to claim 25, wherein the predetermined operation is rotating a housing and a vane assembly of the variable valve timing mechanism relatively in a predetermined direction by using residual hydraulic pressure of oil while the internal combustion engine is inactive and then engaging a lock pin on either the housing or the vane assembly with a lock hole in the other.

27. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:
- hydraulic pressure measurement means for measuring the hydraulic pressure of oil in the oil supply line;
- oil temperature measurement means for measuring the temperature of oil in the oil supply line;
- viscosity index value setup means which, when the internal combustion engine starts, sets a viscosity index value indicating the viscosity of oil in accordance with a pace at which the measured hydraulic pressure rises, and performs setup so that the slower the pace at which the measured hydraulic pressure rises, the higher the viscosity indicated by the viscosity index value;
- characteristic judgment means for judging the temperature dependence of oil viscosity in accordance with the oil temperature measured at the start of the internal combustion engine and the viscosity index value;
- assurance temperature calculation means for calculating an assurance temperature at which a predetermined operation of the variable valve timing mechanism is assured during an inactivity period of the internal combustion engine, in accordance with assurance viscosity at which the predetermined operation of the variable valve timing mechanism is assured and the judged temperature dependence of oil viscosity; and
- delay means which, if the oil temperature measured when the internal combustion engine is requested to stop is lower than the assurance temperature, delays the stop of the internal combustion engine by delay time according to the difference between the assurance temperature and the measured oil temperature.

28. The valve timing control device according to claim 27, further comprising:
- conditional assurance temperature calculation means which, in accordance with conditional assurance viscosity at which the predetermined operation can be assured as far as the stop of the internal combustion engine is delayed by an upper-limit value for the delay time, and with the judged temperature dependence of oil viscosity, calculates a conditional assurance temperature that corresponds to the conditional assurance viscosity; and
- operation inhibition means for inhibiting the operation of the variable valve timing mechanism until the oil temperature measured at the start of the internal combustion engine reaches the conditional assurance temperature.

29. The valve timing control device according to claim 27, wherein the predetermined operation is rotating a housing and a vane assembly of the variable valve timing mechanism relatively in a predetermined direction by using residual hydraulic pressure of oil and then engaging a lock pin on either the housing or the vane assembly with a lock hole in the other.

30. A hydraulic system control device for a hydraulic system having a hydraulic actuator that operates upon receipt of supplied oil, an oil supply line connected to the hydraulic actuator, and a hydraulic pressure generation source for allowing oil in the oil supply line to generate hydraulic pressure, the hydraulic system control device comprising:
- hydraulic pressure measurement means for measuring the hydraulic pressure of the oil in the oil supply line; and
- viscosity index value setup means which, when the hydraulic pressure generation source begins to generate hydraulic pressure, sets a viscosity index value for indicating oil viscosity in accordance with a convergence value prevailing when the measured hydraulic pressure fully rises;
- wherein the viscosity index value setup means performs setup so that the greater the convergence value, the higher the viscosity indicated by the viscosity index value.

31. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:
- operation inhibition means for temporarily inhibiting the operation of the variable valve timing mechanism when the internal combustion engine starts;
- hydraulic pressure measurement means for measuring the hydraulic pressure of oil in the oil supply line;
- hydraulic pressure convergence value acquisition means which, when the internal combustion engine starts, acquires a convergence value prevailing when the measured hydraulic pressure fully rises; and
- operation inhibition time setup means which performs setup so that the greater the convergence value, the longer the time during which the operation of the variable valve timing mechanism is inhibited by the operation inhibition means.

32. A hydraulic system control device for a hydraulic system having a hydraulic actuator that operates upon receipt of supplied oil, an oil supply line connected to the hydraulic actuator, and a hydraulic pressure generation source for allowing oil in the oil supply line to generate hydraulic pressure, the hydraulic system control device comprising:
- a pressure measuring equipment for measuring the hydraulic pressure of the oil in the oil supply line; and
- a computing equipment which, when the hydraulic pressure generation source begins to generate hydraulic pressure, sets a viscosity index value for indicating oil viscosity in accordance with a pace at which the measured hydraulic pressure rises;
- wherein the computing equipment performs the setup of the viscosity index value so that the slower the pace at which the measured hydraulic pressure rises, the higher the viscosity indicated by the viscosity index value.

33. A hydraulic system control device for a hydraulic system having a hydraulic actuator that operates upon receipt of supplied oil, a hydraulic oil supply line connected to the hydraulic actuator, and a hydraulic pressure generation source for allowing oil in the hydraulic oil supply line to generate hydraulic pressure, the control device comprising:
- a controlling equipment for controlling the operation of the hydraulic actuator by using a control parameter in which oil viscosity is reflected;
- a pressure measuring equipment for measuring the hydraulic pressure of the oil in the hydraulic oil supply line; and
- a computing equipment which, when the hydraulic pressure generation source begins to generate hydraulic pressure, acquires an index value indicating a pace at which the measured hydraulic pressure rises, and performs the setup of the control parameter so that the slower the pace indicated by the index value, the higher the viscosity indicated by the control parameter.

34. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:
- a controlling equipment for temporarily inhibiting the operation of the variable valve timing mechanism when the internal combustion engine starts;
- a pressure measuring equipment for measuring the hydraulic pressure of oil in the oil supply line; and
- a computing equipment which, when the internal combustion engine starts, acquires an index value indicating a pace at which the measured hydraulic pressure rises, and performs the setup of the operation inhibition time so that the slower the pace indicated by the index value, the longer the time during which the operation of the variable valve timing mechanism is inhibited by the controlling equipment.

35. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:
- a pressure measuring equipment for measuring the hydraulic pressure of oil in the oil supply line;
- a temperature measuring equipment for measuring the temperature of oil in the oil supply line;
- a first computing equipment which, when the internal combustion engine starts, sets a viscosity index value indicating the viscosity of oil in accordance with a pace at which the measured hydraulic pressure rises, the first computing equipment performing the setup of the viscosity index value so that the slower the pace at which the measured hydraulic pressure rises, the higher the viscosity indicated by the viscosity index value;
- a second computing equipment for judging the temperature dependence of oil viscosity in accordance with the oil temperature measured at the start of the internal combustion engine and the viscosity index value;
- a third computing equipment for calculating an assurance temperature at which a predetermined operation of the variable valve timing mechanism is assured, in accordance with assurance viscosity at which the predetermined operation of the variable valve timing mechanism is assured and the judged temperature dependence of oil viscosity; and
- a controlling equipment for inhibiting the operation of the variable valve timing mechanism until the oil temperature measured at the start of the internal combustion engine reaches the assurance temperature.

36. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:

- a pressure measuring equipment for measuring the hydraulic pressure of oil in the oil supply line;
- a temperature measuring equipment for measuring the temperature of oil in the oil supply line;
- a first computing equipment which, when the internal combustion engine starts, sets a viscosity index value indicating the viscosity of oil in accordance with a pace at which the measured hydraulic pressure rises, the first computing equipment performing the setup of the viscosity index value so that the slower the pace at which the measured hydraulic pressure rises, the higher the viscosity indicated by the viscosity index value;
- a second computing equipment for judging the temperature dependence of oil viscosity in accordance with the oil temperature measured at the start of the internal combustion engine and the viscosity index value;
- a third computing equipment for calculating an assurance temperature at which a predetermined operation of the variable valve timing mechanism is assured during an inactivity period of the internal combustion engine, in accordance with assurance viscosity at which the predetermined operation of the variable valve timing mechanism is assured and the judged temperature dependence of oil viscosity; and
- a controlling equipment which, if the oil temperature measured when the internal combustion engine is requested to stop is lower than the assurance temperature, delays the stop of the internal combustion engine by delay time according to the difference between the assurance temperature and the measured oil temperature.

37. A hydraulic system control device for a hydraulic system having a hydraulic actuator that operates upon receipt of supplied oil, an oil supply line connected to the hydraulic actuator, and a hydraulic pressure generation source for allowing oil in the oil supply line to generate hydraulic pressure, the hydraulic system control device comprising:

- a pressure measuring equipment for measuring the hydraulic pressure of the oil in the oil supply line; and
- a computing equipment which, when the hydraulic pressure generation source begins to generate hydraulic pressure, sets a viscosity index value for indicating oil viscosity in accordance with a convergence value prevailing when the measured hydraulic pressure fully rises;
- wherein the computing equipment performs the setup of the viscosity index value so that the greater the convergence value, the higher the viscosity indicated by the viscosity index value.

38. A valve timing control device, which has a hydraulic variable valve timing mechanism for changing the valve timing of an internal combustion engine, an oil supply line connected to the variable valve timing mechanism, and an oil pump that is driven by the internal combustion engine and causes oil in the oil supply line to generate hydraulic pressure, and controls the operation of the variable valve timing mechanism by exercising supply/drainage control over the oil, the valve timing control device comprising:

- a controlling equipment for temporarily inhibiting the operation of the variable valve timing mechanism when the internal combustion engine starts;
- a pressure measuring equipment for measuring the hydraulic pressure of oil in the oil supply line; and
- a computing equipment which, when the internal combustion engine starts, acquires a convergence value prevailing when the measured hydraulic pressure fully rises, and performs the setup of the operation inhibition time so that the greater the convergence value, the longer the time during which the operation of the variable valve timing mechanism is inhibited by the controlling equipment.

* * * * *